United States Patent
Maeda et al.

(10) Patent No.: US 9,350,501 B2
(45) Date of Patent: May 24, 2016

(54) MOBILE COMMUNICATION SYSTEM

(75) Inventors: Miho Maeda, Tokyo (JP); Mitsuru Mochizuki, Tokyo (JP); Taiga Saegusa, Tokyo (JP); Yasushi Iwane, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 28 days.

(21) Appl. No.: 13/266,336

(22) PCT Filed: Apr. 21, 2010

(86) PCT No.: PCT/JP2010/002861
§ 371 (c)(1),
(2), (4) Date: Oct. 26, 2011

(87) PCT Pub. No.: WO2010/125769
PCT Pub. Date: Nov. 4, 2010

(65) Prior Publication Data
US 2012/0044910 A1    Feb. 23, 2012

(30) Foreign Application Priority Data

Apr. 28, 2009  (JP) ................................. 2009-109310
Jun. 19, 2009  (JP) ................................. 2009-146293
Apr. 2, 2010   (JP) ................................. 2010-086194

(51) Int. Cl.
H04L 5/00    (2006.01)
H04W 48/12   (2009.01)

(52) U.S. Cl.
CPC .............. *H04L 5/0005* (2013.01); *H04L 5/001* (2013.01); *H04L 5/0091* (2013.01); *H04W 48/12* (2013.01)

(58) Field of Classification Search
USPC .......................... 370/328, 329, 332; 455/450
See application file for complete search history.

(56) References Cited

U.S. PATENT DOCUMENTS 7,414,985 B1    8/2008  Tedijanto et al.
2002/0142777 A1  10/2002  McGovern et al.
(Continued)

FOREIGN PATENT DOCUMENTS

JP    2011-530966 A    12/2011
JP    2012-506674 A     3/2012
(Continued)

OTHER PUBLICATIONS

3GPP TSG RAN WG1 #56, R1-090860, "Notion of Anchor Carrier in LTE-A," Qualcomm Europe, Total 4 Pages, (Feb. 9-13, 2009).
(Continued)

*Primary Examiner* — Michael Thier
*Assistant Examiner* — Yaotang Wang
(74) *Attorney, Agent, or Firm* — Oblon, McClelland, Maier & Neustadt, L.L.P.

(57) ABSTRACT

A base station which uses either one of a plurality of component carriers individually or uses an aggregate carrier which is an aggregate of the above-mentioned plurality of component carriers to carry out radio communications with a mobile terminal corresponding to the above-mentioned component carrier and also carry out radio communications with a mobile terminal corresponding to the above-mentioned aggregate carrier is provided. The base station notifies a bandwidth of an aggregate carrier which is an aggregate of all of the above-mentioned component carriers, as a bandwidth which the above-mentioned base station uses, to the mobile terminal corresponding to the above-mentioned aggregate carrier. As a result, while an improvement in the transmission rate is provided according to the aggregate carrier, the base station can also support an operation of a mobile terminal corresponding to a component carrier.

10 Claims, 29 Drawing Sheets

(56) References Cited

U.S. PATENT DOCUMENTS

| | | | |
|---|---|---|---|
| 2003/0107998 | A1 | 6/2003 | Mowery et al. |
| 2007/0121546 | A1 | 5/2007 | Zuckerman et al. |
| 2009/0257533 | A1* | 10/2009 | Lindoff et al. ............... 375/344 |
| 2010/0034163 | A1* | 2/2010 | Damnjanovic et al. ....... 370/329 |
| 2010/0091720 | A1* | 4/2010 | Chun et al. .................... 370/329 |
| 2010/0130218 | A1* | 5/2010 | Zhang et al. ................... 455/450 |
| 2010/0222060 | A1* | 9/2010 | Zhang et al. ................... 455/436 |
| 2010/0272017 | A1* | 10/2010 | Terry et al. .................... 370/328 |
| 2010/0285809 | A1* | 11/2010 | Lindstrom et al. ............ 455/450 |
| 2012/0002635 | A1* | 1/2012 | Chung et al. .................. 370/329 |
| 2012/0039256 | A1* | 2/2012 | Kwon et al. ................... 370/328 |
| 2012/0093079 | A1* | 4/2012 | Yuk et al. ...................... 370/328 |

FOREIGN PATENT DOCUMENTS

| | | |
|---|---|---|
| JP | 5518151 B2 | 4/2014 |
| WO | WO 02/23745 A2 | 3/2002 |
| WO | 2010 050504 | 5/2010 |

OTHER PUBLICATIONS

3GPP TS 36.331 V8.4.0, 3$^{rd}$ Generation Partnership Project, Technical Specification Group Radio Access Network, Evolved Universal Terrestrial Radio Access (E-UTRA) Radio Resource Control (RRC), Protocol specification (Release 8), pp. 26-103, (Dec. 2008).

3GPP TS 36.300 V8.6.0, pp. 14-34, (Sep. 2008).

3GPP TSG-RAN WG1 Meeting #49bis, R1-072963, "Signaling of Mbsfn subframe allocation in D-BCH," Nokia Siemens Networks, Nokia, Huawei, Total 3 Pages, (Jun. 25-29, 2007).

3GPP TR R3.020 V0.6.0, 3$^{rd}$ Generation Partnership Project, Technical Specification Group Radio Access Network, Home (e)NodeB, Network aspects (Release 8), pp. 1-53, (May 2008).

3GPP TS 36.304 V8.4.0, pp. 7, 8, 12, 13, 17-20, 26, 27, (Dec. 2008).

3GPP TSG-RAN WG 2 meeting #62, R2-082899, "LS on CSG cell identification," RAN2, pp. 1-2, (May 5-9, 2008).

3GPP TSG-SA1 #42, S1-083461, "LS on HNB/HeNB Open Access Mode," 3GPP SA WG1, 2 Pages, (Oct. 13-17, 2008).

3GPP TR 36.814 V0.4.1, 3$^{rd}$ Generation Partnership Project, Technical Specification Group Radio Access Network, Further Advancements for E-UTRA Physical Layer Aspects (Release 9), pp. 1-31, (Feb. 2009).

3GPP TSG-RAN WG2 Meeting #66, R2-093104, "Carrier aggregation in active mode," Huawei, Total 4 Pages, (May 4-8, 2009).

International Search Report Issued Jun. 1, 2010 in PCT/JP10/002861 Filed Apr. 21, 2010.

U.S. Appl. No. 13/499,737, filed Apr. 2, 2012, Mochizuki, et al.

Office Action issued Nov. 5, 2013 in Japanese Patent Application No. 2012-194229 (with English language translation).

Supplementary European Search Report issued Mar. 31, 2014, in European Patent Application No. 10769470.5.

U.S. Appl. No. 14/298,168, filed Jun. 6, 2014, Mochizuki, et al.

U.S. Appl. No. 14/534,958, filed Nov. 6, 2014, Mochizuki, et al.

Office Action issued Jan. 13, 2015 in Japanese Application No. 2014-075297 (with English language translation).

* cited by examiner

FIG.5
[A]
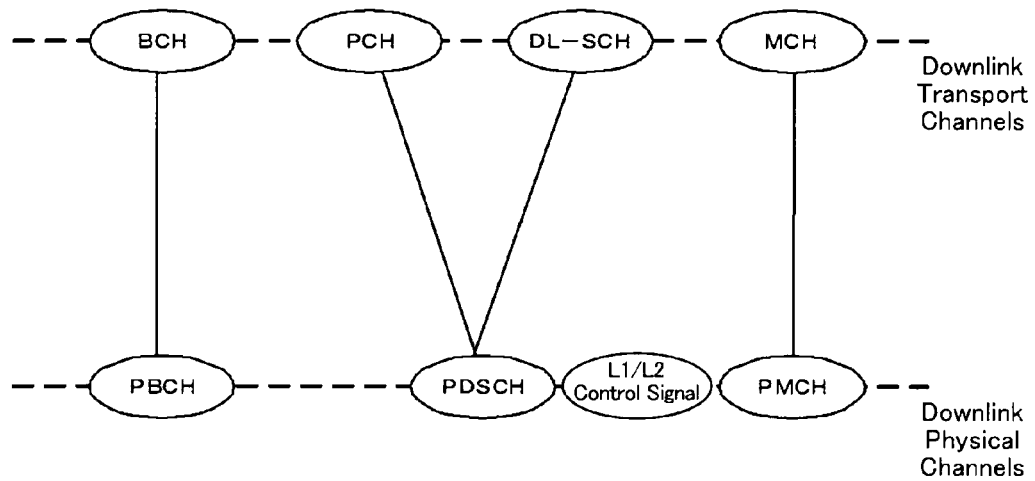
[B]
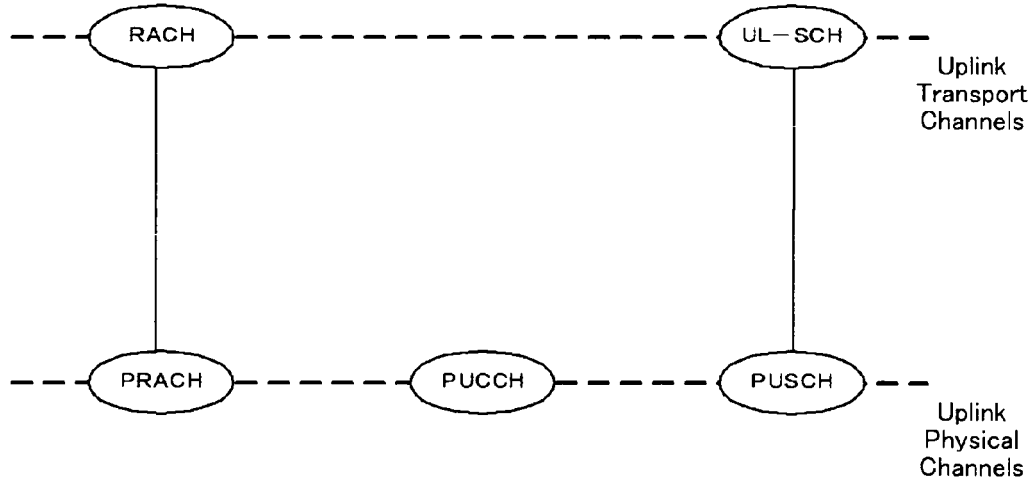

FIG.6
[A]
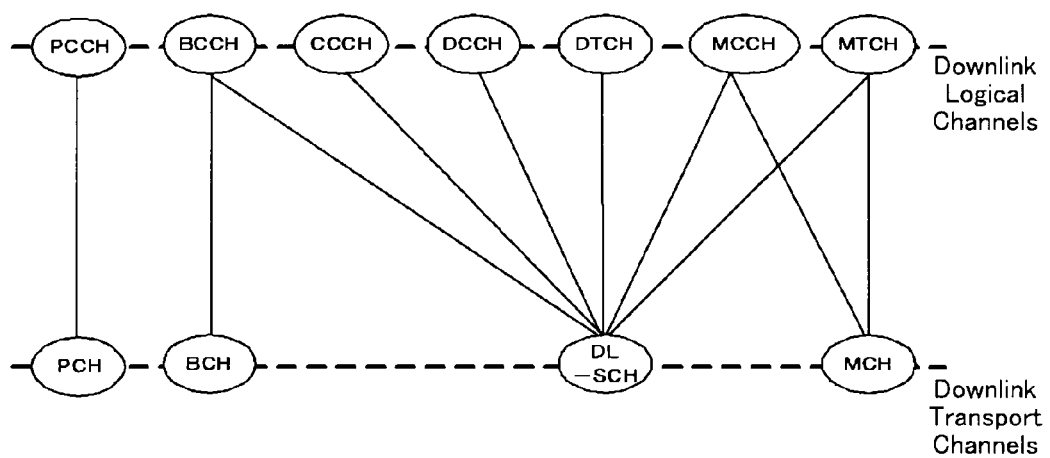
[B]
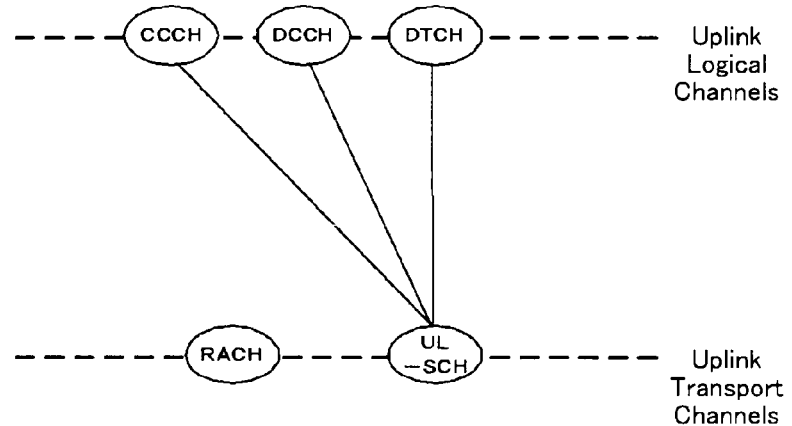

MOBILE COMMUNICATION SYSTEM

FIELD OF THE INVENTION

The present invention relates to a base station that carries out radio communications with a plurality of mobile terminals.

BACKGROUND OF THE INVENTION

Commercial service of a wideband code division multiple access (W-CDMA) system among so-called third-generation communication systems has been offered in Japan since 2001. In addition, high speed down link packet access (HS-DPA) service for achieving higher-speed data transmission using a down link has been offered by adding a channel for packet transmission high speed-downlink shared channel (HS-DSCH)) to the down link (dedicated data channel, dedicated control channel). Further, in order to increase the speed of data transmission in an uplink direction, service of a high speed up link packet access (HSUPA) has been offered. W-CDMA is a communication system defined by the 3rd generation partnership project (3GPP) that is the standard organization regarding the mobile communication system, where the specifications of Release 8 version are produced.

Further, 3GPP is investigating new communication systems referred to as "long term evolution (LTE)" regarding radio areas and "system architecture evolution (SAE)" regarding the overall system configuration including a core network (merely referred to as network as well) as communication systems independent of W-CDMA. In the LTE, an access scheme, radio channel configuration and a protocol are totally different from those of the current W-CDMA (HS-DPA/HSUPA). For example, as to the access scheme, code division multiple access is used in the W-CDMA, whereas in the LTE, orthogonal frequency division multiplexing (OFDM) is used in a downlink direction and single career frequency division multiple access (SC-FDMA) is used in an uplink direction. In addition, the bandwidth is 5 MHz in the W-CDMA, while in the LTE, the bandwidth can be selected from 1.4 MHz, 3 MHz, 5 MHz, 10 MHz, 15 MHz and 20 MHz for each base station. Further, differently from the W-CDMA, circuit switching is not provided but a packet communication system is only provided in the LTE.

The LTE is defined as a radio access network independent of the W-CDMA network because its communication system is configured with a new core network different from a core network (GPRS) of the W-CDMA. Therefore, for differentiation from the W-CDMA communication system, a base station that communicates with a user equipment (UE) and a radio network controller that transmits/receives control data and user data to/from a plurality of base stations are referred to as an E-UTRAN NodeB (eNB) and an evolved packet core (EPC: also referred to as access gateway (aGW)), respectively, in the LTE communication system. Unicast service and evolved multimedia broadcast multicast service (E-MBMS service) are provided in this LTE communication system. The E-MBMS service is broadcast multimedia service, which is merely referred to as MBMS in some cases. Bulk broadcast contents such as news, weather forecast and mobile broadcast are transmitted to a plurality of UEs. This is also referred to as point to multipoint service.

Non-Patent Document 1 describes the current decisions by 3GPP regarding an overall architecture in the LTE system. The overall architecture (Chapter 4 of Non-Patent Document 1) is described with reference to FIG. 1. FIG. 1 is a diagram illustrating the configuration of the LTE communication system. With reference to FIG. 1, the evolved universal terrestrial radio access (E-UTRAN) is composed of one or a plurality of base stations 102, provided that a control protocol (for example, radio resource management (RRC)) and a user plane (for example, packet data convergence protocol (PDCP), radio link control (RLC), medium access control (MAC), and physical layer (PHY)) for a UE 101 are terminated in the base station 102. The base stations 102 perform scheduling and transmission of paging signaling (also referred to as paging messages) notified from a mobility management entity (MME) 103. The base stations 102 are connected to each other by means of an X2 interface. In addition, the base stations 102 are connected to an evolved packet core (EPC) by means of an S1 interface, more specifically, connected to the mobility management entity (MME) 103 by means of an S1_MME interface and connected to a serving gateway (S-GW) 104 by means of an S1_U interface. The MME 103 distributes the paging signaling to multiple or a single base station 102. In addition, the MME 103 performs mobility control of an idle state. When the UE is in the idle state and an active state, the MME 103 manages a list of tracking areas. The S-GW 104 transmits/receives user data to/from one or a plurality of base stations 102. The S-GW 104 serves as a local mobility anchor point in handover between base stations. Moreover, there is provided a PDN gateway (P-GW), which performs per-user packet filtering and UE-ID address allocation.

The current decisions by 3GPP regarding the frame configuration in the LTE system are described in Non-Patent Document 1 (Chapter 5), which are described with reference to FIG. 2. FIG. 2 is a diagram illustrating the configuration of a radio frame used in the LTE communication system. With reference to FIG. 2, one radio frame is 10 ms. The radio frame is divided into ten equally sized sub-frames. The subframe is divided into two equally sized slots. The first and sixth subframes contain a downlink synchronization signal (SS) per each radio frame. The synchronization signals are classified into a primary synchronization signal (P-SS) and a secondary synchronization signal (S-SS). Multiplexing of channels for multimedia broadcast multicast service single frequency network (MBSFN) and for non-MBSFN is performed on a per-subframe basis. Hereinafter, a subframe for MBSFN transmission is referred to as an MBSFN sub-frame. Non-Patent Document 2 describes a signaling example when MBSFN subframes are allocated. FIG. 3 is a diagram illustrating the configuration of the MBSFN frame. With reference to FIG. 3, the MBSFN subframes are allocated for each MBSFN frame. An MBSFN frame cluster is scheduled. A repetition period of the MBSFN frame cluster is allocated.

Non-Patent Document 1 describes the current decisions by 3GPP regarding the channel configuration in the LTE system. It is assumed that the same channel configuration is used in a closed subscriber group (CSG) cell as that of a non-CSG cell. A physical channel (Chapter 5 of Non-Patent Document 1) is described with reference to FIG. 4. FIG. 4 is a diagram illustrating physical channels used in the LTE communication system. With reference to FIG. 4, a physical broadcast channel 401 (PBCH) is a downlink channel transmitted from the base station 102 to the UE 101. A BCH transport block is mapped to four subframes within a 40 ms interval. There is no explicit signaling indicating 40 ms timing. A physical control format indicator channel 402 (PCFICH) is for transmission from the base station 102 to the UE 101. The PCFICH notifies the number of OFDM symbols used for PDCCHs from the base station 102 to the UE 101. The PCFICH is transmitted in each subframe. A physical downlink control channel 403 (PDCCH) is a downlink channel transmitted from the base station 102 to the UE 101. The PDCCH notifies the resource allocation, HARQ information related to DL-SCH (downlink shared channel that is one of the transport channels shown in FIG. 5) and the PCH (paging channel that is one of the transport channels shown in FIG. 5). The PDCCH carries an uplink scheduling grant. The PDCCH carries ACK/Nack that is a response signal to uplink transmission. The PDCCH is referred to as an L1/L2 control signal as well. A physical downlink shared channel 404 (PDSCH) is a downlink channel transmitted from the base station 102 to the UE 101. A DL-SCH (downlink shared channel) that is a transport channel and a PCH that is a transport channel are mapped to the PDSCH. A physical multicast channel 405 (PMCH) is a downlink channel transmitted from the base station 102 to the UE 101. A multicast channel (MCH) that is a transport channel is mapped to the PMCH.

A physical uplink control channel 406 (PUCCH) is an uplink channel transmitted from the UE 101 to the base station 102. The PUCCH carries ACK/Nack that is a response signal to downlink transmission. The PUCCH carries a channel quality indicator (CQI) report. The CQI is quality information indicating the quality of received data or channel quality. In addition, the PUCCH carries a scheduling request (SR). A physical uplink shared channel 407 (PUSCH) is an uplink channel transmitted from the UE 101 to the base station 102. A UL-SCH (uplink shared channel that is one of the transport channels shown in FIG. 5) is mapped to the PUSCH. A physical hybrid ARQ indicator channel 408 (PHICH) is a downlink channel transmitted from the base station 102 to the UE 101. The PHICH carries ACK/Nack that is a response to uplink transmission. A physical random access channel 409 (PRACH) is an uplink channel transmitted from the UE 101 to the base station 102. The PRACH carries a random access preamble.

A downlink reference signal which is a known symbol in a mobile communication system is inserted in the first, third and last OFDM symbols of each slot. The physical layer measurement objects of a UE include, for example, reference symbol received power (RSRP).

The transport channel (Chapter 5 of Non-Patent Document 1) is described with reference to FIG. 5. FIG. 5 is a diagram illustrating transport channels used in the LTE communication system. FIG. 5(*a*) shows mapping between a downlink transport channel and a downlink physical channel. FIG. 5(*b*) shows mapping between an uplink transport channel and an uplink physical channel. A broadcast channel (BCH) is broadcast to the entire coverage of the base station (cell) regarding the downlink transport channel. The BCH is mapped to the physical broadcast channel (PBCH). Retransmission control according to a hybrid ARQ (HARQ) is applied to a downlink shared channel (DL-SCH). Broadcast to the entire coverage of the base station (cell) is enabled. The DL-SCH supports dynamic or semi-static resource allocation. The semi-static resource allocation is also referred to as persistent scheduling. The DL-SCH supports discontinuous reception (DRX) of a UE for enabling the UE to save power. The DL-SCH is mapped to the physical downlink shared channel (PDSCH). The paging channel (PCH) supports DRX of the UE for enabling the UE to save power. Broadcast to the entire coverage of the base station (cell) is required. The PCH is mapped to physical resources such as the physical downlink shared channel (PDSCH) that can be used dynamically for traffic or physical resources such as the physical downlink control channel (PDCCH) of the other control channel. The multicast channel (MCH) is used for broadcast to the entire coverage of the base station (cell). The MCH supports SFN combining of MBMS service (MTCH and MCCH) in multi-cell transmission. The MCH supports semi-static resource allocation. The MCH is mapped to the PMCH.

Retransmission control according to a hybrid ARQ (HARQ) is applied to an uplink shared channel (UL-SCH). The UL-SCH supports dynamic or semi-static resource allocation. The UL-SCH is mapped to the physical uplink shared channel (PUSCH). A random access channel (RACH) shown in FIG. 5(*b*) is limited to control information. There is a collision risk. The RACH is mapped to the physical random access channel (PRACH). The HARQ is described.

The HARQ is the technique for improving the communication quality of a channel by combination of automatic repeat request and forward error correction. The HARQ has an advantage that error correction functions effectively by retransmission even for a channel whose communication quality changes. In particular, it is also possible to achieve further quality improvement in retransmission through combination of the reception results of the first transmission and the reception results of the retransmission. An example of the retransmission method is described. In a case where the receiver fails to successfully decode the received data (in a case where a cyclic redundancy check (CRC) error occurs (CRC=NG)), the receiver transmits "Nack" to the transmitter. The transmitter that has received "Nack" retransmits the data. In a case where the receiver successfully decodes the received data (in a case where a CRC error does not occur (CRC=OK)), the receiver transmits "AcK" to the transmitter. The transmitter that has received "Ack" transmits the next data. Examples of the HARQ system include "chase combining". In chase combining, the same data sequence is transmitted in the first transmission and retransmission, which is the system for improving gains by combining the data sequence of the first transmission and the data sequence of the retransmission. This is based on the idea that correct data is partially included even if the data of the first transmission contains an error, and highly accurate data transmission is enabled by combining the correct portions of the first transmission data and the retransmission data. Another example of the HARQ system is incremental redundancy (IR). The IR is aimed to increase redundancy, where a parity bit is transmitted in retransmission to increase the redundancy by combining the first transmission and retransmission, to thereby improve the quality by an error correction function.

A logical channel (Chapter 6 of Non-Patent Document 1) is described with reference to FIG. 6. FIG. 6 is a diagram illustrating logical channels used in an LTE communication system. FIG. 6(*a*) shows mapping between a downlink logical channel and a downlink transport channel. FIG. 6(*b*) shows mapping between an uplink logical channel and an uplink transport channel. A broadcast control channel (BCCH) is a downlink channel for broadcast system control information. The BCCH that is a logical channel is mapped to the broadcast channel (BCH) or downlink shared channel (DL-SCH) that is a transport channel. A paging control channel (PCCH) is a downlink channel for transmitting paging signals. The PCCH is used when the network does not know the cell location of a UE. The PCCH that is a logical channel is mapped to the paging channel (PCH) that is a transport channel. A common control channel (CCCH) is a channel for transmission control information between UEs and a base station. The CCCH is used in a case where the UEs have no RRC connection with the base station. In downlink, the CCCH is mapped to the downlink shared channel (DL-SCH) that is a transport channel. In uplink, the CCCH is mapped to the uplink shared channel (UL-SCH) that is a transport channel.

A multicast control channel (MCCH) is a downlink channel for point-to-multipoint transmission. The MCCH is a channel used for transmission of MBMS control information for one or several MTCHs from a network to a UE. The MCCH is a channel used only by a UE during reception of the MBMS. The MCCH is mapped to the downlink shared channel (DL-SCH) or multicast channel (MCH) that is a transport channel. A dedicated control channel (DCCH) is a channel that transmits dedicated control information between a UE and a network. The DCCH is mapped to the uplink shared channel (UL-SCH) in uplink and mapped to the downlink shared channel (DL-SCH) in downlink. A dedicate traffic channel (DTCH) is a point-to-point communication channel for transmission of user information to a dedicated UE. The DTCH exists in uplink as well as downlink. The DTCH is mapped to the uplink shared channel (UL-SCH) in uplink and mapped to the downlink shared channel (DL-SCH) in downlink. A multicast traffic channel (MTCH) is a downlink channel for traffic data transmission from a network to a UE. The MTCH is a channel used only by a UE during reception of the MBMS. The MTCH is mapped to the downlink shared channel (DL-SCH) or multicast channel (MCH).

GCI represents a global cell identity. A closed subscriber group (CSG) cell is introduced in the LTE and universal mobile telecommunication system (UMTS). The CSG is described below (Chapter 3.1 of Non-Patent Document 4). The closed subscriber group (CSG) is a cell in which subscribers who are permitted to use are identified by an operator (cell for identified subscribers). The identified subscribers are permitted to access one or more E-UTRAN cells of a public land mobile network (PLMN). One or more E-UTRAN cells in which the identified subscribers are permitted to access are referred to as "CSG cell(s)". Note that access is limited in the PLMN. The CSG cell is part of the PLMN that broadcasts a specific CSG identity (CSG ID, CSG-ID). The members of the authorized subscriber group who have registered in advance access the CSG cells using the CSG-ID that is the access permission information. The CSG-ID is broadcast by the CSG cell or cells. A plurality of CSG-IDs exist in a mobile communication system. The CSG-IDs are used by UEs for making access from CSG-related members easy. 3GPP discusses in a meeting that the information to be broadcast by the CSG cell or cells is changed from the CSG-ID to a tracking area code (TAC). The locations of UEs are traced based on an area composed of one or more cells. The locations are traced for enabling tracing of the locations of UEs and calling (calling of UEs) even in an idle state. An area for tracing locations of UEs is referred to as a tracking area. A CSG whitelist is a list stored in the USIM containing all the CSG IDs of the CSG cells to which the subscribers belong. The whitelist of the UE is provided by a higher layer. By means of this, the base station of the CSG cell allocates radio resources to the UEs.

A "suitable cell" is described below (Chapter 4.3 of Non-Patent Document 4). The "suitable cell" is a cell on which a UE camps to obtain normal service. Such a cell shall fulfill the following: (1) the cell is part of the selected PLMN or the registered PLMN, or part of the PLMN of an "equivalent PLMN list"; and (2) according to the latest information provided by a non-access stratum (NAS), the cell shall further fulfill the following conditions: (a) the cell is not a barred cell; (b) the cell is part of at least one tracking area (TA), not part of "forbidden LAs for roaming", where the cell needs to fulfill (1) above; (c) the cell shall fulfill the cell selection criteria; and (d) for a cell identified as CSG cell by system information (SI), the CSG-ID is part of a "CSG whitelist" of the UE (contained in the CSG whitelist of the UE).

An "acceptable cell" is described below (Chapter 4.3 of Non-Patent Document 4). This is the cell on which a UE camps to obtain limited service (emergency calls). Such a cell shall fulfill all the following requirements. That is, the minimum required set for initiating an emergency call in an E-UTRAN network are as follows: (1) the cell is not a barred cell; and (2) the cell fulfills the cell selection criteria.

3GPP is studying base stations referred to as Home-NodeB (Home-NB, HNB) and Home-eNodeB (Home-eNB, HeNB). HNB/HeNB is a base station for, for example, household, corporation or commercial access service in UTRAN/E-UTRAN. Non-Patent Document 6 discloses three different modes of the access to the HeNB and HNB. Those are an open access mode, a closed access mode and a hybrid access mode. The respective modes have the following characteristics. In the open access mode, the HeNB and HNB are operated as a normal cell of a normal operator. In the closed access mode, the HeNB and HNB are operated as a CSG cell. The CSG cell is a cell where only CSG members are allowed access. In the hybrid access mode, the HeNB and HNB are CSG cells where non-CSG members are allowed access at the same time. In other words, a cell in the hybrid access mode is the cell that supports both the open access mode and the closed access mode.

RELATED ART DOCUMENT

Nonpatent Reference

Nonpatent reference 1: 3GPP TS36.300 V8.6.0 Chapters 4, 5, and 6
Nonpatent reference 2: 3GPP R1-072963
Nonpatent reference 3: TR R3.020 V0.6.0
Nonpatent reference 4: 3GPP TS36.304 V8.4.0 Chapters 3.1, 4.3, 5.2.4.2, 5.2.4.3, 5.2.4.6, 7.1, and 7.2
Nonpatent reference 5: 3GPP R2-082899
Nonpatent reference 6: 3GPP S1-083461
Nonpatent reference 7: TR 36.814 V0.4.1 Chapter 5
Nonpatent reference 8: 3GPP R1-090860
Nonpatent reference 9: 3GPP TS36.331 V8.4.0 Chapter 6.2.2
Nonpatent reference 10: 3GPP R2-093104

SUMMARY OF THE INVENTION

Problems to be Solved by the Invention

It has been considered that in a long term evolution advanced (Long Term Evolution Advanced: LTE-A) system, larger frequency bandwidths than the frequency bandwidths of an LTE system are supported. This support is aimed at an improvement in the transmission rate. It has been discussed in the 3GPP that the frequency bandwidth of an LTE-A system is set to 100 MHz or less.

The frequency usage pattern varies from region to region. Therefore, there can be a region which cannot secure a continuous frequency bandwidth of 100 MHz. It has been further considered that a compatible operation of an LTE-support mobile terminal is implemented in an LTE-A system. In the 3GPP, it has been considered in connection with the compatible operation that a frequency band (carrier) is divided into elements each referred to as a component carrier (component carrier). In the 3GPP, it has been planned that an LTE-support mobile terminal can operate on each of these component carriers. It has been further considered that an improvement is provided in the transmission rate of an LTE-A system by using an aggregate carrier which is created by aggregating (aggregating) component carriers.

It is an object of the present invention to provide a base station which implements an improvement in the transmission rate by complying with an aggregate carrier a while supporting an operation of a mobile terminal corresponding to component carriers.

Means for Solving the Problem

In accordance with the present invention, there is provided a base station which uses either one of a plurality of component carriers individually or uses an aggregate carrier which is an aggregate of the above-mentioned plurality of component carriers to carry out radio communications with a mobile terminal corresponding to the above-mentioned component carrier and also carry out radio communications with a mobile terminal corresponding to the above-mentioned aggregate carrier is provided, in which the base station notifies a bandwidth of an aggregate carrier which is an aggregate of all of the above-mentioned component carriers, as a bandwidth which the above-mentioned base station uses, to the mobile terminal corresponding to the above-mentioned aggregate carrier.

Advantages of the Invention

The mobile terminal in accordance with the present invention can transmit required information correctly by notifying the bandwidth of the aggregate carrier which is an aggregate of all of the component carriers instead of the bandwidth of any component carrier, as the bandwidth which the base station uses, to the mobile terminal. As a result, while an improvement in the transmission rate is provided according to the aggregate carrier, the base station can also support an operation of a mobile terminal corresponding to a component carrier.

BRIEF DESCRIPTION OF THE FIGURES

FIG. 5 is an explanatory drawing explaining the transport channels for use in a communication system using an LTE method;

FIG. 6 is an explanatory drawing explaining logical channels for use in a communication system using an LTE method;

EMBODIMENTS OF THE INVENTION

Embodiment 1

Figure 1:
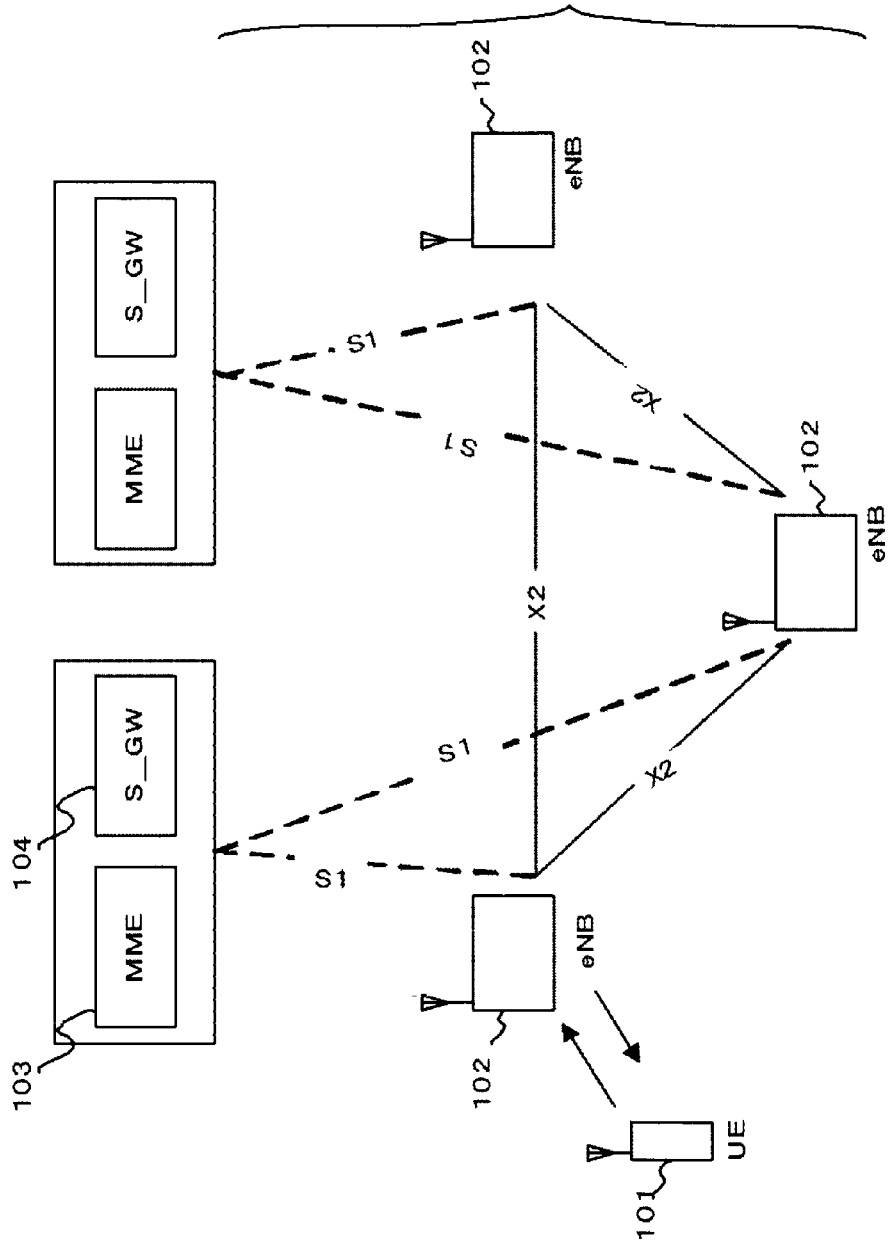
FIG. 1 is an explanatory drawing showing the configuration of a communication system using an LTE method.
Figure 2:
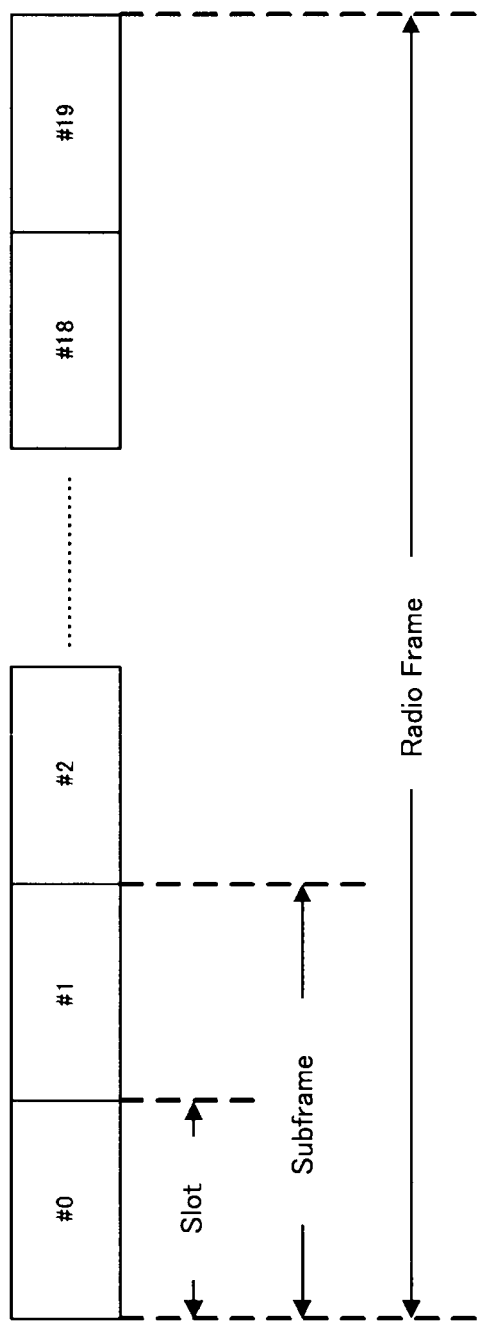
FIG. 2 is an explanatory drawing showing the configuration of a radio frame for use in a communication system using an LTE method.
Figure 3:
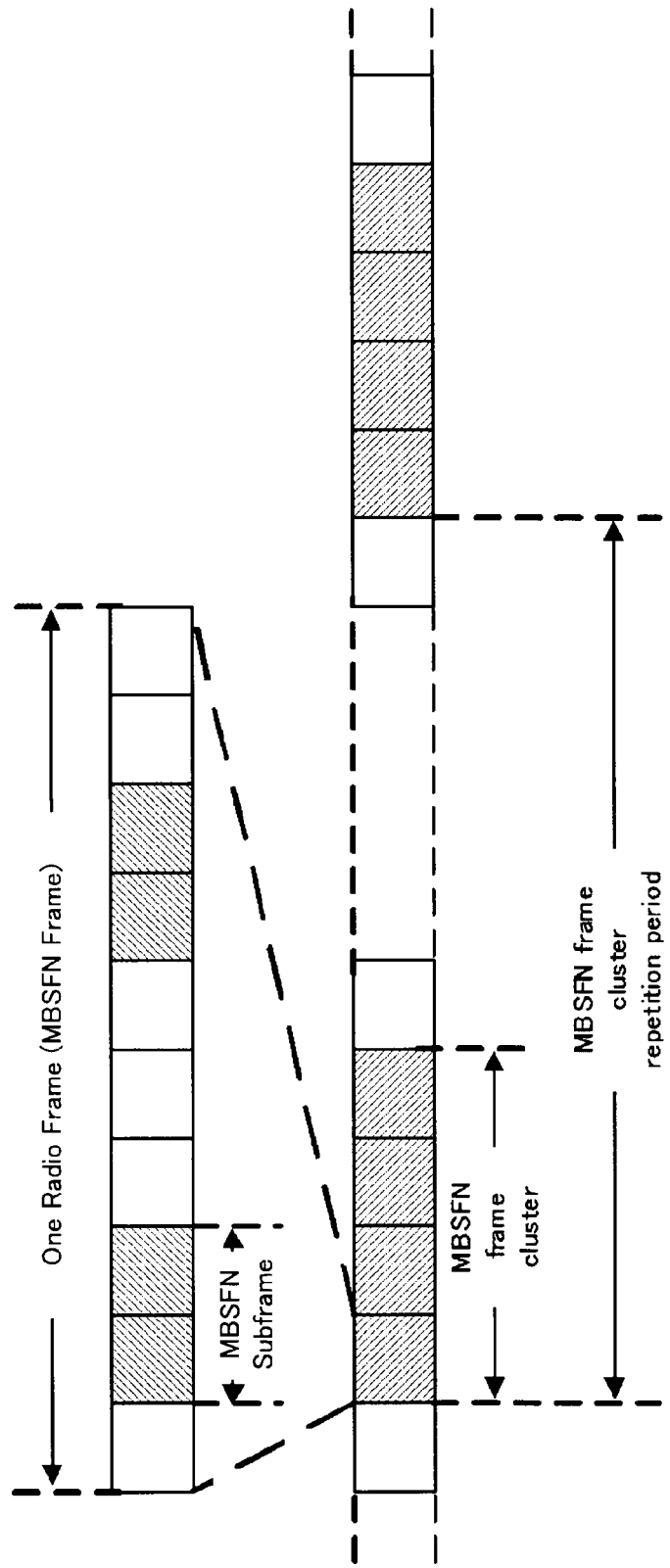
FIG. 3 is an explanatory drawing showing the configuration of an MBSFN (Multimedia Broadcast multicast service Single Frequency Network) frame.
Figure 4:
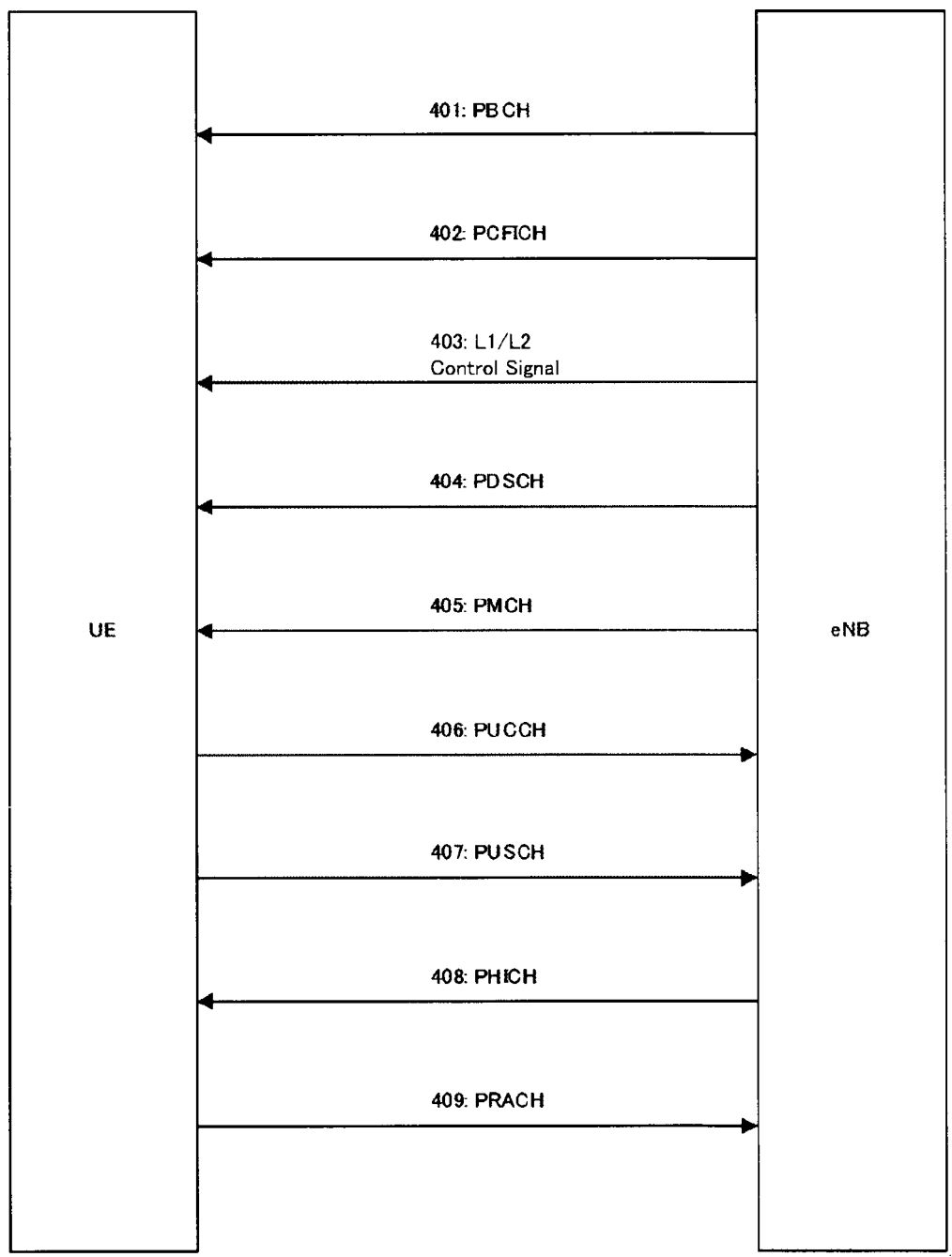
FIG. 4 is an explanatory drawing explaining physical channels for use in a communication system using an LTE method.
Figure 7:
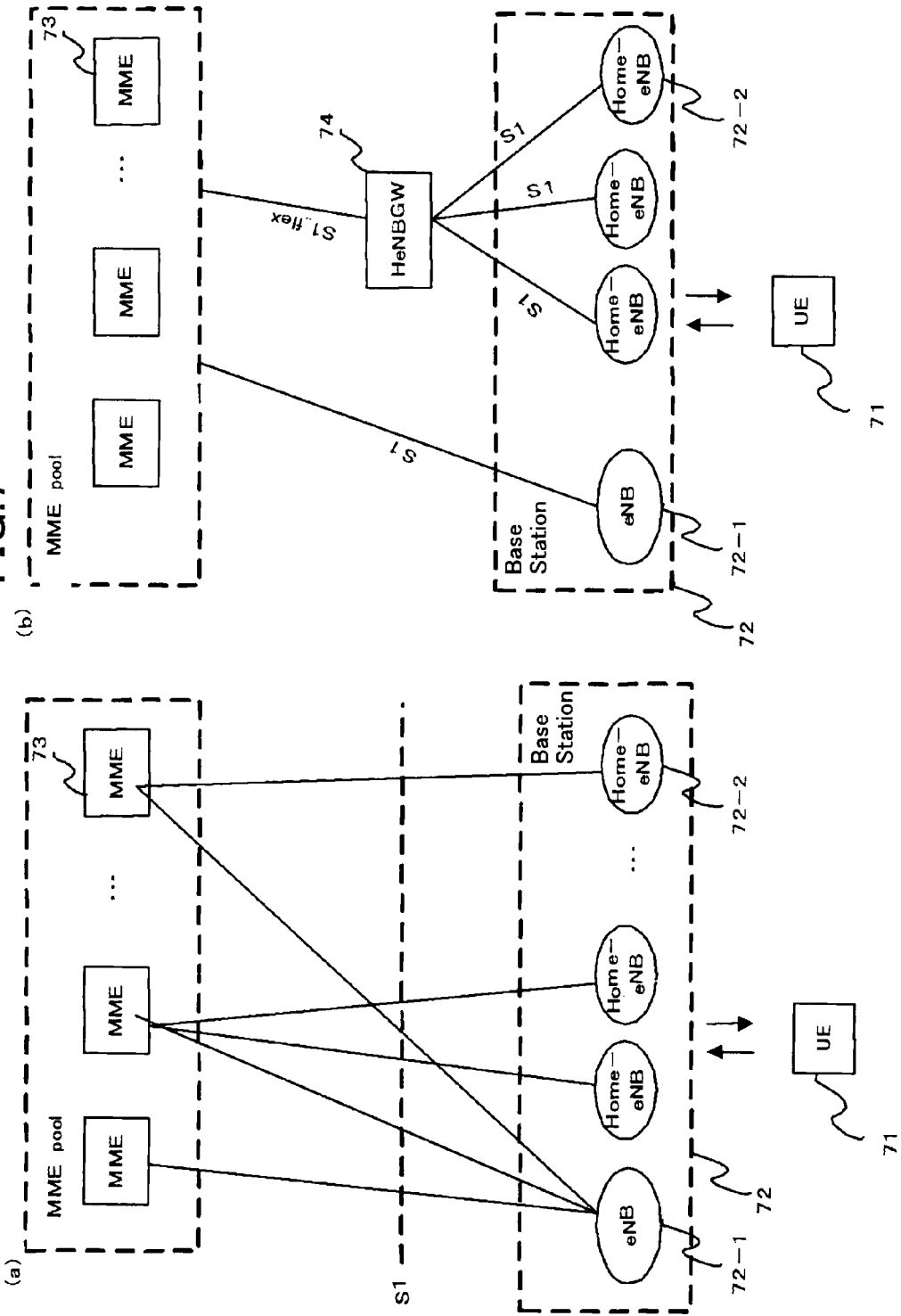
FIG. 7 is a block diagram showing the whole structure of a mobile communication system which has been debated in the 3GPP.

FIG. 7 is a block diagram showing an overall configuration of an LTE mobile communication system, which is currently under discussion of 3GPP. Currently, 3GPP is studying an overall system configuration including closed subscriber group (CSG) cells (Home-eNodeBs (Home-eNB and HeNB) of e-UTRAN, Home-NB (HNB) of UTRAN) and non-CSG cells (eNodeB (eNB) of e-UTRAN, NodeB (NB) of UTRAN, and BSS of GERAN) and, as to e-UTRAN, is proposing the configurations of (a) and (b) of FIG. 7 (Non-Patent Document 1 and Non-Patent Document 3). FIG. 7(a) is now described. A user equipment (UE) 71 performs transmission/reception to/from a base station 72. The base station 72 is classified into an eNB (non-CSG cell) 72-1 and Home-eNBs (CSG cells) 72-2. The eNB 72-1 is connected to MMES 73 through interfaces S1, and control information is communicated between the eNB and the MMES. A plurality of MMES are connected to one eNB. The Home-eNB 72-2 is connected to the MME 73 through the interface S1, and control information is communicated between the Home-eNB and the MME. A plurality of Home-eNBs are connected to one MME.

Next, FIG. 7(b) is described. The UE 71 performs transmission/reception to/from the base station 72. The base station 72 is classified into the eNB (non-CSG cell) 72-1 and the Home-eNBs (CSG cells) 72-2. As in FIG. 7(a), the eNB 72-1 is connected to the MMES 73 through the interface S1, and control information is communicated between the eNB and the MMES. A plurality of MMES are connected to one eNB. While, the Home-eNBs 72-2 are connected to the MMES 73 through a Home-eNB Gateway (HeNBGW) 74. The Home-eNBs are connected to the HeGW through the interfaces S1, and the HeNBGW 74 is connected to the MMEs 73 through an interface S1_flex. One or a plurality of Home-eNBs 72-2 are connected to one HeNBGW 74, and information is communicated therebetween through S1. The HeNBGW 74 is connected to one or a plurality of MMEs 73, and information is communicated therebetween through S1_flex.

With the configuration of FIG. 7(b), one HeNBGW 74 is connected to the Home-eNBs belonging to the same CSG-ID. As a result, in the case where the same information such as registration information is transmitted from the MME 73 to a plurality of Home-eNBs 72-2 belonging to the same CSG-ID, the information is transmitted to the HeNBGW 74 and then transmitted to the plurality of Home-eNBs 72-2, with the result that signaling efficiency is enhanced more compared with the case where the information is directly transmitted to each of the plurality of Home-eNBs 72-2. While, in the case where each Home-eNB 72-2 communicates dedicated information with the MME 73, the information is merely caused to pass through the HeNBGW 74 (to be transparent) without being processed, which allows communication in such a manner that the Home-eNB 72-2 is directly connected to the MME 73.

Figure 8:
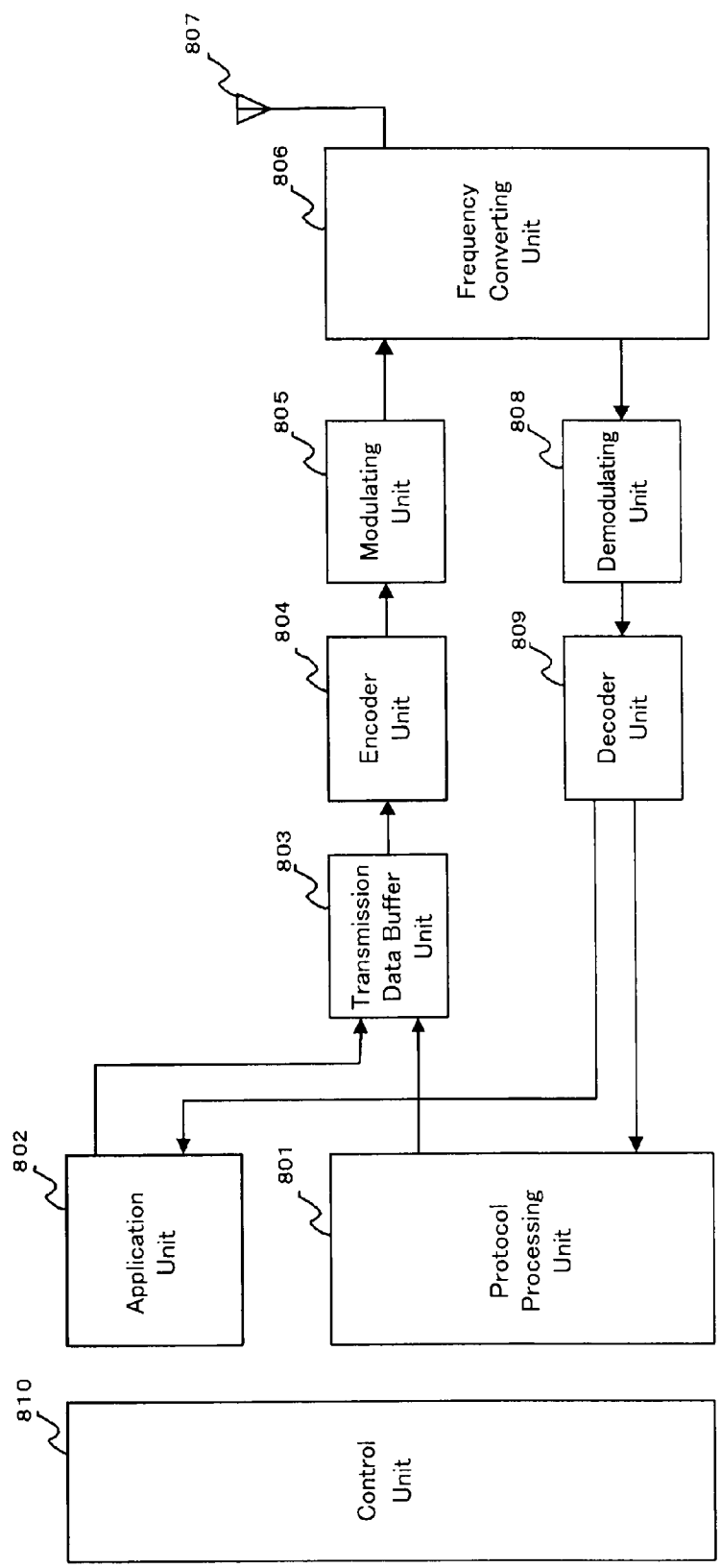
FIG. 8 is a block diagram showing the structure of a mobile terminal 311 in accordance with the present invention.

FIG. 8 is a block diagram showing the configuration of the UE (equipment 71 of FIG. 7) according to the present invention. The transmission process of the UE shown in FIG. 8 is described. First, a transmission data buffer unit 803 stores the control data from a protocol processing unit 801 and the user data from an application unit 802. The data stored in the transmission data buffer unit 803 is transmitted to an encoding unit 804 and is subjected to encoding process such as error correction. There may exist the data output from the transmission data buffer unit 803 directly to a modulating unit 805 without encoding process. The data encoded by the encoding unit 804 is modulated by the modulating unit 805. The modulated data is output to a frequency converting unit 806 after being converted into a baseband signal, and then is converted into a radio transmission frequency. After that, a transmission signal is transmitted from an antenna 807 to a base station 312. A UE 311 executes the reception process as follows. The antenna 807 receives the radio signal from the base station 312. The received signal is converted from a radio reception frequency to a baseband signal by the frequency converting unit 806 and is then demodulated by a demodulating unit 808. The demodulated data is transmitted to a decoding unit 809 and is subjected to decoding process such as error correction. Among the pieces of decoded data, the control data is transmitted to the protocol processing unit 801, while the user data is transmitted to the application unit 802. A series of process of the UE is controlled by a control unit 810. This means that, though not shown, the control unit 810 is connected to the respective units (801 to 809).

Figure 9:
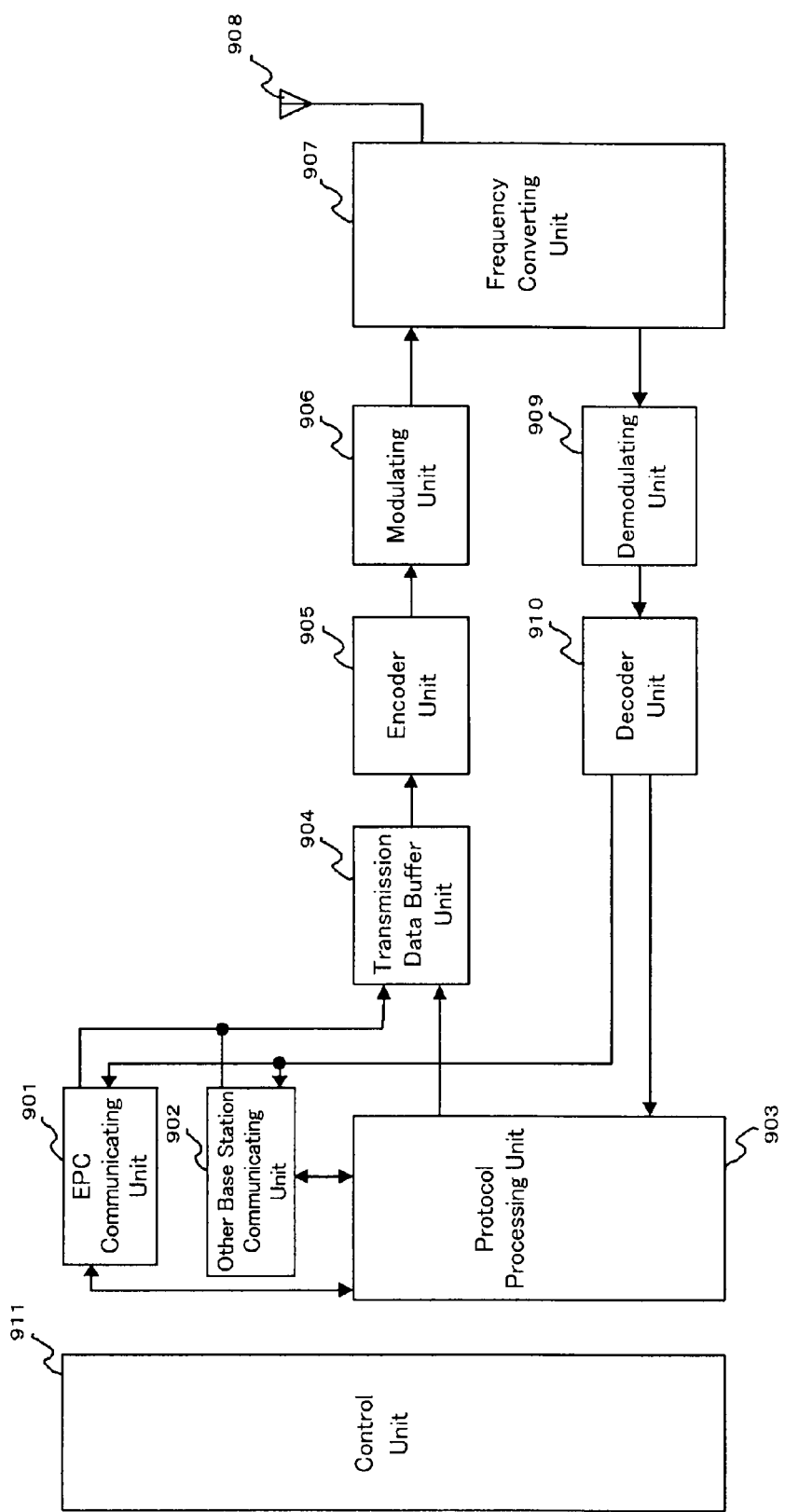
FIG. 9 is a block diagram showing the structure of a base station 312 in accordance with the present invention.

FIG. 9 is a block diagram showing the configuration of the base station (base station 72 of FIG. 7) according to the present invention. The transmission process of the base station shown in FIG. 9 is described. An EPC communication unit 901 performs data transmission/reception between the base station 72 and the EPCs (such as MME 73 and HeNBGW 74). A communication with another base station unit 902 performs data transmission/reception to/from another base station. The EPC communication unit 901 and the communication with another base station unit 902 respectively transmit/receive information to/from the protocol processing unit 903. The control data from the protocol processing unit 903, and the user data and control data from the EPC communication unit 901 and the communication with another base station unit 902 are stored in the transmission data buffer unit 904. The data stored in the transmission data buffer unit 904 is transmitted to an encoding unit 905 and is then subjected to encoding process such as error correction. There may exist the data output from the transmission data buffer unit 904 directly to a modulating unit 906 without encoding process. The encoded data is modulated by the modulating unit 906. The modulated data is output to a frequency converting unit 907 after being converted into a baseband signal, and is then converted into a radio transmission frequency. After that, a transmission signal is transmitted from an antenna 908 to one or a plurality of UEs 71. While, the reception process of the base station 72 is executed as follows. A radio signal from one or a plurality of UEs 311 is received by the antenna 908. The received signal is converted from a radio reception frequency into a baseband signal by the frequency converting unit 907, and is then demodulated by a demodulating unit 909. The demodulated data is transmitted to a decoding unit 910 and is then subjected to decoding process such as error correction. Among the pieces of decoded data, the control data is transmitted to the protocol processing unit 903, EPC communication unit 901, or communication with another base station unit 902, while the user data is transmitted to the EPC communication unit 901 and communication with another base station unit 902. A series of process by the base station 72 is controlled by a control unit 911. This means that, though not shown, the control unit 911 is connected to the respective units (901 to 910).

Figure 10:
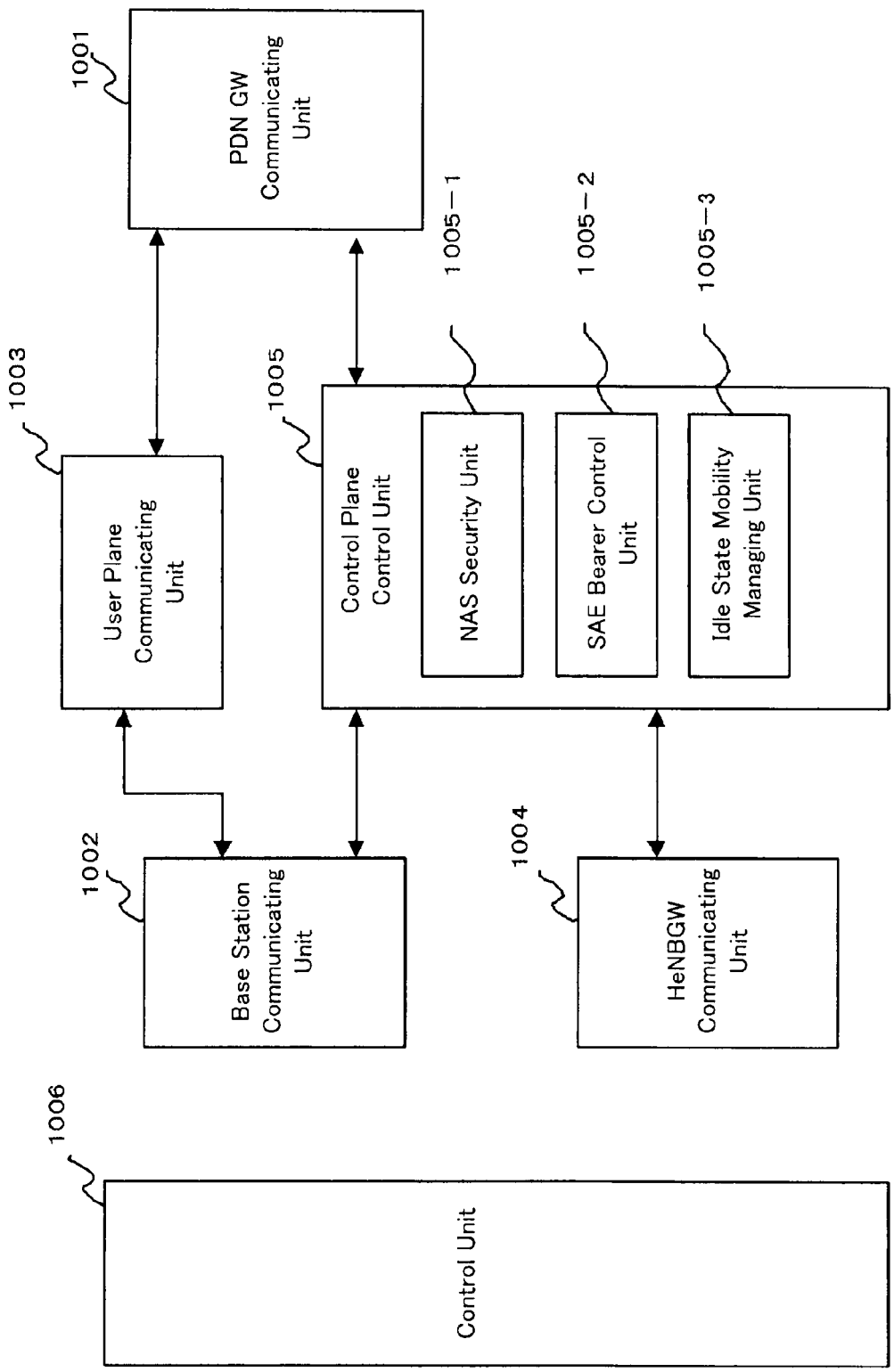
FIG. 10 is a block diagram showing the structure of an MME in accordance with the present invention.

FIG. 10 is a block diagram showing the configuration of a mobility management entity (MME) according to the present invention. A PDN GW communication unit 1001 performs data transmission/reception between an MME 73 and a PDN GW. A base station communication unit 1002 performs data transmission/reception between the MME 73 and the base station 72 through the S1 interface. In the case where the data received from the PDN GW is user data, the user data is transmitted from the PDN GW communication unit 1001 to the base station communication unit 1002 through a user plane processing unit 1003 and is then transmitted to one or a plurality of base stations 72. In the case where the data received from the base station 72 is user data, the user data is transmitted from the base station communication unit 1002 to the PDN GW communication unit 1001 through the user plane processing unit 1003 and is then transmitted to the PDN GW.

In the case where the data received from the PDN GW is control data, the control data is transmitted from the PDN GW communication unit 1001 to a control plane control unit 1005. In the case where the data received from the base station 72 is control data, the control data is transmitted from the base station communication unit 1002 to the control plane control unit 1005. A HeNBGW communication unit 1004 is provided in the case where the HeNBGW 74 is provided, which performs data transmission/reception by the interface (IF) between the MME 73 and the HeNBGW 74 according to an information type. The control data received from the HeNBGW communication unit 1004 is transmitted from the HeN- BGW communication unit 1004 to the control plane control unit 1005. The processing results of the control plane control unit 1005 are transmitted to the PDN GW through the PDN GW communication unit 1001. The processing results of the control plane control unit 1005 are transmitted to one or a plurality of base stations 72 by the S1 interface through the base station communication unit 1002, or are transmitted to one or a plurality of HeNBGWs 74 through the HeNBGW communication unit 1004.

The control plane control unit 1005 includes a NAS security unit 1005-1, an SAE bearer control unit 1005-2 and an idle state mobility managing unit 1005-3, and performs overall process for the control plane. The NAS security unit 1005-1 provides, for example, security of a non-access stratum (NAS) message. For example, the SAE bearer control unit 1005-2 manages a system architecture evolution (SAE) bearer. For example, the idle state mobility managing unit 1005-3 performs mobility management of an idle state (LTE-IDLE state, which is merely referred to as idle as well), generation and control of paging signaling in an idle state, addition, deletion, update and search of one or a plurality of UEs 71 being served thereby, and tracking area (TA) list management. The MME begins a paging protocol by transmitting a paging message to the cell belonging to a tracking area (TA) in which the UE is registered. The idle state mobility managing unit 1005-3 may manage the CSG of the Home-eNBs 72-2 to be connected to the MME, CSG-IDs and a whitelist. In the CSG-ID management, the relationship between a UE corresponding to the CSG-ID and the CSG cell is managed (added, deleted, updated or searched). For example, it may be the relationship between one or a plurality of UEs whose user access registration has been performed with a CSG-ID and the CSG cells belonging to this CSG-ID. In the whitelist management, the relationship between the UE and the CSG-ID is managed (added, deleted, updated or searched). For example, one or a plurality of CSG-IDs with which user registration has been performed by a UE may be stored in the whitelist. Although other part of the MME 73 may perform those types of CSG-related management, through execution by the idle state mobility managing unit 1005-3, the method of using a tracking area code in place of a CSG-ID, which is currently under discussion of 3GPP meeting, can be efficiently performed. A series of process by an MME 313 is controlled by a control unit 1006. This means that, though not shown, the control unit 1006 is connected to the respective units (1001 to 1005).

Figure 11:
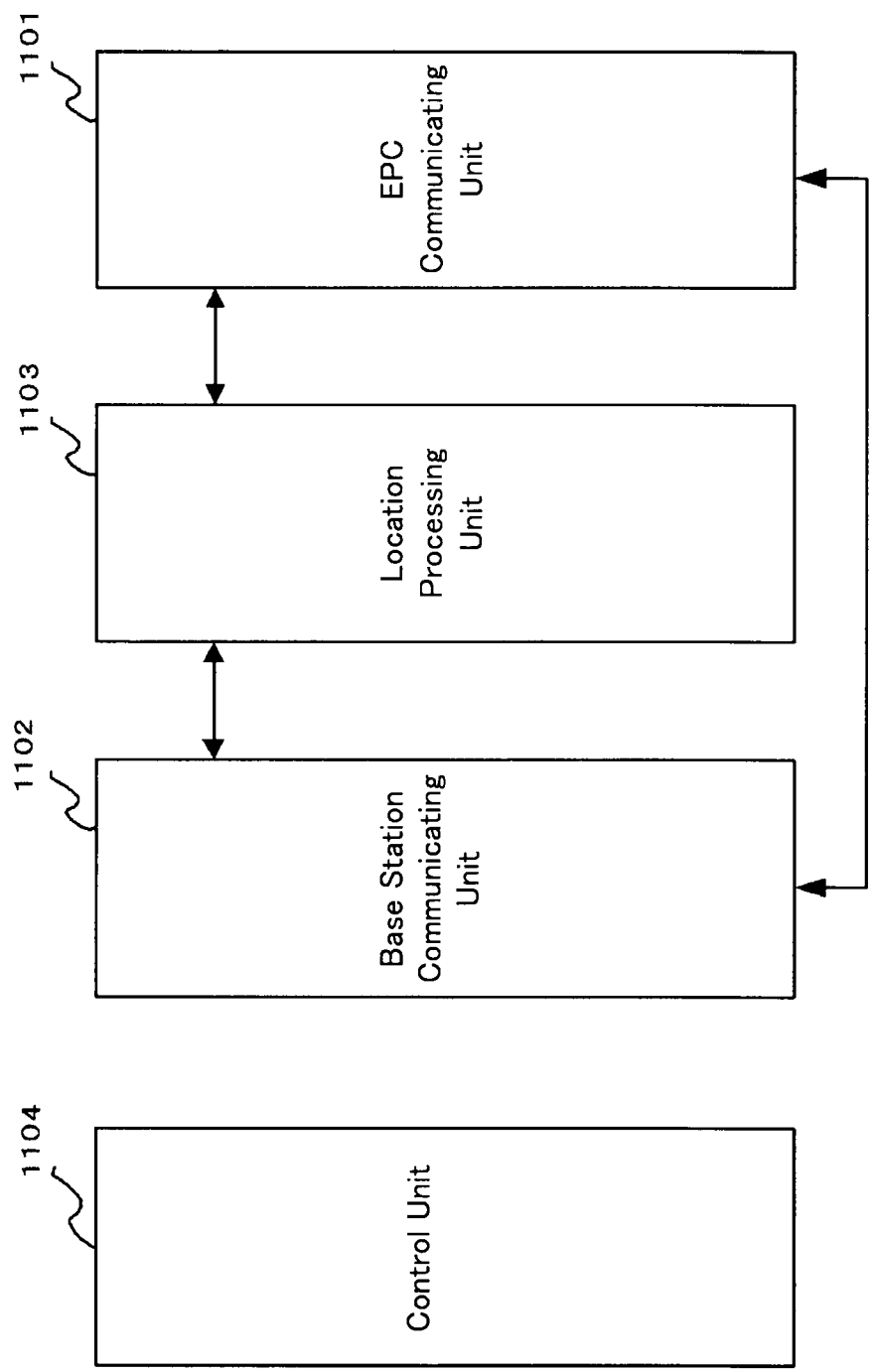
FIG. 11 is a block diagram showing the structure of an HeNBGW in accordance with the present invention.

FIG. 11 is a block diagram showing the configuration of the HeNBGW according to the present invention. An EPC communication unit 1101 performs data transmission/reception between the HeNBGW 74 and the MME 73 by the S1_flex interface. A base station communication unit 1102 performs data transmission/reception between the HeNBGW 74 and the Home-eNB 72-2 by the S1 interface. A location processing unit 1103 performs the process of transmitting, to a plurality of Home-eNBs, the registration information or the like among the data transmitted from the MME 73 through the EPC communication unit 1101. The data processed by the location processing unit 1103 is transmitted to the base station communication unit 1102 and is transmitted to one or a plurality of Home-eNBs 72-2 through the S1 interface. The data only caused to pass through (to be transparent) without requiring the process by the location processing unit 1103 is passed from the EPC communication unit 1101 to the base station communication unit 1102, and is transmitted to one or a plurality of Home-eNBs 72-2 through the S1 interface. A series of process by the HeNBGW 74 is controlled by a control unit 1104. This means that, though not shown, the control unit 1104 is connected to the respective units (1101 to 1103).

Figure 12:
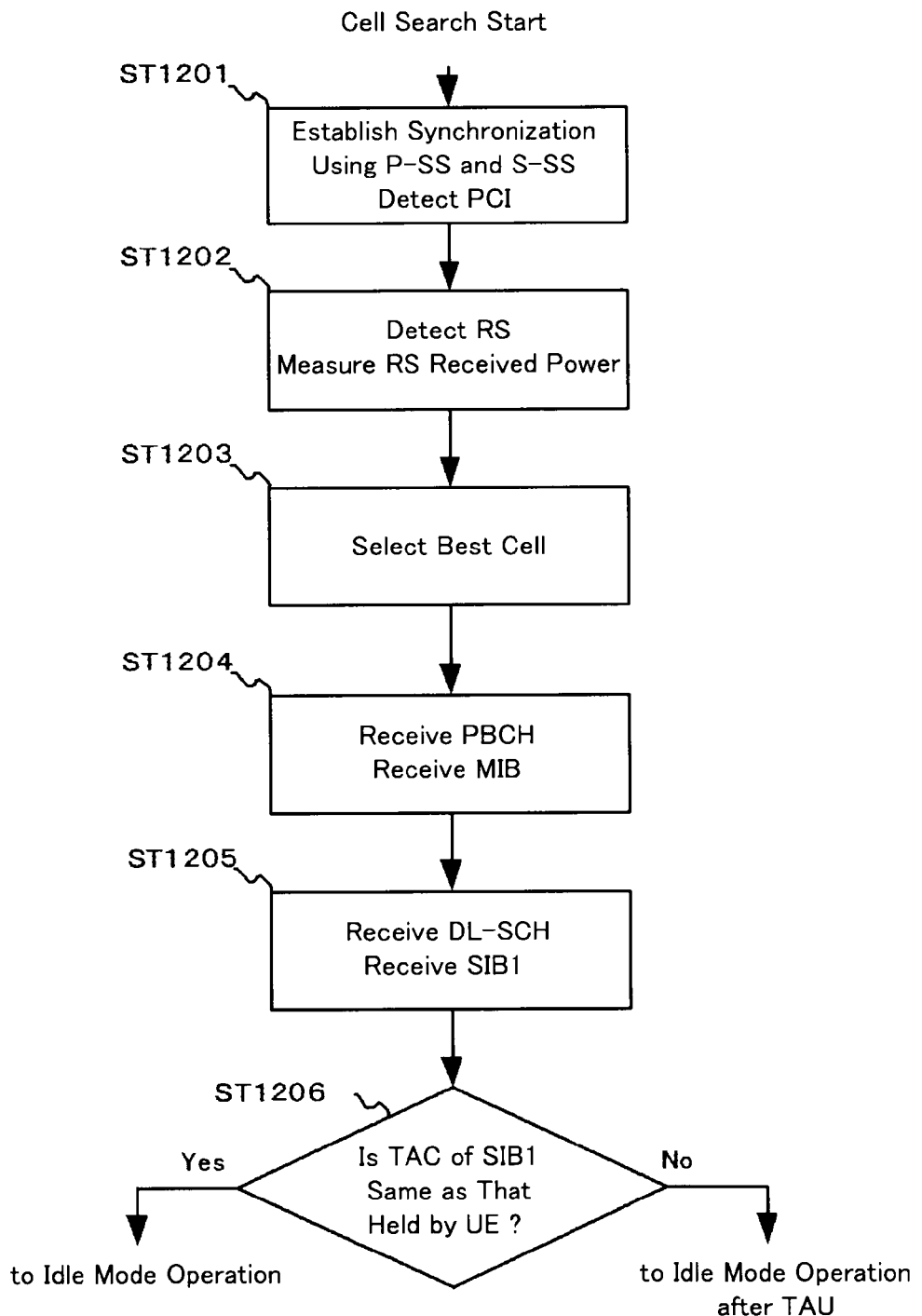
FIG. 12 is a flow chart showing an outline of a cell search made by a mobile terminal (UE) in a communication system which supports an LTE method.

Next, an example of a typical cell search method in a mobile communication system is described. FIG. 12 is a flowchart showing an outline from cell search to idle state operation performed by a user equipment (UE) in the LTE communication system. When the cell search is started by the UE, in Step ST1201, the slot timing and frame timing are synchronized by a primary synchronization signal (P-SS) and a secondary synchronization signal (S-SS) transmitted from a nearby base station. Synchronization codes, which correspond to physical cell identities (PCIs) assigned per cell one by one, are assigned to the synchronization signals (SS) including the P-SS and S-SS. The number of PCIs is currently studied in 504 ways, and these 504 ways are used for synchronization, and the PCIs of the synchronized cells are detected (identified). Next, in Step ST1202, a reference signal RS of the synchronized cells, which is transmitted from the base station per cell, is detected and the received power is measured. The code corresponding to the PCI one by one is used for the reference signal RS, and separation from other cell is enabled by correlation using the code. The code for RS of the cell is derived from the PCI identified in ST1201, which makes it possible to detect the RS and measure the RS received power. Next, in ST1203, the cell having the best RS reception quality (for example, cell having the highest RS received power; best cell) is selected from one or more cells that have been detected up to ST1202. In ST1204, next, the PBCH of the best cell is received, and the BCCH that is the broadcast information is obtained. A master information block (MIB) containing the cell configuration information is mapped on the BCCH on the PBCH. Examples of MIB information include the down link (DL) system bandwidth, the number of transmission antenna and system frame number (SFN).

In 1205, next, the DL-SCH of the cell is received based on the cell configuration information of the MIB, to thereby obtain a system information block (SIB) 1 of the broadcast information BCCH. The SIB1 contains the information regarding access to the cell, information regarding cell selection and scheduling information of other SIB (SIBk; k is an integer equal to or larger than 2). In addition, the SIB1 contains a tracking area code (TAC). In ST1206, next, the UE compares the TAC received in ST1205 with the TAC that has been already possessed by the UE. In a case where they are identical to each other as a result of comparison, the UE enters an idle state operation in the cell. In a case where they are different from each other as a result of comparison, the UE requires a core network (EPC) (including MME and the like) to change a TA through the cell for performing tracking area update (TAU). The core network updates the TA based on an identification number (such as a UE-ID) of the UE transmitted from the UE together with a TAU request signal. The core network updates the TA, and then transmits the TAU accept signal to the UE. The UE rewrites (updates) the TAC (or TAC list) of the UE. After that, the UE enters the idle state operation in the cell.

In an LTE or UMTS (Universal Mobile Telecommunication System), the introduction of a CSG (Closed Subscriber Group) cell has been studied. As mentioned above, a CSG cell is accessible only by one or more mobile terminals which are registered with the CSG cell. The CSG cell and the one or more registered mobile terminals construct one CSG. A specific identification number called a CSG-ID is given to each CSG which is constructed in this way. There can exist a plurality of CSG cells in each CSG. When a mobile terminal is registered with one CSG cell, the mobile terminal can access any other CSG cell in the CSG to which the CSG cell belongs. Furthermore, a Home-eNB for use in an LTE or a Home-NB for use in a UMTS can be used as a CSG cell. Each mobile terminal registered with a CSG cell has a white list. Concretely, the white list is stored in an SIM/USIM of each mobile terminal. CSG information about the CSG cell with which each mobile terminal is registered is written in the white list. Concretely, a CSG-ID, a TAI (Tracking Area Identity), a TAC, etc. can be considered as the CSG information. Either one of the CSG-ID and the TAC is enough as long as the CSG-ID is brought into correspondence with the TAC. As an alternative, only a GCI (Global Cell Identity) is enough as long as the CSG-ID, the TAC, and the GCI are brought into correspondence with one another. As can be seen from the above explanation, a mobile terminal which does not have a white list (in the present invention, includes a mobile terminal whose white list is empty) cannot access any CSG cell, but can access only a non-CSG cell. In contrast, a mobile terminal having a white list can access not only a CSG cell having a CSG-ID with which the mobile terminal is registered, but also a non-CSG cell.

A split of all the PCIs (Physical Cell Identities) into PCIs for CSG cells and PCIs for non-CSG cells (referred to as a PCI split) has been debated in the 3GPP (nonpatent reference 5). It has been further debated that the PIC information about PCI split is broadcast, in system information, from a base station to mobile terminals being served by the base station. A fundamental operation of a mobile terminal using the PCI split will be disclosed hereafter. A mobile terminal which does not have the PIC information about PCI split needs to make a cell search by using all the PCIs (e.g., by using all the 504 codes). In contrast, a mobile terminal which has the above-mentioned PIC information about PCI split can make a cell search by using this PIC information about PCI split.

As disclosed in nonpatent reference 7 and nonpatent reference 8, in the 3GPP, the decision of standards for "long term evolution advanced" (Long Term Evolution Advanced: LTE-A) has been advanced as release 10.

It has been considered that in an LTE-A system larger frequency bandwidths than the frequency bandwidths (transmission bandwidths) of an LTE system are supported.

To this end, it has been considered that an LTE-A-support mobile terminal receives one or more component carriers (component carriers: CCs) simultaneously.

It has been considered that an LTE-A-support mobile terminal has a capability (capability) of carrying out carrier aggregation (carrier aggregation) of reception and transmission on a plurality of component carriers, only reception on a plurality of component carriers or only transmission on a plurality of component carriers simultaneously.

As long as a component carrier has a configuration according to the current 3GPP specifications (release 8), an LTE-support mobile terminal can carry out reception and transmission only on a single component carrier. An LTE-support mobile terminal can translate to a 3GPP release 8-support mobile terminal. More specifically, it can be considered that an LTE-support mobile terminal has compatibility with an LTE-A system in such a way that the LTE-support mobile terminal can operate in the LTE-A system.

A method of notifying system information in an LTE-A system is described in nonpatent reference 8. This reference also discloses single carrier anchor (Single carrier anchor) and multi carrier anchor (Multi carrier anchor) in a carrier aggregation-capable base station.

In the case of single carrier anchor, reception and transmission from and to an LTE-support mobile terminal can be carried out. In the case of single carrier anchor, information showing carriers of multi carrier anchor is notified. In the case of single carrier anchor, system information (System information: SI) according to the current 3GPP specifications (release 8) is broadcast.

On the other hand, also in the case of multi carrier anchor, reception and transmission from and to an LTE-support mobile terminal can be carried out. Also in the case of multi carrier anchor, system information (System information: SI) according to the current 3GPP specifications (release 8) is broadcast. In the case of multi carrier anchor, system information about multiple carriers is broadcast.

A problem to be solved by Embodiment 1 will be explained.

Nonpatent reference 8 discloses that both in the case of single carrier anchor and in the case of multi carrier anchor, system information (SI) according to the current 3GPP specifications (release 8) is broadcast. However, the reference does not disclose any point to note about system information according to the current 3GPP specifications (release 8) which is broadcast on an anchor carrier of an LTE-A system, etc. in either of the case of carrier anchor and the case of multi carrier anchor.

A transmission bandwidth configuration (transmission bandwidth configuration: dl-bandwidth) is included in master information (Master information) among the system information according to the current 3GPP specifications (release 8) (nonpatent reference 9).

Figure 13:
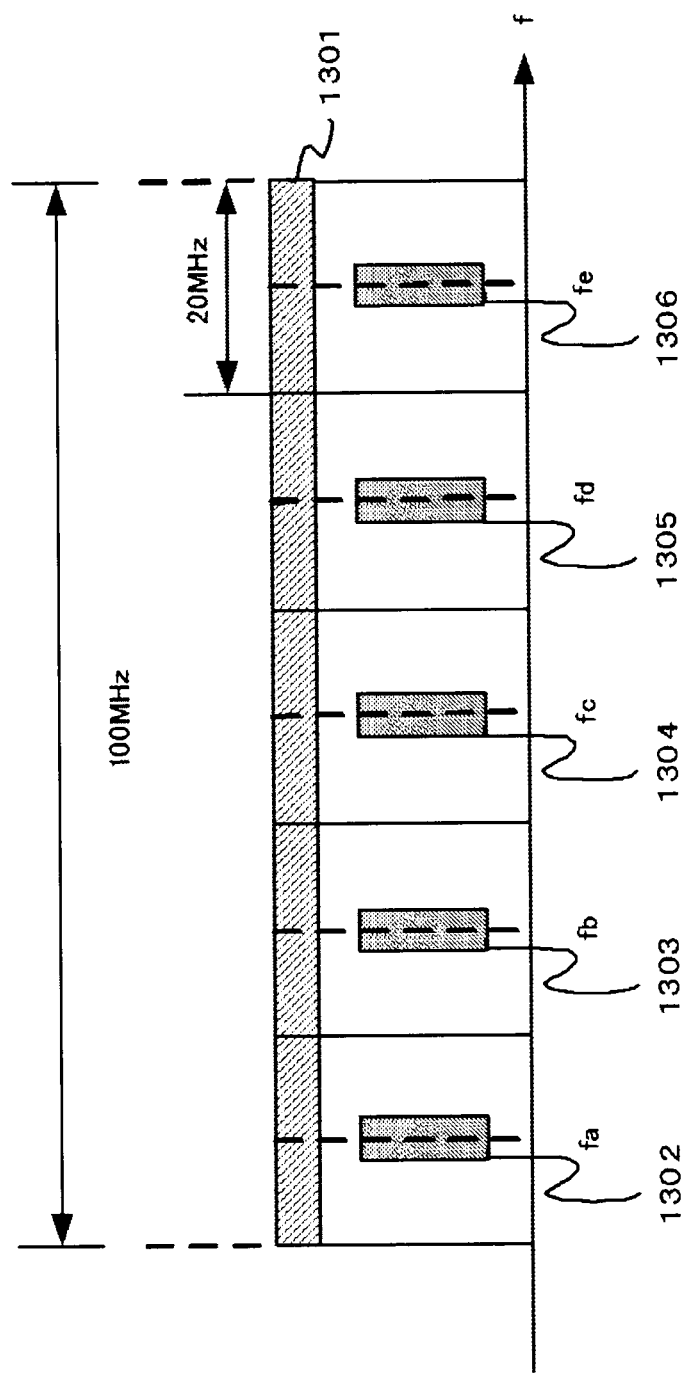
FIG. 13 is a view showing the configuration of a frequency band for use in an LTE-A system.

FIG. 13 is a view showing the structure of the frequency band of an LTE-A system. The problem will be explained with reference to FIG. 13 while a concrete example is shown.

1301 shown in FIG. 13 denotes a physical downlink control channel (PDCCH). Although an example in which a physical downlink control channel is mapped onto each component carrier is shown in FIG. 13, the present invention is not limited to this example. As another example, a case in which there coexist a component carrier onto which a physical downlink control channel is mapped, and a component carrier onto which any physical downlink control channel is not mapped can be considered.

Each of 1302, 1303, 1304, 1305, and 1306 denotes a downlink synchronization signal and a physical broadcast channel (PBCH). Although the example in which a downlink synchronization signal and a physical broadcast channel are mapped onto each component carrier is shown in FIG. 13, the present invention is not limited to this example. As another example, a case in which there coexist a component carrier onto which a downlink synchronization signal and a physical broadcast channel are mapped, and a component carrier onto which any downlink synchronization signal and any physical broadcast channel are not mapped can be considered.

A base station having a bandwidth of 20 MHz for each component carrier and having five component carriers (fa, fb, fc, fd, fe) in an LTE-A system will be considered hereafter. More specifically, a base station having a downlink transmission bandwidth of 100 MHz will be considered. Furthermore, a case in which fa, fc, and fe are provided as single carrier anchors, and fb and fd are provided as multi carrier anchors will be examined. In a 3GPP meeting, it has been debated that the bandwidth of each component carrier is not limited to 20 MHz, but can be 20 MHz or smaller. In a 3GPP meeting, it has been further debated that the downlink transmission bandwidth of a base station in an LTE-A system is not limited to 100 MHz, but can be 100 MHz or smaller.

The base station shown in FIG. 13 has a transmission band of 100 MHz. Therefore, information showing 100 MHz is mapped as the transmission band width included in master information of system information which is broadcast on an anchor carrier.

Next, an operation of selecting the base station shown in FIG. 13 as a cell to camp on the base station, which is performed by an LTE-support mobile terminal, will be examined with reference to FIG. 12. It is assumed that the LTE-support mobile terminal can carry out reception and transmission with fa, fb, fc, fd, and fe of the base station shown in FIG. 13 by using, for example, the technology disclosed by nonpatent reference 8.

It is further assumed that the reception quality of a reference signal RS on the anchor carrier fe is determined to be the best in step ST1203, for example.

The mobile terminal then, in step ST1204, receives the PBCH broadcast on the anchor carrier fe and acquires a BCCH which is broadcast information. An MIB is mapped onto the BCCH on the PBCH. Nonpatent reference 8 discloses that system information according to the current 3GPP specifications (release 8) is broadcast in either of the case of single carrier anchor and the case of multi carrier anchor. Therefore, also on the anchor carrier fe (similarly on each of fa, fb, fc, and fd), the transmission bandwidth is broadcast to the mobile terminal as information of the MIB. Because the transmission bandwidth of the base station shown in FIG. 13 is 100 MHz, information showing 100 MHz is mapped, as the transmission bandwidth, also onto the information of the above-mentioned MIB.

Next, the mobile terminal, in step 1205, receives a PDCCH on the basis of the transmission bandwidth notified thereto via the MIB. The mobile terminal also receives a DL-SCH mapped on a PDSCH (also referred to as scheduling information) according to allocation information about the PDSCH mapped onto the PDCCH, and tries to acquire SIB (System Information Block) 1 which is broadcast information. As shown in above-mentioned step ST1204, the information showing the transmission bandwidth of the base station is mapped onto the MIB information broadcast on the above-mentioned anchor carrier. As a result, the LTE-support mobile terminal cannot know the transmission bandwidth of the component carrier. Therefore, the mobile terminal cannot receive the PDCCH transmitted thereto by using the whole transmission bandwidth of the component carrier. Accordingly, the mobile terminal cannot receive the SIB information included in the BCCH mapped onto the PDSCH. Therefore, there arises a problem that the LTE-support mobile terminal cannot carry out reception and transmission on an anchor carrier. More specifically, there arises a problem that compatibility between an LTE-A system and an LTE system cannot be maintained.

A solution provided in this Embodiment 1 will be shown hereafter.

A base station which can carry out carrier aggregation does not broadcast the information showing the transmission bandwidth thereof as system information about anchor carriers, master information included in system information, or transmission bandwidth information in master information included in system information. In this case, the cell which can carry out carrier aggregation is a base station compatible with an LTE-A system. As an alternative, the cell can be a release 10-support base station. The anchor carrier can be an anchor carrier in the case of single carrier anchor, or can be an anchor carrier in the case of multi carrier anchor. As an alternative, the base station does not broadcast the information showing the transmission bandwidth thereof as system information about a component carrier, master information included in system information, or transmission bandwidth information in master information included in system information.

As an alternative, a base station which can carry out carrier aggregation can broadcast information showing the transmission bandwidth of an anchor carrier as system information about the anchor carrier, master information included in system information, or transmission bandwidth information in master information included in system information. As an alternative, the base station can broadcast the information showing the transmission bandwidth of the anchor carrier as system information about a component carrier, master information included in system information, or transmission bandwidth information in master information included in system information.

Accordingly, the LTE-support mobile terminal can know the transmission bandwidth of the anchor carrier on this anchor carrier. Therefore, the LTE-support mobile terminal can receive the PDCCH transmitted thereto by using the whole transmission bandwidth of the anchor carrier. Therefore, the LTE-support mobile terminal can receive the allocation information about the PDSCH mapped onto the PDCCH. Accordingly, there is provided an advantage of enabling the LTE-support mobile terminal to receive the SIB information included in the BCCH mapped on the PDSCH, and carry out reception and transmission on the anchor carrier.

As an alternative, a base station which can carry out carrier aggregation can broadcast information showing the transmission bandwidth thereof as system information about multiple carriers (aggregate carrier). The system information about multiple carriers can be system information for LTE-A system or system information for release 10.

The receiving bandwidth capability of the LTE-support mobile terminal is 20 MHz. Furthermore, as disclosed in nonpatent reference 7, it has been considered that an LTE-support mobile terminal can carry out reception and transmission only on a single component carrier. Therefore, information showing the transmission bandwidth of a base station compatible with an LTE-A system which can be assumed to be greater than the receiving bandwidth capability of an LTE-support mobile terminal becomes unnecessary for the LTE-support mobile terminal.

The information showing the transmission bandwidth of a base station compatible with an LTE-A system, which is unnecessary for LTE-support mobile terminals, is not notified as the system information about anchor carriers, but is broadcast as the system information about multiple carriers. Therefore, an LTE-support mobile terminal can select not to receive the unnecessary information. As a result, there can be provided an advantage of being able to reduce the amount of data which an LTE-support mobile terminal needs to decode, thereby being able to reduce the processing load. There can be provided another advantage of enabling a base station to broadcast information required for an LTE-A-support mobile terminal as the system information about multiple carriers to all LTE-A-support mobile terminals being served by the base station.

In the above-mentioned solution, each anchor carrier is referred to as a master carrier, a primary (Primary) carrier, or a specific (Specific) carrier.

Figure 14:
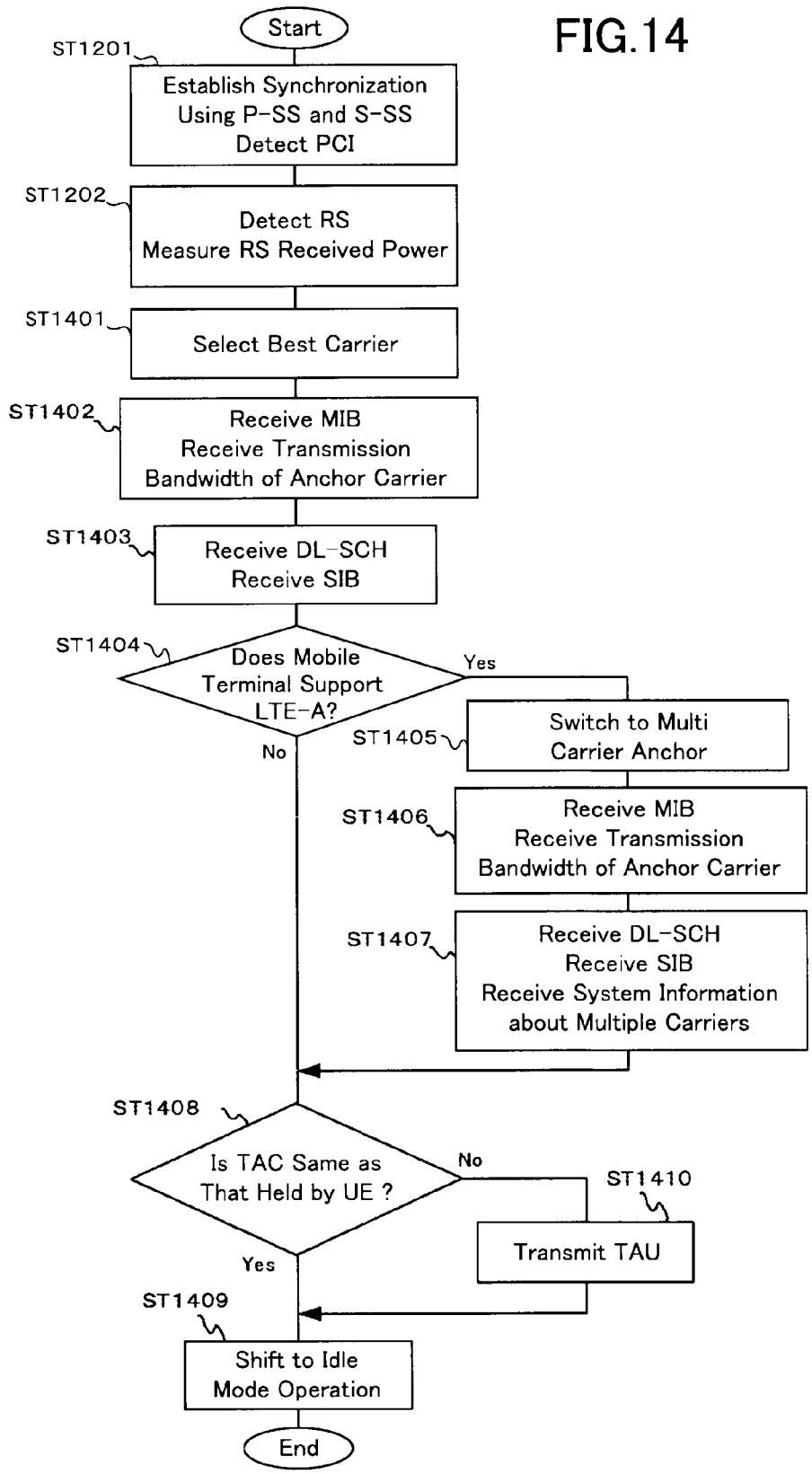
FIG. 14 is a flow chart showing an operation of a mobile terminal in accordance with Embodiment 1.

FIG. 14 is a flowchart showing an example of an operation of a mobile terminal. Because in FIG. 14 the same process or a like process is performed in a step designated by the same reference character string as that shown in FIG. 12, the explanation of each step designated by the same reference character string will be omitted hereafter.

The mobile terminal, in step ST1401, selects an anchor carrier having the highest reception quality (referred to as a best carrier).

The mobile terminal, in step ST1402, receives the PBCH of the best carrier selected in step ST1401, and acquires the BCCH carrying broadcast information. An MIB (Master Information Block) is mapped onto the BCCH. The mobile terminal receives the information showing the transmission bandwidth of the anchor carrier as information of the MIB.

The mobile terminal, in step ST1403, receives the PDCCH of this best carrier on the basis of the transmission bandwidth of the above-mentioned best carrier received in step ST1402, and other MIB information. The mobile terminal receives the SIB (System Information Block) 1 which is broadcast information mapped on the PDSCH according to the scheduling information on the PDCCH which the mobile terminal has acquired at that time. The SIB1 includes information about access, information about a cell selection, and scheduling information about other SIBs (SIBk; k is an integer satisfying k>=2). A TAC (Tracking Area Code) is also included in the SIB1. The mobile terminal also, in step ST1403 or ST1402, receives information about carriers (the information about frequency band) of multi carrier anchor.

The mobile terminal, in step ST1404, determines whether or not the mobile terminal supports LTE-A (can alternatively determine whether or not the mobile terminal supports release 10). When the mobile terminal supports LTE-A, the mobile terminal makes a transition to step ST1405. In contrast, when the mobile terminal does not support LTE-A, the mobile terminal makes a transition to step ST1408. The mobile terminal alternatively, in step ST1404, determines whether or not the mobile terminal supports LTE (can alternatively determine whether or not the mobile terminal supports release 8). When the mobile terminal does not support LTE, the mobile terminal makes a transition to step ST1405. In contrast, when the mobile terminal supports LTE, the mobile terminal makes a transition to step ST1408.

On the basis of the information about carriers in the case of multi carrier anchor which the mobile terminal has received in step ST1402 or ST1403, the mobile terminal, in step ST1405, changes its setting to the frequency of the multi carrier anchor which is shown by the information.

The mobile terminal, in step ST1406, receives the PBCH of the multi carrier anchor to which the mobile terminal has switched in step ST1405, and acquires the BCCH carrying broadcast information. An MIB (Master Information Block) is mapped onto the BCCH. The mobile terminal receives the information showing the transmission bandwidth of the anchor carrier as information of the MIB.

The mobile terminal, in step ST1407, receives the PDCCH of this anchor carrier on the basis of the transmission bandwidth of the anchor carrier received in step ST1406, and other MIB information. The mobile terminal receives the SIB (System Information Block) 1 which is broadcast information mapped on the PDSCH according to the scheduling information on the PDCCH which the mobile terminal has acquired at that time. The SIB1 includes information about access, information about a cell selection, and scheduling information about other SIBs (SIBk; k is an integer satisfying k>=2). A TAC (Tracking Area Code) is also included in the SIB1. The mobile terminal also, in step ST1406 or ST1407, receives the system information about multiple carriers. The mobile terminal receives the information showing the transmission bandwidth of the base station as the system information about multiple carriers. The information showing the transmission bandwidth of the base station is used when carrier aggregation is carried out.

The mobile terminal, in step ST1408, compares the TAC received in step ST1403 or ST1407 with a TAC which the mobile terminal has already held. When the result of the comparison shows that they are the same as each other, the mobile terminal makes a transition to step ST1409. In contrast, when the result of the comparison shows that they are different from each other, the mobile terminal makes a transition to step ST1410.

The mobile terminal, in step ST1409, enters an idle state.

The mobile terminal, in step ST1410, transmits a signal to make a request for change of the TA in order to carry out a TAU (Tracking Area Update) to a core network (Core Network, EPC). MMEs and so on are included in the core network. The core network updates the TA on the basis of an identification number of the mobile terminal (the UE-ID of this mobile terminal or the like), as well as the TAU request signal, which is sent from the mobile terminal. After updating the TA, the core network transmits a TAU receipt signal to the mobile terminal. The mobile terminal rewrites (updates) the TAC (or TAC list) which the mobile terminal holds with the TAC received in step ST1403 or ST1407, or adds the received TAC. After that, the mobile terminal makes a transition to step ST1409, and then enters an idle state.

Another solution in step ST1402 will be disclosed hereafter.

It has been debated in a 3GPP meeting that the bandwidth of a component carrier is not limited to 20 MHz, but is 20 MHz or smaller.

In this solution, the transmission bandwidth of an anchor carrier is set to a fixed value in a base station which can carry out carrier aggregation. In a concrete example, the transmission bandwidth of an anchor carrier is set to 20 MHz in a base station which can carry out carrier aggregation. As an alternative, the transmission bandwidth of a component carrier is set to a fixed value in a base station which can carry out carrier aggregation. In a concrete example, the transmission bandwidth of a component carrier is set to 20 MHz in a base station which can carry out carrier aggregation.

As a result, an LTE-support mobile terminal can know the transmission bandwidth of the anchor carrier from this anchor carrier. Therefore, the mobile terminal can receive the PDCCH transmitted thereto by using the whole transmission bandwidth of the anchor carrier. Therefore, the mobile terminal can receive the allocation information about allocation of the PDSCH mapped on the PDCCH. Accordingly, there is provided an advantage of enabling the LTE-support mobile terminal to receive the SIB information included in the BCCH mapped on the PDSCH, and carry out reception and transmission on the anchor carrier.

At this time, a base station which can carry out carrier aggregation can broadcast the information showing the transmission bandwidth of the base station as the system information about anchor carriers or a component carrier, master information included in system information, or transmission bandwidth information in master information included in system information, like in the case of transmitting system information compliant with release 8. As an alternative, a base station which can carry out carrier aggregation does not have to broadcast the information showing the transmission bandwidth of the base station. As a result, there can be provided an advantage of eliminating the necessity to add a change to methods for use in an LTE system, and preventing increase in the complexity of the mobile communication system.

An example of an operation of a mobile terminal will be explained with reference to FIG. 14. An explanation will be made focusing on a point different from the solution shown in Embodiment 1.

The mobile terminal, in step ST1402, determines whether or not the best carrier selected in step ST1401 belongs to an LTE-A-support base station. When determining that the best carrier belongs to neither a base station which supports LTE-A system or release 10, nor a base station which supports LTE system, the mobile terminal does not use the transmission bandwidth information included in the system information for a subsequent receiving process. The mobile terminal carries out the subsequent receiving process by setting the transmission bandwidth of the component carrier to the above-mentioned fixed value regardless of the transmission bandwidth information received in step ST1402.

In a concrete example of the determination of whether the best carrier belongs to a base station which supports LTE system, each base station notifies a release which the base station supports to mobile terminals being served thereby by using broadcast information (an MIB or the like) of the base station. In this case, only a base station which supports LTE-A (supports release 10) can be constructed in such a way as to notify the release which the base station supports. As a result, there can be provided an advantage of being able to prevent any change to existing LTE systems. Accordingly, each mobile terminal being served by a cell selected thereby can know the release which the cell supports.

Embodiment 1 can provide the following advantages.

By causing an LTE-A-support base station, i.e. a base station which can carry out carrier aggregation to broadcast the transmission bandwidth of an anchor carrier or a component carrier on the anchor carrier or the component carrier, an LTE-support mobile terminal is enabled to know the transmission bandwidth of the anchor carrier or the component carrier. As a result, the LTE-support mobile terminal is enabled to receive the PDCCH on the anchor carrier or the component carrier of the LTE-A-support base station. Therefore, while carrier aggregation is implemented in an LTE-A system, the LTE-support mobile terminal can carry out reception and transmission on the anchor carrier or the component carrier of the LTE-A-support base station. That is, there is provided an advantage of being able to implement the compatibility between an LTE-A system and an LTE system. This provides a further advantage of, even in a case in which the version which the network supports advances from the release 8 of the 3GPP to the release 10 of the 3GPP, and carrier aggregation is therefore implemented, enabling a user who owns a release 8-support (LTE-support) mobile terminal to use the mobile communication system.

In addition, by mapping the transmission bandwidth of an LTE-A-support base station onto the system information about multiple carriers, the amount of data which each LTE-support mobile terminal needs to decode can be reduced. Therefore, it becomes able to implement carrier aggregation for each LTE-A-support mobile terminal without any increase in the processing load. The implementation of carrier aggregation can provide an advantage of improving the transmission rate.

Variant 1 of Embodiment 1

A problem to be solved by Variant 1 of Embodiment 1 will be explained hereafter.

Nonpatent reference 8 discloses that system information according to the current 3GPP specifications (release 8) is broadcast in either of the case of single carrier anchor and the case of multi carrier anchor. However, the reference does not disclose any point to note about system information according to the current 3GPP specifications (release 8) which is broadcast on an anchor carrier in an LTE-A system, etc. Anchor carriers in an LTE-A system include both anchor carriers in the case of single carrier anchor and anchor carriers in the case of multi carrier anchor. A tracking area code (trackingAreaCode) is mapped onto system information block type 1 (SystemInformationBlockType1) included in system information according to the current 3GPP specifications (release 8) (nonpatent reference 9).

A mobile terminal needs to carry out a tracking area update (TAU) process when the TAC which the mobile terminal holds differs from a TAC received thereby.

It can be considered that when an LTE-A-support mobile terminal carries out carrier aggregation while including a plurality of anchor carriers in carriers to be aggregated, tracking area codes differ among the plurality of anchor carriers. The anchor carriers can be component carriers. In this case, the mobile terminal does not know which anchor carrier's TAC the mobile terminal should use for the determination of whether to carry out the TAU. Therefore, there arises a problem that the mobile communication system needs a complicated control operation, such as an operation of determining which anchor carrier's TAC each mobile terminal should use.

A solution provided by variant 1 of this Embodiment 1 will be shown hereafter.

It is assumed that in base stations which can carry out carrier aggregation, a single type of tracking area code (an identical tracking area code) is provided. In other words, it is assumed that in cells which can carry out carrier aggregation, an identical tracking area code is notified as the system information about anchor carriers, SIB information included in system information, or SIB1 information included in system information.

A concrete example will be explained with reference to FIG. 13. An identical tracking area code is broadcast as system information broadcast on a single carrier anchor (fa, fc, fe) or on a multi carrier anchor (fb, fd), SIB information included in the system information, or SIB information included in the system information.

A concrete example will be explained with reference to FIG. 14. A TAC which a mobile terminal receives in step ST1403 is the same as a TAC which the mobile terminal receives in step ST1407.

Variant 1 of Embodiment 1 can provide the following advantages.

Even if an LTE-A-support mobile terminal causes a base station to carry out carrier aggregation while including a plurality of anchor carriers into carriers to be aggregated, the tracking area codes notified on the plurality of anchor carriers do not differ from one another. Therefore, it becomes able to implement the carrier aggregation without increasing the complexity of the TAU control. There can be provided an advantage of improving the transmission rate by virtue of the carrier aggregation.

Variant 1 of Embodiment 1 can be used in combination with Embodiment 1.

Variant 2 of Embodiment 1

Because a problem to be solved by Variant 2 of Embodiment 1 is the same as that shown in Variant 1 of Embodiment 1, the explanation of the problem will be omitted hereafter.

A solution provided by this Variant 2 of Embodiment 1 will be shown hereafter.

In a base station which can carry out carrier aggregation, a tracking area code at the time when the base station carries out carrier aggregation is provided separately from a tracking area code for an anchor carrier. The tracking area code at the time when the base station carries out carrier aggregation can be the same as or different from the tracking area code for the anchor carrier. Furthermore, when a plurality of anchor carriers exist, tracking area codes provided for the plurality of anchor carriers can be the same as or different from one another.

As an alternative, in a base station which can carry out carrier aggregation, a tracking area code at the time when each mobile terminal operates as an LTE-A-support mobile terminal can be provided separately from a tracking area code at the time when each mobile terminal operates as an LTE-support mobile terminal. The tracking area code at the time when each mobile terminal operates as an LTE-A-support mobile terminal can be the same as or different from the tracking area code at the time when each mobile terminal operates as an LTE-support mobile terminal.

The above-mentioned tracking area code newly provided separately is broadcast, as the system information about multiple carriers (aggregate carrier), from a base station which can carry out carrier aggregation.

An LTE-support mobile terminal cannot carry out carrier aggregation. Therefore, the tracking area code at the time of carrying out carrier aggregation is information unnecessary for an LTE-support mobile terminal.

The tracking area code at the time of carrying out carrier aggregation which is information unnecessary for an LTE-support mobile terminal is not notified as the system information about anchor carriers, but is broadcast as the system information about multiple carriers. Therefore, an LTE-support mobile terminal can select not to receive the unnecessary information. As a result, there can be provided an advantage of being able to reduce the amount of data which an LTE-support mobile terminal needs to decode, thereby being able to reduce the processing load. There can be provided another advantage of enabling a base station to broadcast information required for an LTE-A-support mobile terminal as the system information about multiple carriers to all LTE-A-support mobile terminals being served by the base station.

A concrete example will be explained with reference to FIG. 13.

The tracking area code at the time of carrying out carrier aggregation is broadcast, as the system information about multiple carriers broadcast on the anchor carrier (fb, fd) in the case of multi carrier anchor, separately from the tracking area code broadcast on the anchor carrier (fa, fc, fe) in the case of single carrier anchor, or on the anchor carrier (fb, fd) in the case of multi carrier anchor.

In this case, on the anchor carrier (fb, fd) in the case of multi carrier anchor, a tracking area code different from the tracking area code at the time of carrying out carrier aggregation can be broadcast. As a result, there can be provided an advantage of enabling an LTE-support mobile terminal to operate on any one of all the anchor carriers (fa, fb, fc, fd, fe) in the base station regardless of whether the anchor carrier belongs to either the single carrier anchor or the multi carrier anchor.

A concrete example will be explained with reference to FIG. 14. A mobile terminal, in step ST1407, receives the tracking area code at the time of carrying out carrier aggregation, as the system information about multiple carriers, separately from the tracking area code which it has received in step ST1403 or ST1407.

Variant 2 of Embodiment 1 can provide the following advantages in addition to the advantages provided by Variant 1 of Embodiment 1.

There is an MME as an entity which manages a tracking area. According to Variant 2 of Embodiment 1, a tracking area code at the time when each mobile terminal operates as an LTE-A-support mobile terminal can be provided separately from a tracking area code at the time when each mobile terminal operates as an LTE-support mobile terminal. Therefore, it becomes easy to dispose different MMEs both in an LTE-A system and in an LTE system. It therefore becomes easy to newly dispose an MME for LTE-A system without adding any change to MMEs disposed in an existing LTE system. Therefore, there can be provided an advantage of being able to construct a flexible mobile communication system while preventing any change to an existing LTE system.

Variant 2 of Embodiment 1 can be used in combination with Embodiment 1.

Variant 3 of Embodiment 1

A problem to be solved by Variant 3 of Embodiment 1 will be explained hereafter.

Nonpatent reference 8 discloses that system information according to the current 3GPP specifications (release 8) is broadcast in either of the case of single carrier anchor and the case of multi carrier anchor. However, the reference does not disclose any point to note about system information according to the current 3GPP specifications (release 8) which is broadcast on an anchor carrier in an LTE-A system, etc. Anchor carriers in an LTE-A system include both anchor carriers in the case of single carrier anchor and anchor carriers in the case of multi carrier anchor.

In nonpatent reference 4, a paging notification method according to the current 3GPP specifications (release 8) is described as below.

A paging occasion (Paging Occasion: PO) shows a subframe in which a paging identifier (may be referred to as P-RNTI) can exist on a PDCCH in order to notify a paging message showing that a call has occurred. More specifically, a paging occasion specifies a specific subframe to show a timing with which to report the occurrence of a call.

One paging frame (Paging Frame: PF) shows one radio frame. One paging frame includes one or more paging occasions.

There exist three parameters: "IMSI", "T" and "nB" required to derive a PF and a PO.

The IMSI is an identifier of a mobile terminal. The IMSI may be referred to as a UE-ID.

The T is a DRX cycle. The T may be referred to as a discontinuous reception cycle.

The nB is used in order to calculate the generation cycle of a PF, the number of subframes in each of which a PO occurs, and the numbers of the subframes in each of which a PO occurs.

A base station broadcasts T and nB to mobile terminals being served by the base station with them being mapped onto SIB2 included in system information.

According to the current 3GPP specifications (release 8), one, two or four paging occasions can be included in one paging frame.

Each mobile terminal needs to calculate a PF, a PO, and a subframe pattern of subframes for paging occasions on the basis of the received paging associated parameters.

It can be considered that when an LTE-A-support mobile terminal carries out carrier aggregation while including a plurality of anchor carriers in carriers to be aggregated, the paging associated parameters differ among the plurality of anchor carriers. The anchor carriers can be component carriers. In this case, the mobile terminal does not know which anchor carrier's paging associated parameters the mobile terminal should use. Therefore, there arises a problem that the mobile communication system needs a complicated control operation, such as an operation of determining which anchor carrier's paging associated parameters each mobile terminal should use.

A solution provided by this Variant 2 of Embodiment 1 will be shown hereafter.

It is assumed that in base stations which can carry out carrier aggregation, a single set of paging associated parameters (identical paging related parameters) is provided. In other words, it is assumed that in cells which can carry out carrier aggregation, identical paging associated parameters are notified as the system information about anchor carriers, SIB information included in system information, or SIB2 information included in system information.

A concrete example will be explained with reference to FIG. 13. Identical paging associated parameters are broadcast as system information broadcast on a single carrier anchor (fa, fc, fe) or on a multi carrier anchor (fb, fd), SIB information included in the system information, or SIB2 information included in the system information.

As a result, in base stations which can carry out carrier aggregation, a single type of PF (an identical PF), a single type of PO (an identical PO), and a single type of subframe pattern of subframes for paging occasions (an identical subframe pattern) are provided.

A concrete example will be explained with reference to FIG. 14. Paging associated parameters which a mobile terminal receives in step ST1403 are the same as paging associated parameters which the mobile terminal receives in step ST1407.

Variant 2 of Embodiment 1 can provide the following advantages.

Even if an LTE-A-support mobile terminal causes a base station to carry out carrier aggregation while including a plurality of anchor carriers into carriers to be aggregated, the paging associated parameters notified on the plurality of anchor carriers do not differ from one another. Therefore, it becomes able to implement the carrier aggregation without increasing the complexity of the paging process. There can be provided an advantage of improving the transmission rate by virtue of the carrier aggregation.

Variant 3 of Embodiment 1 can be used in combination with Embodiment 1, Variant 1 of Embodiment 1, or Variant 2 of Embodiment 1.

Variant 4 of Embodiment 1

Because a problem to be solved by Variant 4 of Embodiment 1 is the same as that shown in Variant 3 of Embodiment 1, the explanation of the problem will be omitted hereafter.

A solution provided by Variant 4 of this Embodiment 1 will be shown hereafter.

In a base station which can carry out carrier aggregation, paging associated parameters at the time of carrying out carrier aggregation are provided separately from paging associated parameters for anchor carriers. The paging associated parameters at the time of carrying out carrier aggregation can be the same as or different from the paging associated parameters for anchor carriers. Furthermore, when a plurality of anchor carriers exist, paging associated parameters for each of the plurality of anchor carriers can be the same as or different from those for any other one of the plurality of anchor carriers.

As a result, in base stations which can carry out carrier aggregation, PFs, POs, and subframe patterns of subframes for paging occasions of the plurality of anchor carriers can differ from one another.

As an alternative, in a base station which can carry out carrier aggregation, paging associated parameters at the time when each mobile terminal operates as an LTE-A-support mobile terminal can be provided separately from paging associated parameters at the time when each mobile terminal operates as an LTE-support mobile terminal. The paging associated parameters at the time when each mobile terminal operates as an LTE-A-support mobile terminal can be the same as or different from the paging associated parameters at the time when each mobile terminal operates as an LTE-support mobile terminal.

The above-mentioned paging associated parameters newly provided separately are broadcast, as the system information about multiple carriers (aggregate carrier), from a base station which can carry out carrier aggregation.

An LTE-support mobile terminal cannot carry out carrier aggregation. Therefore, the paging associated parameters at the time of carrying out carrier aggregation are information unnecessary for an LTE-support mobile terminal.

The paging associated parameters at the time of carrying out carrier aggregation which are information unnecessary for an LTE-support mobile terminal are not notified as the system information about anchor carriers, but are broadcast as the system information about multiple carriers. Therefore, an LTE-support mobile terminal can select not to receive the unnecessary information. As a result, there can be provided an advantage of being able to reduce the amount of data which an LTE-support mobile terminal needs to decode, thereby being able to reduce the processing load. There can be provided another advantage of enabling a base station to broadcast information required for an LTE-A-support mobile terminal as the system information about multiple carriers to all LTE-A-support mobile terminals being served by the base station.

A concrete example will be explained with reference to FIG. 13.

The paging associated parameters at the time of carrying out carrier aggregation are broadcast, as the system information about multiple carriers broadcast on the anchor carrier (fb, fd) in the case of multi carrier anchor, separately from the paging associated parameters broadcast on the anchor carrier (fa, fc, fe) in the case of single carrier anchor, or on the anchor carrier (fb, fd) in the case of multi carrier anchor.

In this case, on the anchor carrier (fb, fd) in the case of multi carrier anchor, paging associated parameters different from the paging associated parameters at the time of carrying out carrier aggregation can be broadcast. As a result, there can be provided an advantage of enabling an LTE-support mobile terminal to operate on any one of all the anchor carriers (fa, fb, fc, fd, fe) in the base station regardless of whether the anchor carrier belongs to either the single carrier anchor or the multi carrier anchor.

A concrete example will be explained with reference to FIG. 14. A mobile terminal, in step ST1407, receives the paging associated parameters at the time of carrying out carrier aggregation, as the system information about multiple carriers, separately from the paging associated parameters which it has received in step ST1403 or ST1407.

Variant 4 of Embodiment 1 can provide the following advantages in addition to the advantages provided by Variant 3 of Embodiment 1.

An LTE-support mobile terminal can operate only from a single component carrier. Therefore, it is also considered that the number of mobile terminals being served by a base station differs greatly for each component carrier. In this Variant 4 of Embodiment 1, when a plurality of anchor carriers exist, the paging associated parameters of the plurality of anchor carriers can differ from one another. Therefore, as compared with Variant 3 of Embodiment 1, it becomes able to adjust the paging associated parameters according to the number of mobile terminals being served by a base station in the mobile communication system, and more flexible control can be implemented. Therefore, there can be provided an advantage of being able to construct a flexible mobile communication system while preventing any change to an existing LTE system.

Variant 4 of Embodiment 1 can be used in combination with Embodiment 1, Variant 1 of Embodiment 1, or Variant 2 of Embodiment 1.

Embodiment 2

A problem to be solved by Embodiment 2 will be explained.

Nonpatent reference 4 describes a paging notification method provided in the current 3GPP specifications (release 8), as will be shown below.

A paging occasion (PO) shows a subframe in which a paging identifier (may be referred to as P-RNTI) can exist on a PDCCH in order to notify a paging message showing that a call has occurred. More specifically, a paging occasion specifies a specific subframe to show a timing with which to report the occurrence of a call.

One paging frame (PF) shows one radio frame. One paging frame includes one or more paging occasions.

There exist three parameters: "IMSI", "T" and "nB" required to derive a PF and a PO.

The IMSI is an identifier of a mobile terminal. The IMSI may be referred to as a UE-ID.

The T is a DRX cycle. The T may be referred to as a discontinuous reception cycle.

The nB is used in order to calculate the generation cycle of a PF, the number of subframes in each of which a PO occurs, and the numbers of the subframes in each of which a PO occurs.

A base station broadcasts T and nB to mobile terminals being served by the base station with them being mapped onto SIB2 included in system information.

According to the current 3GPP specifications (release 8), one, two or four paging occasions can be included in one paging frame.

As disclosed in nonpatent reference 7 and nonpatent reference 8, it has been considered that in an LTE-A system larger frequency bandwidths than the frequency bandwidths (transmission bandwidths) of an LTE system are supported.

It can be considered that as the frequency bandwidths are widened, an LTE-A-support base station has a larger number of mobile terminals being served thereby than an LTE-support base station. When the types of paging occasions are the same as each other even though the number of mobile terminals being served by an LTE-A-support base station and placed in an idle state becomes large, the number of mobile terminals each of which monitors the presence or absence of a P-RNTI on the PDCCH with the same paging occasion increases.

When a mobile terminal determines there is a P-RNTI, the mobile terminal monitors a PCH on a PDSCH. An accurate identifier of the mobile terminal becomes known on the PCH.

More specifically, as the number of mobile terminals each of which monitors the presence or absence of a P-RNTI on the PDCCH with the same paging occasion increases, there arises a problem that a mobile terminal has a high probability of determining that there is a P-RNTI on the PDCCH even though the paging is destined for another mobile terminal, and monitoring the PCH on the PDSCH. This results in a problem of increase in the power consumption of the mobile terminal.

Furthermore, when a paging occurs with the same timing in mobile terminals each of which monitors the presence or absence of a P-RNTI on the PDCCH with the same paging occasion, a notification of the paging to any one of the mobile terminals is made, and a notification of the paging of any other mobile terminal is placed in a standby mode.

More specifically, as the number of mobile terminals each of which monitors whether or not there is a P-RNTI on the PDCCH with the same paging occasion increases, there arises a problem that the probability that a paging occurs with the same timing for mobile terminals each of which monitors the presence or absence of a P-RNTI on the PDCCH with the same paging occasion increases. This results in a problem of increase in the control delay in the whole mobile communication system.

A solution provided by this Embodiment 2 will be shown hereafter.

In a base station which can carry out carrier aggregation, the number of paging occasions which can be included in one paging frame is increased as compared with that in a base station which cannot carry out carrier aggregation. A base station which can carry out carrier aggregation can be an LTE-A system-support base station or a release 10-support base station. A base station which cannot carry out carrier aggregation can be an LTE system-support base station or a release 8-support base station. In a concrete example, the number of subframes included in a subframe pattern for paging occasions included in one paging frame is increased.

According to this embodiment, a larger value than current possible values of the nB is introduced in the concrete example. Accordingly, the number of paging occasions included in one paging frame is increased.

On the other hand, each radio frame is divided into ten equal-sized subframes (sub-frames). Therefore, even if the number of paging occasions included in one paging frame is increased to become larger than 10, it becomes impossible to assign all the paging occasions to the different subframes, respectively. More specifically, even if the number of paging occasions included in one paging frame is increased to become larger than 10, it becomes impossible to assign all the paging occasions to the different subframes, respectively, when actually mapping all the paging occasions onto the subframes. Because in this case it is impossible to map the pagings onto the different subframes, respectively, this case offers no solution to the problem. Furthermore, when a base station broadcasts a large value, as the nB, to mobile terminals, a large number of bits is consumed for the broadcasting, and there is a problem in the effective use of radio resources.

Therefore, in accordance with this embodiment, a larger value than the possible values of the nB which are defined in the current 3GPP specifications (release 8) is introduced in the concrete example with its maximum upper limit being set to "10T". As a result, there can be provided an advantage of being able to increase the number of paging occasions included in one paging frame while preventing increase in the amount of information of the nB provided as broadcast information.

In the concrete example, the upper limit "4T" of the currently-defined possible values of the nB: "4T, 2T, T, T/2, T/4, T/8, T/16, T/32" is changed to "5T", "6T", "7T", "8T", "9T", or "10T".

Furthermore, another solution lies in increasing the number of paging frames which can be generated during DRX which is a cycle in which whether or not a paging occurs is checked to see.

Figure 15:
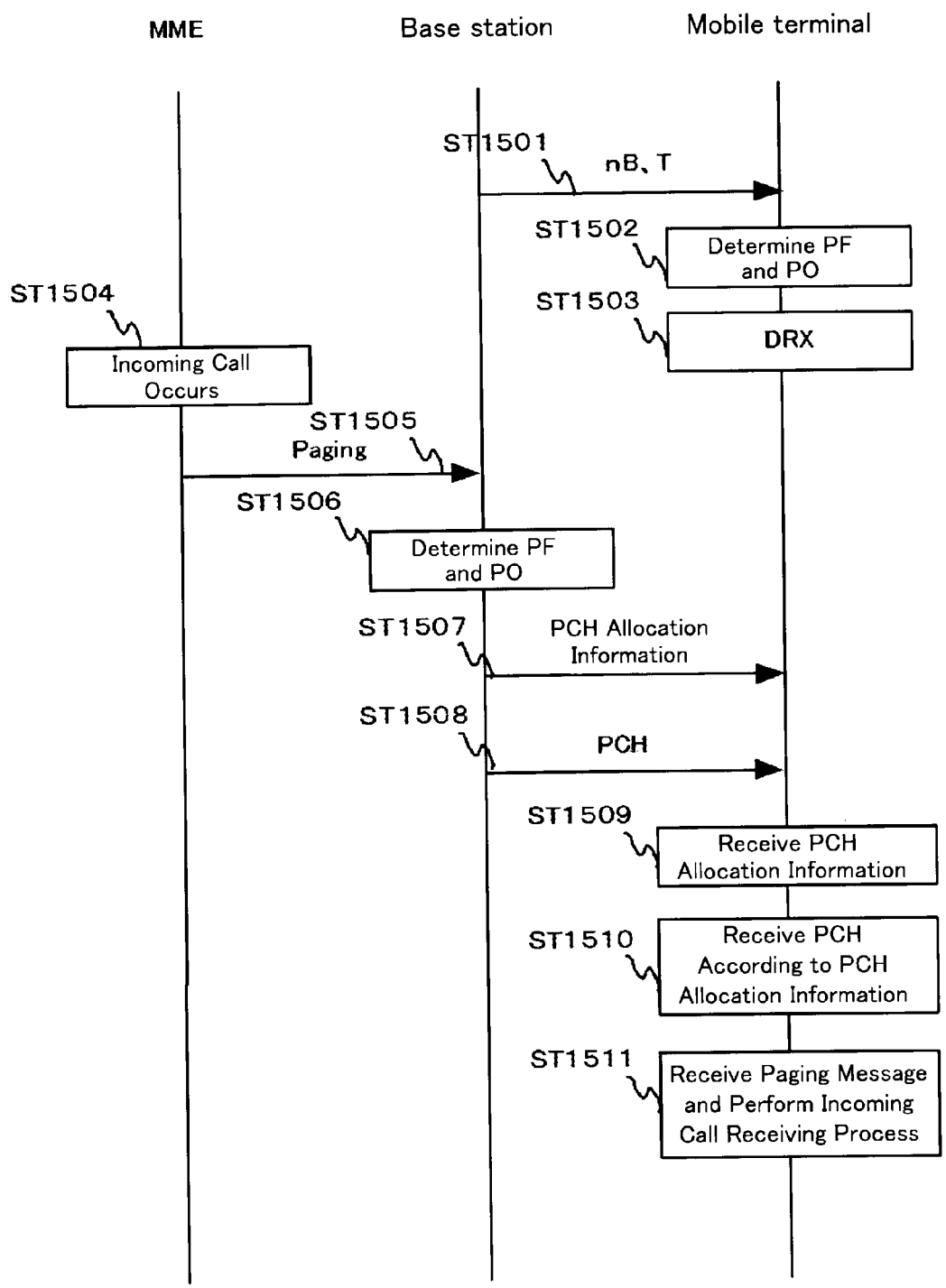
FIG. 15 is a sequence diagram showing an operation of a mobile communication system in accordance with Embodiment 2.

An example of an operation is shown in FIG. 15.

A base station, in step ST1501, broadcasts paging associated parameters to mobile terminals being served thereby. A concrete example of the paging associated parameters includes "T" and "nB". In a concrete example of a method of broadcasting the paging associated parameters, the paging associated parameters are broadcast, as system information, on an anchor carrier. As a result, there can be provided an advantage of enabling any terminal being served by the base station, regardless of whether the terminal is an LTE-support terminal or an LTE-A-support terminal, to receive the paging parameters. As an alternative, these paging parameters are mapped onto SIB2 included in system information. According to the current 3GPP specifications (release 8) (for LTE system). the paging parameters are similarly mapped onto the SIB2. Therefore, it is not necessary to add any change to the methods for use in an LTE system, and there can be provided an advantage of avoiding the complexity of the mobile communication system.

A mobile terminal, in step ST1502, uses both the paging associated parameters broadcast thereto from the base station in step ST1501 and an identifier thereof (also referred to as IMSI or UE-ID) to carry out determination of a paging frame and a paging occasion. As an concrete example of the determination, a method which is the same as that according to the current 3GPP specifications (release 8) (for LTE systems) is used. As a result, it is not necessary to add any change to the methods for use in an LTE system, and there can be provided an advantage of avoiding the complexity of the mobile communication system.

The mobile terminal, in step ST1503 carries out a discontinuous reception (also referred to as DRX) operation according to the paging frame and the paging occasion which are determined in step ST1502.

An incoming call to the mobile terminal occurs in step ST1504.

An MME, in step ST1505, notifies paging information to one or more base stations belonging to one or more tracking areas to which the mobile terminal belongs. It can be considered that the paging information is the identifier of the mobile terminal or the like.

The base station which has received the paging information destined for the mobile terminal from the MME, in step ST1506, determines a paging frame and a paging occasion by using the identifier of the mobile terminal included in the paging information which is, in step 1505, notified from the MME, and the "T" and "nB" which the base station, in step ST1501, has broadcast to mobile terminals being served thereby. The determining method can be the same as that of step ST1502.

The base station, in step ST1507, notifies PCH allocation information to the mobile terminal by using a P-RNTI on a PDCCH according to the paging frame and the paging occasion which are determined.

The base station, in step ST1508, notifies a PCH on a PDSCH to the mobile terminal according to the PCH allocation information which the base station has notified in step ST1507.

The mobile terminal, in step ST1509, monitors whether the PCH allocation information on the PDCCH exists by using the P-RNTI according to the paging frame and the paging occasion determined in step ST1502. When receiving the PCH allocation information, the mobile terminal makes a transition to step ST1510.

The mobile terminal, in step ST1510, receives the PCH on the PDSCH according to the PCH allocation information received in step ST1509. When recognizing that the paging is destined for the mobile terminal itself from the PCH, the mobile terminal makes a transition to step ST1511.

The mobile terminal, in step ST1511, performs an incoming call receiving process according to the paging message thereto on the PDSCH.

Embodiment 2 can provide the following advantages.

Either the number of paging occasions which can be included in one paging frame or the number of paging frames which can be generated during DRX which is a cycle in which whether or not paging is carried out is checked to see can be increased. Therefore, it becomes able to reduce the number of mobile terminals each of which monitors the presence or absence of a P-RNTI on the PDCCH with the same paging occasion. As a result, it becomes able to reduce the probability that a mobile terminal monitors the PCH on the PDCCH even though the paging is destined for another mobile terminal. Accordingly, there can be provided an advantage of reducing the power consumption of the mobile terminal.

Furthermore, it becomes able to reduce the probability that paging occurs with the same timing for mobile terminals each of which monitors the presence or absence of a P-RNTI on the PDCCH with the same paging occasion. As a result, there can be provided an advantage of being able to reduce the control delay in the whole mobile communication system.

Furthermore, a paging receiving operation and a paging transmitting operation performed by an LTE-support mobile terminal being served by an LTE-A-support base station can be made to be the same as those performed by an LTE-A-support mobile terminal being served by the base station. As a result, there can be provided an advantage of preventing increase in the complexity of the mobile communication system.

Embodiment 2 can be used in combination with Embodiment 1, Variant 1 of Embodiment 1, Variant 2 of Embodiment 1, Variant 3 of Embodiment 1, or Variant 4 of Embodiment 1. From the viewpoint that the paging receiving operation and the paging transmitting operation performed by an LTE-support mobile terminal being served by an LTE-A-support base station can be made to be the same as those performed by an LTE-A-support mobile terminal, the compatibility with Variant 1 of Embodiment 1 is higher as compared with that with Variant 2 of Embodiment 1.

Variant 1 of Embodiment 2

Because a problem to be solved by Variant 1 of Embodiment 2 is the same as that shown in Embodiment 2, the explanation of the problem will be omitted hereafter.

A solution provided in this Variant 1 of Embodiment 2 will be shown hereafter.

The paging associated parameters are divided into parameters for LTE-support mobile terminals, and parameters for LTE-A-support mobile terminals. As an alternative, paging associated parameters for LTE-A are newly disposed. As a result, a network side can adjust the paging parameters for LTE-support mobile terminals, and those for LTE-A-support mobile terminals separately. Therefore, there can be provided an advantage of being able to reduce the number of mobile terminals each of which monitors the presence or absence of a P-RNTI on the PDCCH with the same paging occasion while preventing any change to an existing LTE system.

A concrete example in which the paging associated parameters are divided into parameters for LTE-support mobile terminals, and parameters for LTE-A-support mobile terminals will be shown below.

Radio resources configure common information (also referred to as Radio Resource Configure Common information Element) is divided into information for LTE-support mobile terminals, and that for LTE-A-support mobile terminals. As an alternative, either radio resources configure common information or information similar to radio resources configure common information is newly disposed for LTE-A. As a result, POs and PFs can be adjusted in such a way that PO and PF are provided for LTE-support mobile terminals, and PO and PF are provided for LTE-A-support mobile terminals, separately.

As an alternative, the SIB2 is divided into a portion for LTE-support mobile terminals, and that for LTE-A-support mobile terminals. As an alternative, another SIB2 or information similar to the SIB2 is newly disposed for LTE-A. As a result, POs and PFs can be adjusted in such a way that PO and PF are provided for LTE-support mobile terminals, and PO and PF are provided for LTE-A-support mobile terminals, separately. The radio resources configure information common to mobile terminals is mapped onto the SIB2.

For example, in order to map information for LTE-A-support mobile terminals similar to the SIB2, a new SIB is disposed. As a result, POs and PFs can be adjusted in such a way that PO and PF are provided for LTE-support mobile terminals, and PO and PF are provided for LTE-A-support mobile terminals, separately.

As an alternative, the information for LTE-A-support mobile terminals similar to the SIB2 can be broadcast as the system information about multiple carriers, for example. As a result, POs and PFs can be adjusted in such a way that PO and PF are provided for LTE-support mobile terminals, and PO and PF are provided for LTE-A-support mobile terminals, separately. The paging parameters for LTE-A-support mobile terminals which are information unnecessary for an LTE-support mobile terminal are not notified as system information from an anchor carrier, but are broadcast as the system information about multiple carriers. Therefore, an LTE-support mobile terminal can select not to receive the unnecessary information. As a result, there can be provided an advantage of being able to reduce the amount of data which an LTE-support mobile terminal needs to decode, thereby being able to reduce the processing load. There can be provided another advantage of enabling a base station to broadcast, as the system information about multiple carriers, information required for an LTE-A-support mobile terminal to all LTE-A-support mobile terminals being served by the base station.

As an alternative, instead of dividing the SIB2 into a portion for LTE-support mobile terminals and that for LTE-A-support mobile terminals, the T and nB which are paging associated parameters are divided into parameters for LTE-support mobile terminals (e.g. T_LTE and nB_LTE) and those for LTE-A-support mobile terminals (e.g. T_LTE-A and nB_LTE-A). As an alternative, either another T and another nB or paging parameters similar to the T and nB are newly disposed for LTE-A. As a result, POs and PFs can be adjusted in such a way that PO and PF are provided for LTE-support mobile terminals, and PO and PF are provided for LTE-A-support mobile terminals, separately.

As an alternative, an occurrence subframe pattern of subframes in each of which a PO occurs is divided into a subframe pattern for LTE-support mobile terminals and that for LTE-A-support mobile terminals. As an alternative, another occurrence subframe pattern is newly disposed for LTE-A. The occurrence subframe pattern can be determined statically. By determining the occurrence subframe pattern statically, it becomes unnecessary to notify the occurrence subframe pattern from the network side to mobile terminals, and there can be provided an advantage of making the effective use of radio resources. Furthermore, by making the paging associated parameters common among mobile terminals, there can be provided an advantage of making the effective use of radio resources. As a result, subframes in each of which a PO occurs can be adjusted in such away that subframes in each of which a PO occurs are provided for LTE-support mobile terminals, and subframes in each of which a PO occurs are provided for LTE-A-support mobile terminals, separately. In conjunction with this adjustment, the paging associated parameters can be divided into parameters for LTE-support mobile terminals and those for LTE-A-support mobile terminals.

As an alternative, a paging identifier (also referred to as P-RNTI) on the PDCCH is divided into a portion for LTE-support mobile terminals and that for LTE-A-support mobile terminals. In a concrete example, P-RNTI_LTE is provided as the portion for LTE-support mobile terminals, and P-RNTI_LTE-A is provided as that for LTE-A-support mobile terminals. Accordingly, a region for LTE-support mobile terminals and that for LTE-A mobile terminals can be disposed separately on the PDCCH. In other words, an LTE-support mobile terminal monitors whether or not there is PCH allocation information on the PDCCH by using the P-RNTI_LTE while an LTE-A-support mobile terminal monitors whether or not there is PCH allocation information on the PDCCH by using the P-RNTI_LTE-A. Even if the same PO or PF is provided, by separately disposing the identifiers used for the monitoring for LTE-support mobile terminals and for LTE-A-support mobile terminals, it becomes able to reduce the number of mobile terminals each of which monitors the presence or absence of PCH allocation information by using the same identifier on the PDCCH with the same paging occasion. In conjunction with the above-mentioned method, the paging associated parameters can be divided into parameters for LTE-support mobile terminals and those for LTE-A-support mobile terminals.

When an incoming call to a mobile terminal occurs, the base station checks the system which the mobile terminal supports, and carries out either determination of a paging frame and a paging occasion, or reference of the occurrence subframe pattern and selection of a paging identifier according to the system which the mobile terminal supports.

A concrete example of a method which the base station uses to check the system which the mobile terminal supports will be shown hereafter.

According to method 1, the mobile terminal transmits paging associated capability (Capability) information as UE capability (Capability) information in response to an inquiry (also referred to as UECapabilityEnquiry) from the network side. As a concrete example of the paging associated capability information, there is information showing whether to use, as the paging associated parameters, either paging associated parameters for LTE-A-support mobile terminals or those for LTE-support mobile terminals.

As an alternative, when the mobile terminal supports the current 3GPP specifications (release 8), the mobile terminal uses the paging associated parameters for LTE-support mobile terminals, whereas when the mobile terminal supports release 10, the mobile terminal uses the paging associated parameters for LTE-A-support mobile terminals. In this case, as a concrete example of the paging associated capability information, there is information showing the release (release 8, release 10, or the like) which the mobile terminal supports.

Mobile terminals which can notify the paging associated capability information to the network side as the UE capability information can be limited to only LTE-A-support mobile terminals. If no notification of the paging associated capability information from the mobile terminal to the network side is made as the UE capability information, the network side should just determine that the mobile terminal uses the paging associated parameters for LTE-support mobile terminals. As a result, it is not necessary to add any change to the methods for use in an LTE system, and there can be provided an advantage of avoiding the complexity of the mobile communication system.

Furthermore, according to method 2, the mobile terminal transmits the paging associated capability information to the network side at the time of a TAU without receiving any inquiry from the network side. Because a concrete example of the paging associated capability information is the same as that according to method 1, the explanation of the concrete example will be omitted hereafter. Unless the mobile terminal stores the TAC of the cell which it has selected in performing cell selection, that is, when the mobile terminal moves to the TA of a cell with which it has not registered, the mobile terminal transmits a TAU spontaneously. Because method 2 needs no inquiry from the network side, the effective use of radio resources can be achieved. Furthermore, like in the case of using method 1, the paging associated capability information can be transmitted only to an LTE-A-support mobile terminal at the time of a TAU. If no notification of the paging associated capability information from the mobile terminal to the network side is made at the time of a TAU, the network should just determine that the mobile terminal uses the paging associated parameters for LTE-support mobile terminals. As a result, it is not necessary to add any change to the methods for use in an LTE system, and there can be provided an advantage of avoiding the complexity of the mobile communication system.

Furthermore, according to method 3, the mobile terminal transmits the paging associated capability information without any inquiry from the network side regardless of transmission of a TAU of the mobile terminal. A concrete example of the case in which the mobile terminal transmits the paging associated capability information will be described hereafter. When the mobile terminal makes a cell reselection to select a base station which can carry out carrier aggregation, or when the mobile terminal selects a base station which can carry out carrier aggregation as a handover destination, the mobile terminal transmits the paging associated capability information. Furthermore, when the mobile terminal makes a cell reselection to select a carrier of multi carrier anchor in a base station which can carry out carrier aggregation, or when the mobile terminal selects a base station which can carry out carrier aggregation as a handover destination, the mobile terminal transmits the paging associated capability information. As a method of notifying the paging associated capability information, a method of mapping the paging associated capability information onto a DCCH can be considered. As a result, only when the mobile terminal makes a cell reselection to select a base station which divides the paging associated parameters into paging associated parameters for LTE-support mobile terminals, and those for LTE-A-support mobile terminals, and which can carry out carrier aggregation, or when the mobile terminal is handed over to such a base station which can carry out carrier aggregation, the mobile terminal transmits the paging associated capability information to the base station. Therefore, there can be provided an advantage of making the effective use of radio resources. Like in the case of using method 1, mobile terminals which can notify the paging associated capability information can be limited to only LTE-A-support mobile terminals. If no notification of the paging associated capability information from the mobile terminal to the network side is made, the network side should just determine that the mobile terminal uses the paging associated parameters for LTE-support mobile terminals. As a result, it is not necessary to add any change to the methods for use in an LTE system, and there can be provided an advantage of avoiding the complexity of the mobile communication system.

The above-mentioned method of causing the base station to check to see the system which the mobile terminal supports can be used not only in the case in which an incoming call to the mobile terminal occurs, but also in the mobile communication system.

Figure 16:
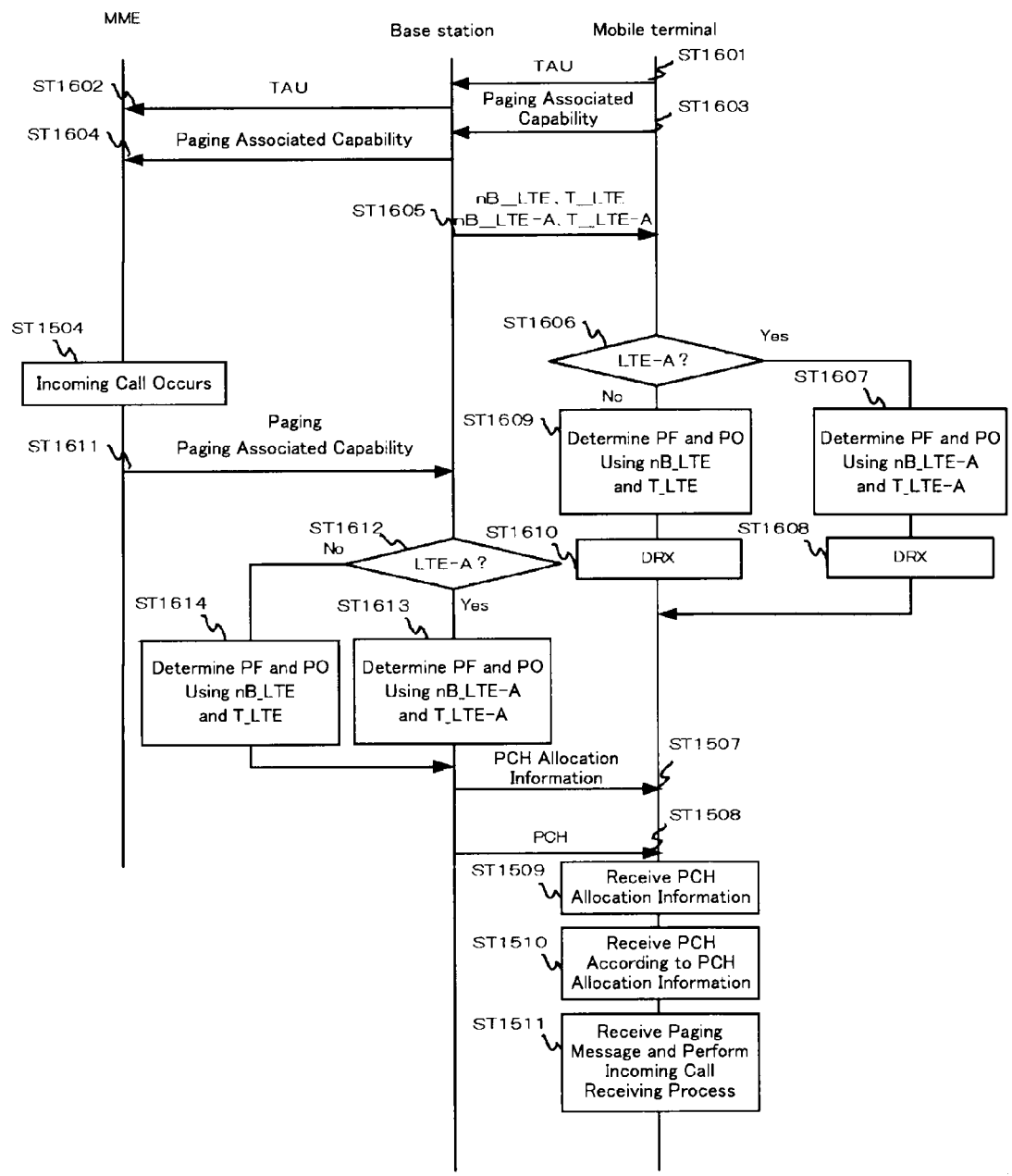
FIG. 16 is a sequence diagram showing an operation of a mobile communication system in accordance with Variant 1 of Embodiment 2.

An example of the operation is shown in FIG. 16. Because the same processes or like processes in FIG. 16 are performed in the steps designated by the same reference characters as those shown in FIG. 15, the explanation of the steps designated by the same reference characters will be omitted hereafter. The operation using method 2 as the method of causing the base station to check to see the system which the mobile terminal supports will be explained as an example.

The mobile terminal, in step ST1601, compares the TAC of the cell which it has selected in performing cell selection with the TAC which the mobile terminal has already held, and, when determining that they are different from each other, or when the mobile terminal does not store the TAC of the cell which it has selected in performing cell selection, transmits a TAU to the base station. The TAU includes the identification information about the mobile terminal (also referred to as an identifier, and referred to as an IMSI, a UE-ID, or the like).

The base station, in step ST1602, notifies the TAU received from the mobile terminal in step ST1601 to an MME.

The mobile terminal, in step ST1603, notifies the paging associated capability to the base station. A concrete example of the paging associated capability is provided as mentioned above.

The base station, in step ST1604, notifies the paging associated capability received from the mobile terminal in step ST1603 to an MME. As a result, it is not necessary for the base station to manage the paging associated capability information of the mobile terminal, and there can be provided an advantage of being able to manage the paging associated capability information collectively in the MME. As an alternative, the notification to this MME can be omitted, and the paging associated capability information of the mobile terminal can be managed by the base station. In this case, there can be provided an advantage of making the effective use of communication resources between the base station and the MME.

The base station, in step ST1605, broadcasts the paging associated parameters for LTE-support mobile terminals (e.g. T_LTE and nB_LTE), and the paging parameters for LTE-A-support mobile terminals (e.g. T_LTE-A and nB_LTE-A) to mobile terminals being served thereby. In a concrete example of a method of broadcasting the paging associated parameters, the base station broadcasts the paging associated parameters, as the SIB2 included in the system information, on an anchor carrier. The anchor carrier includes an anchor carrier in single carrier anchor, and an anchor carrier in multi carrier anchor.

The mobile terminal, in step 1606, checks the paging associated capability information thereof. The mobile terminal determines whether or not to use the paging associated parameters for LTE-A-support mobile terminals as the paging associated parameters. When using the paging associated parameters for LTE-A-support mobile terminals, the mobile terminal makes a transition to step ST1607. In contrast, when not using the paging associated parameters for LTE-A-support mobile terminals, or when using the paging associated parameters for LTE-support mobile terminals, the mobile terminal makes a transition to step ST1609.

The mobile terminal, in step ST1607, carries out determination of a paging frame and a paging occasion by using the paging parameters for LTE-A-support mobile terminals (e.g. T_LTE-A and nB_LTE-A), and the identifier thereof (also referred to as an IMSI or a UE-ID), among the paging associated parameters broadcast thereto from the base station in step ST1605. As a concrete example of a method of determining a paging frame and a paging occasion, a method similar to that defined by the current 3GPP specifications (release 8) (LTE system) can be used. As a result, it is not necessary to add any change to the methods for use in an LTE system, and there can be provided an advantage of avoiding the complexity of the mobile communication system.

The mobile terminal, in step ST1608, carries out a discontinuous reception (also referred to as DRX) operation according to the paging frame and the paging occasion which are determined in step ST1607.

The mobile terminal, in step ST1609, carries out determination of a paging frame and a paging occasion by using the paging parameters for LTE-support mobile terminals (e.g. T_LTE and nB_LTE), and the identifier thereof (also referred to as an IMSI or a UE-ID), among the paging associated parameters broadcast thereto from the base station in step ST1605. As a concrete example of a method of determining a paging frame and a paging occasion, a method similar to that defined by the current 3GPP specifications (release 8) (LTE system) can be used. As a result, it is not necessary to add any change to the methods for use in an LTE system, and there can be provided an advantage of avoiding the complexity of the mobile communication system.

The mobile terminal, in step ST1610, carries out a discontinuous reception (also referred to as DRX) operation according to the paging frame and the paging occasion which are determined in step ST1609.

An MME, in step ST1611, notifies the paging information and the paging associated capability information of the mobile terminal which it has received in step ST1604 to one or more base stations belonging to one or more tracking area to which the mobile terminal belongs. The paging information and the paging associated capability information can be notified simultaneously or at different times. When the notification of the paging associated capability information to the MME is omitted in step ST1604, the notification of the paging related capability information from the MME to the base station is not made in the step.

The base station, in step 1612, checks to see the paging associated capability information of the mobile terminal to which an incoming call has occurred. The base station determines whether or not to use the paging associated parameters for LTE-A-support mobile terminals as the paging associated parameters. In the case of using the paging associated parameters for LTE-A-support mobile terminals, but not using the paging associated parameters for LTE-support mobile terminals, the base station makes a transition to step ST1613. In the case of not using the paging associated parameters for LTE-A-support mobile terminals, but using the paging associated parameter for LTE-support mobile terminals, the base station makes a transition to step ST1614.

The base station, in step ST1613, carries out determination of a paging frame and a paging occasion by using the paging parameters for LTE-A-support mobile terminals (e.g. T_LTE-A and nB_LTE-A), and the identifier of the mobile terminal (also referred to as an IMSI or a UE-ID), among the paging associated parameters. The base station uses the same method of determining a paging frame and a paging occasion as that used by the mobile terminal. The base station, in step ST1614, carries out determination of a paging frame and a paging occasion by using the paging parameters for LTE-support mobile terminals (e.g. T_LTE and nB_LTE), and the identifier of the mobile terminal (also referred to as an IMSI or a UE-ID), among the paging associated parameters. The base station uses the same method of determining a paging frame and a paging occasion as that used by the mobile terminal.

In the above-mentioned example, an LTE-A-support mobile terminal can use the paging associated parameters for LTE-support mobile terminals. In this case, an LTE-A-support mobile terminal individually notifies the network side (the base station or the MME) to that effect. As a method of notifying the information, a method of mapping this information onto a DCCH can be considered. As a result, there can be provided an advantage of being able to implement flexible use of LTE-A-support mobile terminals.

Furthermore, a case in which an LTE-A-support mobile terminal operates while being served by an LTE-support base station (a release 8-support base station) can be considered.

The base station notifies the release which the base station supports to mobile terminals being served thereby by using the broadcast information (SIB, MIB, or the like) about the base station. In this case, the base station which notifies the release which the base station supports can be limited to only an LTE-A-support base station (a release 10-support base station). As a result, there can be provided an advantage of being able to prevent any change to an existing LTE system. Accordingly, each of mobile terminals being served by the base station can know the release with which the cell selected thereby supports.

When performing cell selection, each mobile terminal determines whether the base station is an LTE-support one or an LTE-A-support one. When the base station is an LTE-A-support one, each mobile terminal uses the method according to above-mentioned Variant 1 of Embodiment 2 to perform the same operation as that performed by an LTE-support mobile terminal, whereas when the base station is an LTE-support one, each mobile terminal does not use the method according to above-mentioned Variant 1 of Embodiment 2 to perform the same operation as that performed by an LTE-support mobile terminal. The same operation as that performed by an LTE-support mobile terminal is the one of determining a paging frame and a paging occasion according to the paging associated parameters (T and nB) mapped onto the SIB2 included in the system information, and then performing a discontinuous reception operation by using the occurrence subframe pattern for LTE-support mobile terminals. As a result, there can be provided an advantage of reducing the number of mobile terminals each of which monitors the presence or absence of a P-RNTI on the PDCCH with the same paging occasion in an LTE-A system by using Variant 1 of Embodiment 2 while enabling an LTE-A-support mobile terminal to operate while being served by an LTE-support base station.

Variant 1 of Embodiment 2 can provide the following advantages in addition to the advantages provided by Embodiment 2.

The network side can separately adjust the paging parameters for LTE-support mobile terminals and the paging parameters for LTE-A-support mobile terminals. Therefore, there is provided an advantage of preventing any change to an existing LTE system while reducing the number of mobile terminals each of which monitors the presence or absence of a P-RNTI on the PDCCH with the same paging occasion.

Variant 1 of Embodiment 2 can be used in combination with Embodiment 1, Variant 1 of Embodiment 1, Variant 2 of Embodiment 1, Variant 3 of Embodiment 1, or Variant 4 of Embodiment 1. From the viewpoint that the paging receiving operation and the paging transmitting operation performed by an LTE-support mobile terminal can be made to be different from those performed by an LTE-A-support mobile terminal, the compatibility with Variant 2 of Embodiment 1 is higher as compared with that with Variant 1 of Embodiment 1.

Embodiment 3

A problem to be solved by Embodiment 3 will be explained.

It has been considered that in an LTE-A system larger transmission bandwidths than the transmission bandwidths (transmission bandwidths) of an LTE system are supported, as disclosed in nonpatent reference 7 and nonpatent reference 8.

When a selected anchor carrier (this can be replaced by a component carrier) differs, the carrier frequency differs. Because the wavelength and the period also differ when the frequency differs, each reception point receives a different influence and has different reception quality even if the transmission wave propagates over the same distance through the same route. Therefore, a change of the component carrier according to the reception quality of a downlink signal is effective for an improvement in the reception quality.

Because a mobile terminal receives system information on the anchor carrier as a component carrier, a method of changing the anchor carrier according to the reception quality is effective for an improvement in the reception quality.

On the other hand, in a method of making a reselection between different frequencies according to the current 3GPP specifications (release 8), it is assumed that a mobile terminal simply performs reselection and evaluation according to a high-priority frequency provided by SIB5 included in system information (see nonpatent reference 4 and nonpatent reference 9). When the reception quality of a cell having a frequency to which a priority higher than or equal to that of the serving frequency is provided does not satisfy reference quality for cell reselection, a reselection of a cell having a frequency to which a priority (Priority) lower than that of the serving frequency is assigned is made (nonpatent reference 4). There is "CellReselectionPriority" provided by the SIB5 as a parameter showing the priority of a frequency.

Therefore, according to a current technology, a mobile terminal gives a higher priority to reselection and evaluation of another base station having a frequency having a higher priority than to reselection and evaluation of another carrier (anchor carrier, component carrier, or the like) having a low priority in the serving base station. More specifically, when another base station having a frequency having a higher priority satisfies the reference reception quality for cell reselection, a mobile terminal does not perform reselection and evaluation of another carrier having a low priority in the serving base station.

An example of a cell reselecting operation performed by a carrier aggregation-capable base station will be explained with reference to FIGS. 17 and 18 by using a concrete example.

Figure 17:
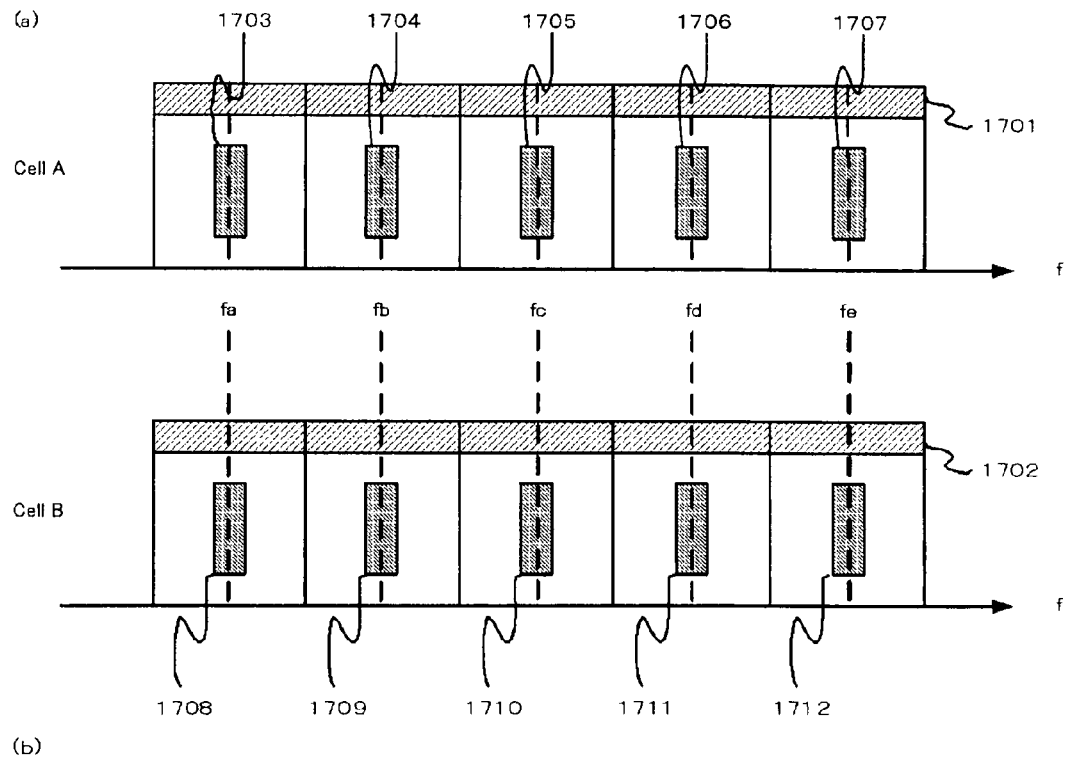
FIG. 17 is a conceptual diagram showing a problem shown in Embodiment 3.

1701 and 1702 of FIG. 17(*a*) denote physical downlink control channels (PDCCHs). Although the example in which the physical downlink control channels are mapped for each component carrier is shown in FIG. 17, the present embodiment is not limited to this example. As another example, a case in which a component carrier onto which a physical downlink control channel is mapped, and a component carrier onto which a physical downlink control channel is not mapped coexist can be considered.

1703, 1704, 1705, 1706, 1707, 1708, 1709, 1710, 1711, and 1712 denote downlink synchronization signals and physical broadcast channels (PBCH). Although the example in which a downlink synchronization signal and a physical broadcast channel are mapped for each component carrier is shown in FIG. 13, the present embodiment is not limited to this example. As another example, a case in which a component carrier onto which a downlink synchronization signal and a physical broadcast channel are mapped, and a component carrier onto which a downlink synchronization signal and a physical broadcast channel are not mapped coexist can be considered.

As shown in FIG. 17(*a*), a cell A and a cell B each of which has five component carriers (fa, fb, fc, fd, fe) each having a bandwidth of 20 MHz in an LTE-A system will be considered. It is further assumed that fa, fc, and fe are anchor carriers of single carrier anchor, and fb and fd are anchor carriers of multi carrier anchor. In FIG. 17(*b*), a concrete example of the priority parameter (also referred to CellReselectionPriority) broadcast using the SIB5 which is system information of the cell A is shown. For example, it is assumed that "7" shows the highest priority and "0" shows the lowest priority.

Figure 18:
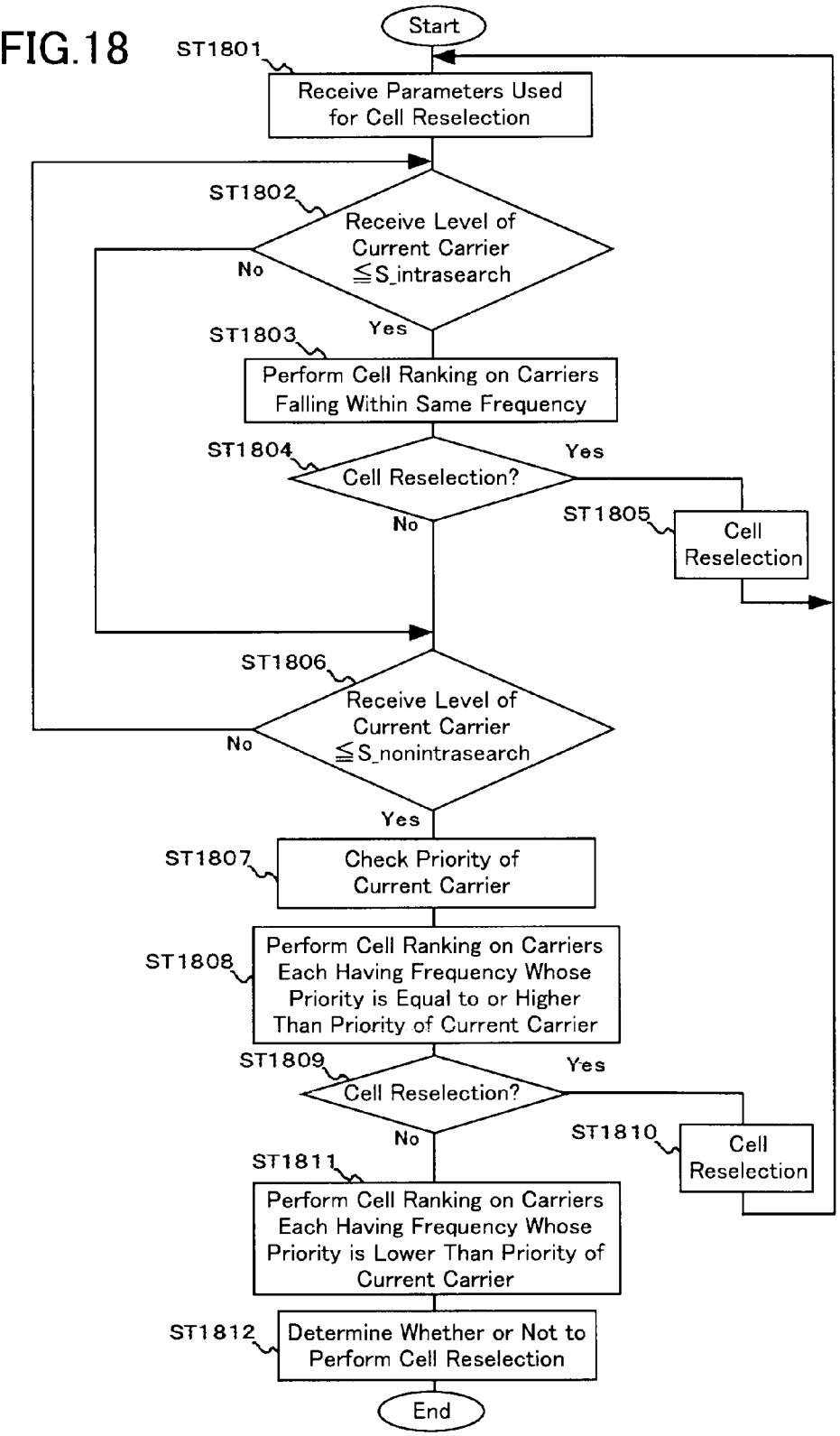
FIG. 18 is a flow chart showing an operation of a mobile terminal showing the problem in Embodiment 3.

FIG. 18 describes an example of a cell reselecting operation of a mobile terminal which is carrying out an idle operation at fe of the cell A of FIG. 17.

The mobile terminal, in step ST1801, receives parameters which it uses for cell reselection from the anchor carrier fe of the cell A. As a concrete example of the parameters which the mobile terminal uses for cell reselection, there are S_intrasearch, Q_Hyst, Q_offset, T_reselection, S_nonintrasearch, cellReselectionPriority, etc.

S_intrasearch is a threshold for measurement at the same frequency.

Q_Hyst is a hysteresis value for ranking criteria.

Q_offset is an offset between the two cells.

T_reselection is a cell reselection timer value.

S_nonintrasearch is a threshold for measurement at a different frequency and in a different system.

CellReselectionPriority is the absolute priority of the carrier frequency.

The mobile terminal, in step ST1802, determines whether or not to make a measurement falling within the same frequency (fe) for cell reselection. When determining that the mobile terminal does not make a measurement for cell reselection, the mobile terminal makes a transition to step ST1806. In contrast, when determining that the mobile terminal makes a measurement for cell reselection, the mobile terminal makes a transition to step ST1803. In a concrete example of the determination of whether or not to make a cell reselection, when the receive level value at fe of the cell A is larger than the parameter (S_intrasearch), the mobile terminal determines that it does not make a measurement. In contrast, when the receive level value at fe of the cell A is equal to or smaller than the parameter (S_intrasearch), the mobile terminal determines that it makes a measurement.

The mobile terminal, in step ST1803, performs cell ranking on carriers falling within the same frequency, i.e., fe. In FIG. 17, the target for cell ranking is fe of the cell B. In a concrete example of the cell ranking, the mobile terminal carries the ranking by using both a value which is an addition of the adjustment parameter (Q_Hyst) to the measured value of the reception quality at fe of the cell A, and a value which is a subtraction of the adjustment parameter (Q_offset) from the measured value of the reception quality at fe of the cell B.

The mobile terminal, in step ST1804, determines whether or not to make a cell reselection. In a concrete example, when the reception quality at fe of the new cell B is ranked above (or higher than) that at fe of the cell A during a certain period (T_reselection), and one or more seconds has elapsed after the mobile terminal has camped on (camped on) fe of the current cell A, the mobile terminal determines that it makes a cell reselection, and then makes a transition to step ST1805. When the above-mentioned requirements are not satisfied, the mobile terminal determines that it does not make a cell reselection, and then makes a transition to step ST1806.

The mobile terminal, in step ST1805, makes a cell reselection. The mobile terminal then returns to step ST1801.

The mobile terminal, in step ST1806, determines whether or not to make a measurement falling within a different frequency (other than fe) for cell reselection. When determining not to make a measurement for cell reselection, the mobile terminal makes a transition to step ST1802. In contrast, when determining to make a measurement for cell reselection, the mobile terminal makes a transition to step ST1807. In a concrete example of the determination of whether or not to make a cell reselection, when the receive level value at fe of the cell A is larger than the parameter (S_nonintrasearch), the mobile terminal determines that it does not make a measurement. In contrast, when the receive level value at fe of the cell A is equal to or smaller than the parameter (S_nonintrasearch), the mobile terminal determines that it makes a measurement.

The mobile terminal, in step ST1807, checks the priority of the current carrier (fe of the cell A) in the serving cell. In a concrete example, the mobile terminal checks the priority of the current carrier by using the parameter "cellReselectionPriority" broadcast, as the SIB5 of the system information, from the serving cell. In this concrete example, the priority of the current carrier (fe of the cell A) is set to "7", as shown in FIG. 17(*b*). For example, it is assumed that "0" is the lowest priority and "7" is the highest priority. In that case, the priority of the current carrier is the highest.

The mobile terminal, in step ST1808, performs cell ranking on carriers each having a different frequency having a priority equal to or higher than the priority of the current carrier. In the concrete example (FIG. 17), only "7" is equal to or higher than the priority of the current carrier. Therefore, the mobile terminal performs cell ranking on carriers each having a frequency having a priority of "7" or higher, i.e. carriers falling within fe. The target for cell ranking is only fe of the cell B. Because a concrete example of the cell ranking is the same as that shown in step ST1803, the explanation of the concrete example will be omitted hereafter.

The mobile terminal, in step ST1809, determines whether or not to make a cell reselection. Because a concrete example of the determination is the same as that shown in step ST1804, the explanation of the concrete example will be omitted hereafter.

The mobile terminal, in step ST1810, makes a cell reselection. The mobile terminal then returns to step ST1801.

The mobile terminal, in step ST1811, performs cell ranking on carriers each having a different frequency having a lower priority than the priority of the current carrier. In the concrete example (FIG. 17), "3" and "5" are priorities lower than a priority of "7" of the current carrier. The mobile terminal carries out cell ranking for carriers each having a frequency having a priority lower than a priority of "7", i.e. carries falling within fa, fb, fc, and fd. Because a concrete example of the cell ranking is the same as that shown in step ST1803, the explanation of the concrete example will be omitted hereafter.

The mobile terminal, in step ST1812, determines whether or not make a cell reselection. Because a concrete example of the determination is the same as that shown in step ST1804, the explanation of the concrete example will be omitted hereafter.

In this case, the mobile terminal can carry out the cell ranking in order of descending priority. In the concrete example, the highest one of the priorities lower than the priority of the current carrier is "5". Therefore, the mobile terminal performs cell ranking on carriers falling within the frequencies having a priority of "5", i.e. fc and fd. When not determining any cell reselection destination through this cell ranking, the mobile terminal can perform cell ranking on carriers falling within the frequencies having the second highest priority of "3", i.e., fa and fb.

The order in which the processes of steps ST1802 to ST1805 and those of steps ST1806 to ST1812 are performed is arbitrary, and both of the sets of processes can be performed simultaneously.

As shown in above-mentioned FIGS. 17 and 18 (particularly in step ST1808 of FIG. 18), a higher priority is given to the cell ranking performed on the carrier (fe) having a frequency having a priority equal to or higher than the priority of the current carrier of a neighboring cell (cell B) other than the serving cell than to the cell ranking performed on the carriers (fa, fb, fc, fd) other than the current carries (fe) of the serving cell (cell A).

Accordingly, there arises a problem that another carrier having a frequency having a priority lower than the priority of the current carrier in the same base station cannot be reselected on a priority basis in spite of the fact that another base station is physically closer to the mobile terminal and there is a possibility that the reception quality becomes better. This causes a problem that the downlink data throughput is reduced and the effective use of radio resources cannot be accomplished in the mobile communication system. A solution provided by this Embodiment 3 will be shown hereafter.

When a plurality of carriers exist in a carrier aggregation-capable base station, each of mobile terminals being served by this base station carries out reselection and evaluation for each of a plurality of carriers in the base station regardless of the priority settings of their frequencies. For example, even in a case in which a lower priority than that of the current carrier is set to another carrier of the base station, each of mobile terminals being served by the base station carries out reselection and evaluation for the other carrier.

Figure 19:
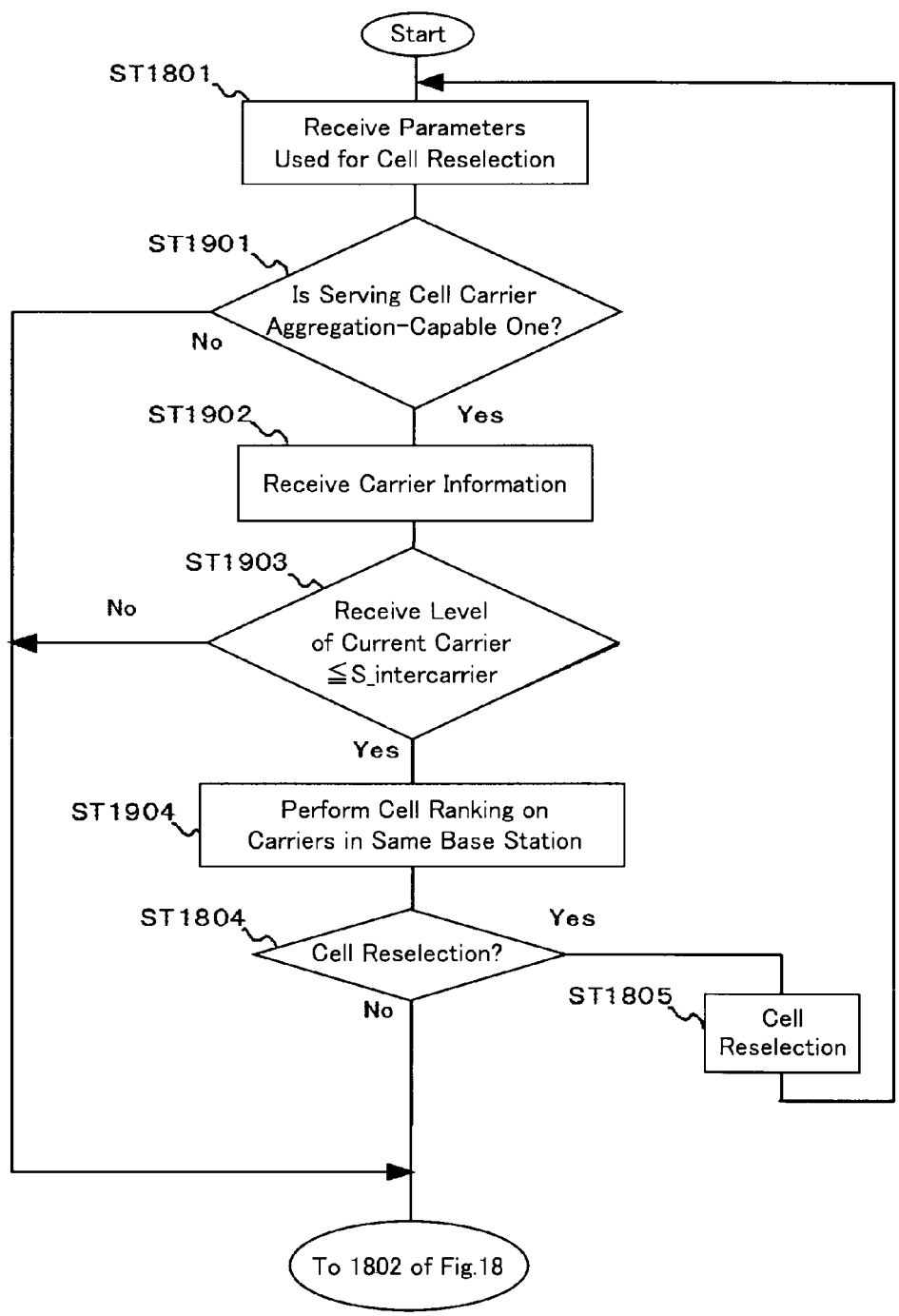
FIG. 19 is a flow chart showing an operation of a mobile terminal in accordance with Embodiment 3.

FIG. 19 describes an example of a cell reselecting operation using this Embodiment 3 which is performed by a mobile terminal which has been carrying out an idle operation at fe of the cell A of FIG. 17. Because the same processes or like processes in FIG. 19 are performed in the steps designated by the same reference characters as those shown in FIG. 18, the explanation of the steps designated by the same reference characters will be omitted hereafter.

The mobile terminal, in step ST1901, determines whether or not the serving cell is a carrier aggregation-capable cell. A concrete example of the determination will be shown hereafter.

(1) When information showing a carrier of multi carrier anchor is notified via an anchor carrier of single carrier anchor (which can be replaced by an anchor carrier of multi carrier anchor), which is described in nonpatent reference 8, the mobile terminal determines that the above-mentioned cell is a carrier aggregation-capable one. In contrast, when no information showing a carrier of multi carrier anchor is notified, the mobile terminal determines that the cell is not a carrier aggregation-capable one.

(2) When the system information about multiple carriers is broadcast on an anchor carrier of multi carrier anchor which is described in nonpatent reference 8, the mobile terminal determines that the above-mentioned cell is a carrier aggregation-capable one. In contrast, when no system information about multiple carriers is notified, the mobile terminal determines that the cell is not a carrier aggregation-capable one.

(3) The mobile terminal can use the release which the base station supports and which is broadcast from the base station, as shown in Variant 1 of Embodiment 2. Because a concrete example of the release which the base station supports is the same as that shown in Variant 1 of Embodiment 2, the explanation of the concrete example will be omitted. When the base station which supports LTE-A or when the base station does not support LTE, the mobile terminal determines that the above-mentioned cell is a carrier aggregation-capable one. In contrast, when the base station does not support LTE-A or when the base station supports LTE, the mobile terminal determines that the cell is not a carrier aggregation-capable one. When determining that the cell is a carrier aggregation-capable one, the mobile terminal makes a transition to step ST1902. In contrast, when determining that the cell is not a carrier aggregation-capable one, the mobile terminal makes a transition to step ST1802 of FIG. 18.

The mobile terminal, in step ST1902, receives the carrier information of the serving cell. In a concrete example, the mobile terminal receives the frequencies of the anchor carriers. The anchor carriers can be either the ones of multi carrier anchor or the ones of single carrier anchor. In the example of FIG. 17, the frequencies of the anchor carriers of the cell A are fa, fb, fc, fd, and fe.

Concrete examples of a method of notifying the carrier information from the base station to mobile terminals will be shown hereafter.

(1) The base station notifies the carrier information as the system information about multiple carriers to mobile terminals via an anchor carrier of multi carrier anchor. Therefore, an LTE-support mobile terminal can select not to receive any unnecessary information. As a result, there can be provided an advantage of being able to reduce the amount of data which an LTE-support mobile terminal needs to decode, thereby being able to reduce the processing load. There can be provided another advantage of enabling a base station to broadcast information required for an LTE-A-support mobile terminal as the system information about multiple carriers to all LTE-A-support mobile terminals being served by the base station.

(2) The base station newly adds the carrier information to an information element of the system information transmitted on an anchor carrier. In a concrete example, the base station maps the carrier information onto SIB3 included in the system information. When mapping the carrier information onto the SIB3, there can be provided the following advantages. In the 3GPP, it has been planned that a setting common in cell reselection is mapped onto the SIB3. If the carrier information which is a parameter for cell reselection is added to the SIB3 in which similar parameters are included, each mobile terminal can acquire the similar parameters by simply receiving the same system information. Therefore, there can be provided an advantage of avoiding the complexity of the mobile communication system, and preventing a control delay from occurring in the mobile communication system.

As an alternative, the carrier information is mapped onto SIB5 included in the system information. When the carrier information is mapped onto the SIB5, there can be provided the following advantages. In the 3GPP, it has been concluded that a parameter for cell reselection between different frequencies is mapped onto the SIB5. If the carrier information which is a parameter for cell reselection between different frequencies is added to the SIB5 in which similar parameters are included, each mobile terminal can acquire the similar parameters by simply receiving the same system information. Therefore, there can be provided an advantage of avoiding the complexity of the mobile communication system, and preventing a control delay from occurring in the mobile communication system.

As an alternative, a new SIB is newly disposed and the carrier information is mapped onto this new SIB. As a result, there can be provided an advantage of being able to prevent any change to an existing LTE system. Thus, when the carrier information is newly added as an information element of the system information from the anchor carrier, even an LTE-support mobile terminal becomes able to receive the carrier information. Therefore, even an LTE-support mobile terminal becomes able to reselect a carrier in the same base station. Therefore, there can be provided an advantage of being able to provide an improvement in the reception quality even in an LTE-support mobile terminal by enabling this mobile terminal to make a reselection according to the reception quality of a carrier, like in the case of an LTE-A-support mobile terminal.

The base station, in step ST1903, determines whether or not to make a measurement thereon for cell reselection. When determining that the base station does not make a measurement for cell reselection, the base station makes a transition to step ST1802 of FIG. 18. In contrast, when determining that the base station makes a measurement for cell reselection, the base station makes a transition to step ST1904. In a concrete example of the determination of whether or not to make a cell reselection, when the receive level value at fe of the cell A is larger than the parameter (S_intercarrier) the base station determines that it does not make a measurement. In contrast, when the receive level value at fe of the cell A is equal to or smaller than the parameter (S_intercarrier), the base station determines that it makes a measurement. The above-mentioned "S_intercarrier" is a parameter newly disposed in this Embodiment 3 in order for the base station to determine whether or not to make a measurement thereon for reselection. By newly disposing the parameter separately from conventional parameters "S_intrasearch" and "S_nonintrasearch", there can be provided an advantage of making it possible for the mobile communication system to perform a flexible cell reselection control operation. Because a method of notifying "S_intercarrier" from the base station to mobile terminals is the same as the method of notifying "carrier information" of step ST1902, the explanation of the method will be omitted hereafter. As an alternative, "S_intercarrier" can be used together with the conventional parameter "S_intrasearch" or "S_nonintrasearch". As a result, the amount of information which is notified from the base station to mobile terminals can be reduced, and there can be provided an advantage of making the effective use of radio resources. Therefore, there can be provided an advantage of being able to construct a flexible mobile communication system while preventing any change to an existing LTE system.

The base station, of step ST1904, performs a cell ranking operation on the carriers thereof, i.e. fa, fb, fc, fd, and fe of the cell A regardless of the priority settings of their frequencies. Because a concrete example of the cell ranking operation is the same as that of step ST1803, the explanation of the concrete example will be omitted hereafter. The base station can use PCIs to determine their ranks.

Embodiment 3 can provide the following advantages.

Each mobile terminal can reselect another carrier having a frequency having a lower priority than the current carrier in the serving base station on a priority basis, the other carrier being provided by another base station which is physically closer to the mobile terminal and which provides a possibility that the reception quality becomes better. As a result, there can be provided an advantage of enabling each mobile terminal to carry out communications using a carrier providing good reception quality after making a reselection. Accordingly, there can be provided another advantage of improving the downlink data throughput and making the effective use of radio resources in the mobile communication system.

Embodiment 3 can be used in combination with Embodiment 1, Variant 1 of Embodiment 1, Variant 2 of Embodiment 1, Variant 3 of Embodiment 1, Variant 4 of Embodiment 1, Embodiment 2, or Variant 1 of Embodiment 2.

Variant 1 of Embodiment 3

A problem to be solved by Variant 1 of Embodiment 3 will be explained hereafter.

A case in which a neighboring cell in the neighborhood of the serving cell is a carrier aggregation-capable base station will be considered. It is assumed that when a mobile terminal being served by the serving cell performs cell selection, the mobile terminal carries out reselection and evaluation for a plurality of carriers of the neighboring cell regardless of the priority settings of frequencies with Embodiment 3 being applied to the above-mentioned neighboring cell.

Because the wavelength and the period also differ when the frequency differs, each reception point receives a different influence and has different reception quality even if the transmission wave propagates over the same distance through the same route. Therefore, reselection of a component carrier with which to receive a downlink signal from the neighboring cell according to the reception quality is effective for an improvement in the reception quality.

However, the mobile terminal needs to determine whether or not the above-mentioned cell (neighboring cell) is a carrier aggregation-capable one in order to implement Embodiment 3 (step ST1901 of FIG. 19). In a concrete method for this determination, the mobile terminal needs to receive the broadcast information of the cell, the system information about multiple carriers, etc. The mobile terminal also needs to acquire the carrier information of the cell (step ST1902 of FIG. 19). In a concrete method for this acquirement, the mobile terminal needs to receive the system information about multiple carriers, the system information about anchor carriers, etc.

These necessities show that when Embodiment 3 is applied to a carrier aggregation-capable neighboring cell in the reselecting operation, the mobile terminal needs to receive and decode the broadcast information (MIB, SIB, etc.) of the neighboring cell when making a measurement on the neighboring cell. Explaining with reference to FIG. 12, when Embodiment 3 is applied to a carrier aggregation-capable neighboring cell in the reselecting operation, the mobile terminal needs to perform the processes in steps ST1204 and ST1205 on the above-mentioned neighboring cell.

Because the mobile terminal needs to receive and decode the broadcast information of the neighboring cell, the control delay increases.

Particularly SIB information is mapped onto a PDSCH. Therefore, because the mobile terminal needs to receive a PDCCH and also receive the SIB information on the PDSCH on the basis of scheduling information mapped onto the received PDCCH, the control delay increases.

When the mobile terminal carries out reselection and evaluation for the plurality of carriers of the neighboring cell regardless of the priority settings of frequencies with Embodiment 3 being applied to the neighboring cell, as mentioned above, there arises a problem that the control delay of the mobile communication system increases, the processing load of each mobile terminal increases, and the power consumption of each mobile terminal increases.

A solution provided by this Variant 1 of Embodiment 3 will be shown hereafter.

It is assumed that the target carrier for reselection evaluation in the reselecting operation is only the current carrier (frequency), only a system frequency, or only a frequency having the highest priority even if the neighboring cell is a carrier aggregation-capable one. In this case, reselection and evaluation can be merely a measurement for reselection. The mobile terminal acquires the system frequency and the frequency having the highest priority from the broadcast information (MIB, SIB, etc.) from the serving cell.

Variant 1 of Embodiment 3 can provide the following advantages.

There can be provided an advantage of being able to reduce the control delay occurring in the mobile communication system, reduce the processing load of each mobile terminal, and reduce the power consumption of each mobile terminal in the reselecting operation.

Variant 1 of Embodiment 3 can be used in combination with Embodiment 1, Variant 1 of Embodiment 1, Variant 2 of Embodiment 1, Variant 3 of Embodiment 1, Variant 4 of Embodiment 1, Embodiment 2, Variant 1 of Embodiment 2, or Embodiment 3.

Variant 2 of Embodiment 3

Because a problem to be solved by Variant 2 of Embodiment 3 is the same as that shown in Embodiment 3, the explanation of the problem will be omitted hereafter.

On the other hand, according to the current 3GPP specifications (release 8), a network side (a base station or the like) determines whether or not to carry out a handover on the basis of the results of measurements on the serving cell and neighboring cells which are acquired by a mobile terminal currently performing communications. In measurement configuration information notified from the base station to the mobile terminal, no configuration information about carriers served by the same cell exists. Furthermore, no configuration information about carriers served by the same cell exists in a measurement report reported from the mobile terminal to the base station.

Therefore, a problem with the current technology is that even in a case in which a carrier which provides good reception quality exists in a carrier aggregation-capable base station, this base station cannot be the target for handover and the carrier cannot be the target carrier to which the current carrier is switched.

This causes a problem that the downlink data throughput is reduced and the effective use of radio resources cannot be accomplished in the mobile communication system.

A solution provided by this Variant 2 of Embodiment 3 will be shown hereafter.

In measurement configuration information notified from a base station to a mobile terminal, configuration information about carriers in the same cell (including the serving cell and neighboring cells) is newly disposed. As an alternative, information about carriers served by the same cell is newly disposed in a measurement report reported from a mobile terminal to a base station.

Figure 20:
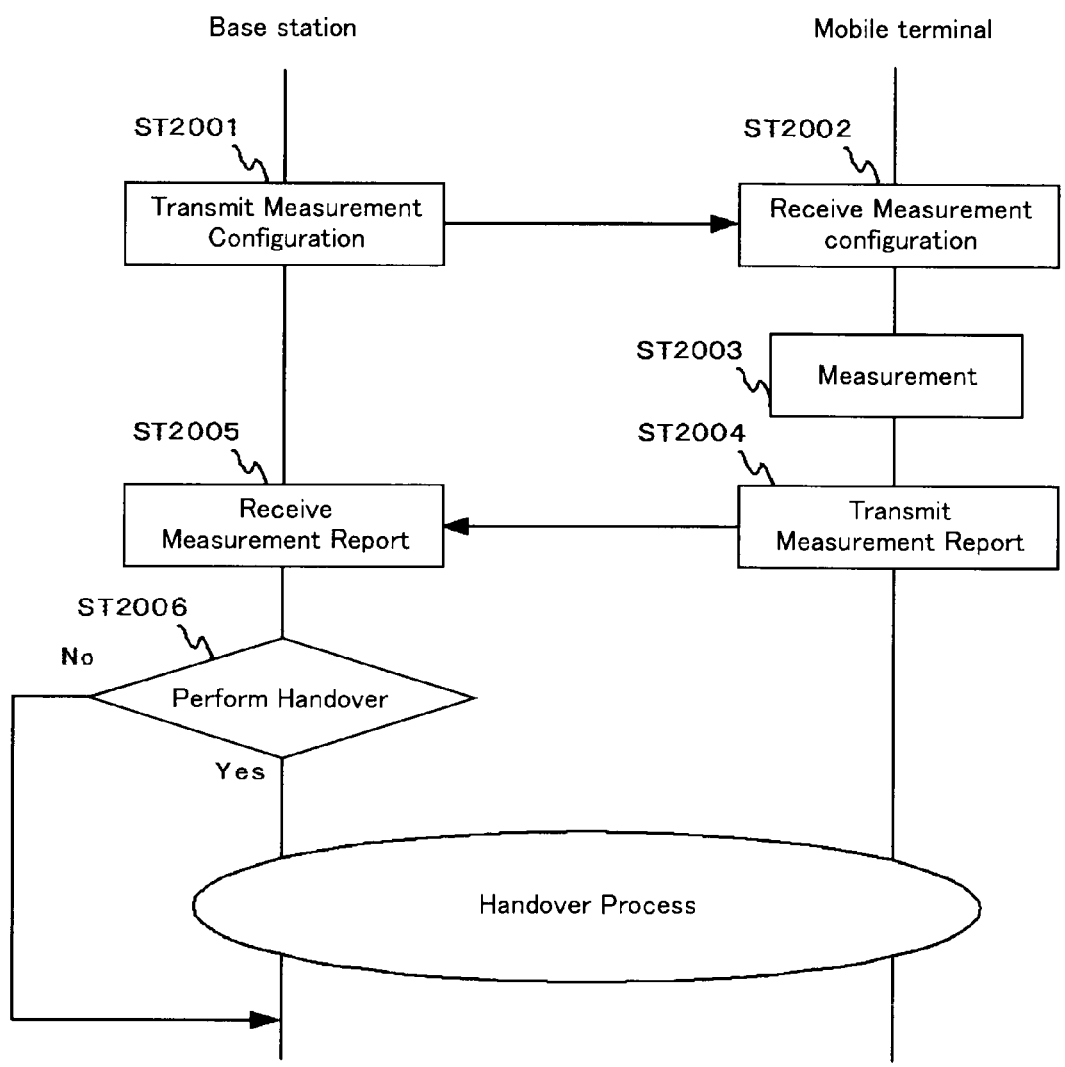
FIG. 20 is a sequence diagram showing an operation of a mobile communication system in accordance with Variant 2 of Embodiment 3.

In FIG. 20, an example of the mobile terminal's operation of carrying out communications at fe of a cell A shown in FIG. 17 is described.

The base station, in step ST2001, transmits measurement configuration information to the mobile terminal.

A concrete example of configuration information which is newly disposed in the above-mentioned measurement configuration (Measurement Configuration) information will be mentioned hereafter.

(1) Newly dispose configuration information about carriers in the serving cell. In a concrete example, configuration information about carriers in the serving cell is newly disposed in measurement object information included in the measurement configuration information. As an alternative, frequency information about frequencies at which synchronization signals (P-SS, S-SS, etc.) of the serving cell are transmitted (in FIG. 17, fa, fb, fc, and fd) is newly disposed in the measurement object information included in the measurement configuration information. By using this method, commonality of a measurement configuring operation can be provided across LTE-support mobile terminals and LTE-A-support mobile terminals which are served by a carrier aggregation-capable base station. As a result, there can be provided an advantage of avoiding the complexity of the mobile communication system. As an alternative, carrier identifiers, instead of the frequency information, can be mapped. A correspondence between the carrier identifiers to identify and pieces of actual frequency information is determined statically or semi-statically. As a result, in the case of notifying the carrier identifiers, the amount of information can be reduced and the effective use of radio resources can be as accomplished compared with the case in which the frequency information is notified.

(2) Newly dispose configuration information about carriers in the serving cell. As a concrete example, configuration information in the serving cell is newly disposed in the system information about multiple carriers, as measurement configuration information, separately from the existing measurement configuration information. The system information about multiple carriers can be system information for LTE-A system or system information for release 10. Measurement configuration information in which the frequency information about frequencies at which synchronization signals (P-SS, S-SS, etc.) of the serving cell are transmitted is included is newly disposed separately from the measurement configuration information according to the current 3GPP specifications (release 8). According to this method, there can be provided an advantage of being able to construct a flexible mobile communication system while preventing any change to an existing LTE system. As an alternative, carrier identifiers, instead of the frequency information, can be mapped. A correspondence between the carrier identifiers and pieces of actual frequency information is determined statically or semi-statically. As a result, in the case of notifying the carrier identifiers, the amount of information can be reduced and the effective use of radio resources can be as accomplished compared with the case in which the frequency information is notified.

(3) Newly dispose configuration information about carriers in a neighboring cell. In a concrete example, the configuration information about carriers in the serving cell shown in the above-mentioned examples (1) and (2) is simply replaced by configuration information about carriers in a neighboring cell. Therefore, the explanation of the concrete example will be omitted hereafter.

The mobile terminal, in step ST2002, receives the measurement configuration information sent thereto from the base station.

The mobile terminal, in step ST2003, carries out measurements on the serving cell or a neighboring cell on the basis of the measurement configuration information received in step ST2002. In a concrete example, the mobile terminal changes the reception frequency setting according to the frequency information notified thereto (in FIG. 17, fa, fb, fc, and fd), and carries out synchronous processing using the synchronization signals (step 1201 of FIG. 12). After that, the mobile terminal detects a reference signal RS (Reference Signal), and measures the received power.

The mobile terminal, in step ST2004, transmits a measurement report to the base station. According to the current 3GPP specifications (release 8), a PCI (Physical CellIdentity) or a GCI (Global Cell Identity) is included in the measurement report (nonpatent reference 9).

A setting will be shown below is newly disposed in the above-mentioned measurement report (Measurement Report).

(1) Newly dispose information about carriers in the measurement report. In a concrete example of the information about carriers, frequency information about carriers which are to be reported and at which synchronization signals (P-SS, S-SS, etc.) are transmitted (in FIG. 17, fa, fb, fc, and fd) is newly disposed. By using this method, commonality of the measurement configuring operation can be provided across LTE-support mobile terminals and LTE-A-support mobile terminals which are served by a carrier aggregation-capable base station. As a result, there can be provided an advantage of avoiding the complexity of the mobile communication system. As an alternative, carrier identifiers, instead of the frequency information, can be mapped.

(2) Newly dispose a measurement report in which the information about carriers is included separately from the measurement report according to the current 3GPP specifications (release 8). According to this method, there can be provided an advantage of being able to construct a flexible mobile communication system while preventing any change to an existing LTE system. Carrier identifiers, instead of the frequency information, can be mapped. Concrete examples of the measurement report which is newly disposed will be shown. (a) Dispose an event for reporting that the reception quality of the current carrier becomes better than a threshold. (b) Dispose an event for reporting that the reception quality of the current carrier gets worse than the threshold. (c) Dispose an event for reporting that the reception quality of another carrier in the same cell (or in the same PCI) becomes better than that of the current carrier. (d) Dispose an event for reporting that the reception quality of another carrier in the same cell (or in the same PCI) becomes better than the threshold. (e) Dispose an event for reporting that the reception quality of the current carrier gets worse than the threshold, and the reception quality of another carrier in the same cell (in the same PCI) becomes better than the threshold.

The base station, in step ST2005, receives the measurement report from the mobile terminal.

The base station, in step ST2006, determines whether or not to perform a handover. When the base station determines that it performs a handover, the base station carries out a handover process as the mobile communication system (the base station, the mobile terminal, etc.). When the base station determines from factors including the processing load of another base station which is a handover destination, that it does not perform a handover, the base station ends the processing.

Variant 2 of Embodiment 3 can provide the following advantages.

Each mobile terminal can measure the reception quality for each carrier in a carrier aggregation-capable base station, and can report the measurement results for each carrier to the base station. The same goes for each anchor carrier and for each of frequencies at which the synchronization signals (P-SS, S-SS, etc.) are transmitted. Therefore, the serving base station can determine whether or not each carrier in a carrier aggregation-capable base station can be selected as a handover destination. As a result, there can be provided an advantage of enabling each mobile terminal to carry out communications with good reception quality after performing a handover. Accordingly, there can be provided an advantage of improving the downlink data throughput and making the effective use of radio resources in the mobile communication system.

Variant 2 of Embodiment 3 can be used in combination with Embodiment 1, Variant 1 of Embodiment 1, Variant 2 of Embodiment 1, Variant 3 of Embodiment 1, Variant 4 of Embodiment 1, Embodiment 2, Variant 1 of Embodiment 2, Embodiment 3, or Variant 1 of Embodiment 3.

The present invention is explained above focusing on the drawings in which the component carriers are arranged contiguously. The present invention can be applied also to a case in which the component carriers are arranged non-contiguously.

Although the present invention is described above focusing on an LTE system (E-UTRAN) and an LTE-advanced (LTE-Advanced) system, the present invention can be applied also to a W-CDMA system (UTRAN, UMTS).

Embodiment 4

Because a problem to be solved by Embodiment 4 is the same as that shown in Variant 1 of Embodiment 3, the explanation of the problem will be omitted hereafter.

A solution provided by this Embodiment 4 will be shown hereafter.

Even if a neighboring cell is a carrier aggregation-capable one in a reselecting operation, the target carrier for reselection and evaluation can be the same (can have the same frequency) as an anchor carrier at the time of RRC_IDLE of a serving cell. In this case, the reselection and evaluation can be merely a measurement for reselection.

As an alternative, even if a neighboring cell is a carrier aggregation-capable one in a reselecting operation and whether the carrier aggregation-capable cell supports anchor carriers at the time of RRC_IDLE of a serving cell is unknown, the target carrier for reselection and evaluation can be the same (can have the same frequency) as an anchor carrier at the time of RRC_IDLE of the serving cell.

An anchor carrier at the time of RRC_IDLE can be a component with which to monitor paging information or system information at the time of RRC_IDLE. An anchor carrier can be multi carrier anchor or single carrier anchor. One or more anchor carriers can be provided.

As an alternative, even if a neighboring cell is a carrier aggregation-capable one in a reselecting operation, the target carrier for reselection and evaluation can be a component carrier falling within a frequency band in which the current carrier (frequency) on which the mobile terminal is camping is included. In this case, the reselection and evaluation can be merely a measurement for reselection.

As an alternative, even if a neighboring cell is a carrier aggregation-capable one in a reselecting operation and whether the carrier aggregation-capable cell supports a component carrier falling within a frequency band in which the current carrier (frequency) on which the mobile terminal is camping is included is unknown, the target carrier for reselection and evaluation can be a component carrier falling within the frequency band in which the current carrier (frequency) on which the mobile terminal is camping is included. In this case, the reselection and evaluation can be merely a measurement for reselection.

In systems, such as UTRA, LTE, and LTE-A systems, both uplink and downlink are designed in such a way that system components operate in a frequency band which consists of some contiguous frequencies. Each of these frequency bands will be referred to as a frequency band from here on. Component carriers included in the same frequency band have a common physical property or common radio characteristic.

In a concrete example of a method of notifying the component carriers included in a frequency band to mobile terminals, broadcast information from a base station to mobile terminals, e.g. a BCCH (MIB or SIB) is used as a concrete example to notify the component carriers. As an alternative, the component carriers can be statically determined in the mobile communication system. In the case in which the component carriers are statically determined, there can be provided an advantage of making the effective use of radio resources and preventing communication errors caused by radio communications from occurring.

Embodiment 4 can provide the following advantages.

There can be provided an advantage of in the mobile communication system in which a carrier aggregation-capable base station is included, reducing the control delay of the mobile communication system which occurs in the reselecting operation, reducing the processing load of each mobile terminal, and reducing the power consumption of each mobile terminal.

Variant 1 of Embodiment 4

A problem to be solved by Variant 1 of Embodiment 4 will be explained hereafter.

Because the wavelength and the period also differ when the frequency differs, each reception point receives a different influence and has different reception quality even if the transmission wave propagates over the same distance through the same route. Therefore, reselection of a component carrier with which to receive a downlink signal from a neighboring cell according to the reception quality is effective for an improvement in the reception quality.

On the other hand, like in the case of Embodiment 3, a case in which cell selection and evaluation of a plurality of multiple carriers or component carriers included in a neighboring cell is carried out is considered.

In order for a mobile terminal to receive information showing a plurality of multiple carriers or component carriers included in the above-mentioned neighboring cell, the mobile terminal needs to receive and decode the broadcast information from the neighboring cell. Therefore, there arises a problem that the control delay of the mobile communication system increases, and the power consumption of the mobile terminal increases.

To solve this problem, in Variant 1 of Embodiment 3 and in Embodiment 4, a reselecting operation at the time when the neighboring cell is a carrier aggregation-capable one is disclosed. However, although this reselecting operation makes it possible to suppress the increase in the control delay of the mobile communication system and the increase in the power consumption of each mobile terminal, there arises another problem that the reselecting operation according to the reception quality for each component carrier in the carrier aggregation-capable cell cannot provide a sufficient improvement in the reception quality.

In this Variant 1 of Embodiment 4, a method for solving the problem of an increase in the control delay and an increase in the power consumption increase of each mobile terminal while providing an advantage of providing an improvement in the reception quality by carrying out a reselecting operation according to the reception quality for each component carrier in a carrier aggregation-capable cell will be considered.

A solution provided by this Variant 1 of Embodiment 4 will be shown hereafter.

A serving base station (serving cell) notifies component carrier information about neighboring cells to mobile terminals.

A mobile terminal which has received the component carrier information of neighboring cells carries out a cell reselecting operation by using the component carrier information about neighboring cells.

A concrete example of a method of notifying the component carrier information about neighboring cells will be shown hereafter.

By adding the component carrier information about neighboring cells to the broadcast information, information associated with a mobile terminal at the time of RRC_IDLE which is reselection of a cell can be notified via the broadcast information which a mobile terminal at the time of RRC_IDLE monitors. As a result, a mobile terminal at the time of RRC_IDLE does not have to receive any additional information. Accordingly, there can be provided an advantage of preventing the increase in the power consumption of each mobile terminal.

By adding the component carrier information about neighboring cells to the system information about multiple carriers included in the broadcast information, an LTE-support mobile terminal can select not to receive any unnecessary information. As a result, there can be provided an advantage of being able to reduce the amount of data which an LTE-support mobile terminal needs to decode, thereby being able to reduce the processing load.

By adding the component carrier information about neighboring cells by using an SIB included in the broadcast information, an increase in the amount of information of an MIB included in the broadcast information can be prevented. Since an MIB is broadcast using a PBCH, it is necessary to prevent an increase of the amount of information as much as possible.

There can be provided the following advantages by adding the component carrier information about neighboring cells to SIB4 included in the SIB included in the broadcast information. It has been planned that information about neighboring cells is mapped onto the SIB4. If the component carrier information about neighboring cells which is information about neighboring cells is added to the SIB4 in which similar parameters are included, each mobile terminal becomes able to acquire the similar parameters by receiving the same system information. Therefore, there can be provided an advantage of avoiding the complexity of the mobile communication system, and preventing a control delay from occurring in the mobile communication system. As an alternative, although it has been planned that information about neighboring cells having the same frequency is transmitted via the SIB4. Information about neighboring cells having a different frequency can be added to the SIB4, and can be used to notify the component carrier information about neighboring cells which is information about neighboring cells having a different frequency. As a result, each mobile terminal becomes able to acquire the similar parameters by receiving the same system information. Therefore, there can be provided an advantage of avoiding the complexity of the mobile communication system, and preventing a control delay from occurring in the mobile communication system.

By adding the component carrier information about neighboring cells to a neighboring cell list included in the SIB of the broadcast information, there can be provided the following advantages. The PCIs of neighboring cells are included in the neighboring cell list. Each mobile terminal becomes able to acquire the PCIs of neighboring cells and the component carrier information about neighboring cells, which are parameters of neighboring cells which each mobile terminal can use for prevention of the occurrence of a control delay in the cell reselection, and for reduction in the power consumption of each mobile terminal, by receiving the same system information or the same list. Therefore, there can be provided an advantage of avoiding the complexity of the mobile communication system, and preventing a control delay from occurring in the mobile communication system. This neighboring cell list can be included in the neighboring cell information included in the SIB4, and the same advantages can be provided.

By adding the component carrier information about neighboring cells to an SIB newly added in LTE-A, an LTE-support mobile terminal can select not to receive any unnecessary information. As a result, there can be provided an advantage of being able to reduce the amount of data which an LTE-support mobile terminal needs to decode, thereby being able to reduce the processing load.

A concrete example of the component carrier information about neighboring cells will be shown hereafter.

Figure 21:
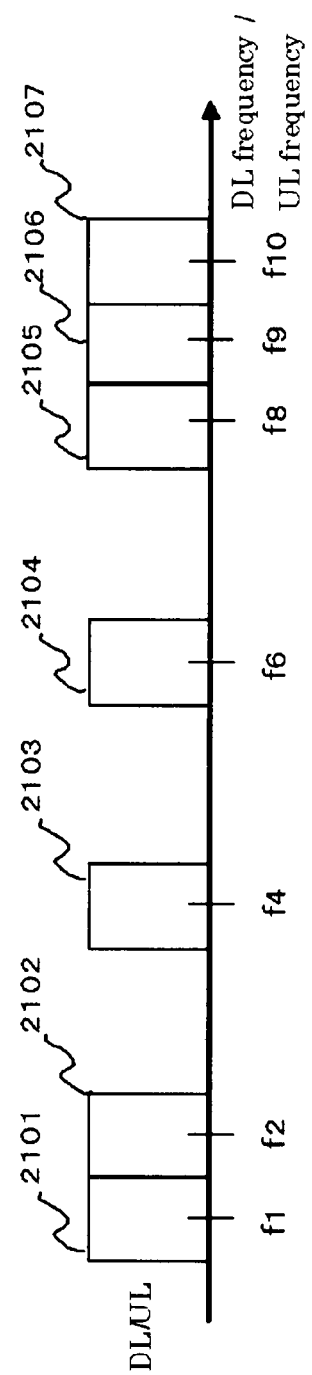
FIG. 21 is a view explaining a first concrete example of component carrier information of a neighboring cell in accordance with Variant 1 of Embodiment 4.

As a first concrete example, the frequency of a component carrier is provided. The first concrete example will be explained with reference to FIG. 21. 2101 to 2107 denote components on which carrier aggregation can be performed in the base station. f1 to f10 denote the component carrier frequencies of components. In the first concrete example, each of component carrier frequencies as shown in FIG. 21 is used as the component carrier information. In the case of the component 2104 of FIG. 21, the component carrier frequency f6 is provided as a concrete example of the component carrier information. This concrete example has a merit of being able to support a change in the carrier frequency of the mobile communication system with flexibility because an absolute value is mapped.

As an alternative, a value which is derived from the absolute value of the component carrier frequency by using a deriving equation which is determined beforehand can be mapped. In this case, the same advantage can be provided.

In FIG. 21, the horizontal axis shows frequency. Although DL frequencies differ from UL frequencies in FDD, the DL frequencies and the UL frequencies are described on the same axis for the sake of simplicity. Similarly, for the sake of simplicity, each downlink component (downlink CC, DL CC) is the same as an uplink component (uplink CC, UL CC) corresponding to each DL CC (they make a pair band), and pairs of downlink and uplink components are designated by 1501 to 1507 in the figure. The present invention is not limited to this example, and the order in which the downlink CCs are arranged on the frequency axis can differ from that in which the corresponding uplink CCs are arranged. Except where specifically noted in this specification, a component or a component carrier which is referred to in this specification shows either a downlink component or a downlink component and an uplink CC corresponding to this downlink component (they make a pair band) together.

Figure 22:
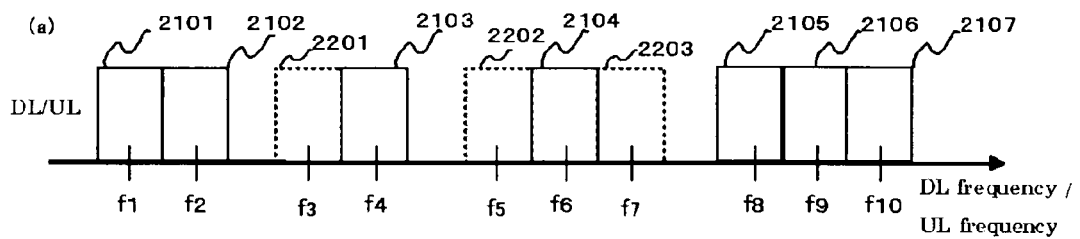
FIG. 22 is a view explaining a second concrete example of the component carrier information of a neighboring cell in accordance with Variant 1 of Embodiment 4.

As a second concrete example, there is a component identifier. The second concrete example will be explained with reference to FIG. 22. Because the same reference numerals as those shown in FIG. 21 denote like parts, the explanation of the parts will be omitted hereafter. 2101 to 2107, and 2201 to 2203 denote components used in the mobile communication system. In the second concrete example, each of component identifiers as shown in FIG. 22(*b*) is used as the component carrier information. In the mobile communication system, the carrier frequencies of the components (2101 to 2107, and 2201 to 2203) which are used in, for example, an LTE-A system are brought into correspondence with the component identifiers (FIG. 22(*b*)). When the component carrier information corresponds to the component 2104 of FIG. 22, information about the component identifier "CC#6" is used as a concrete example of the component carrier information. A receive side which has received the component identifier "CC#6" determines that "CC#6" shows the component carrier frequency f6 on the basis a table showing the correspondence between the carrier frequencies of the components used in the mobile communication system of FIG. 22(*b*) and the component identifiers. As compared with the first concrete example of mapping an absolute value, an identifier is mapped in this second concrete example. Therefore, in the second concrete example, the amount of information added to the broadcast information, i.e. the number of information bits can be further reduced. This results in an advantage of making the effective use of radio resources.

The table, as shown in FIG. 22(*b*), showing the correspondence between the carrier frequencies of the components used in the mobile communication system and the component identifiers is notified from the network side to mobile terminals. In a concrete example of a method of notifying the table, the broadcast information from the base station to mobile terminals is used. A BCCH (MIB or SIB) is used as a concrete example of the broadcast information to notify the table. By thus notifying the information for bringing the physical information about the component carriers into correspondence with the information for identifying the component carriers from the network side to mobile terminals, there can be provided an advantage of maintaining the merit of being able to support a change of the carrier frequency in the mobile communication system with flexibility while reducing the amount of information of the component carrier information.

As an alternative, the table, as shown in FIG. 22(*b*), showing the correspondence between the carrier frequencies of the components used in the mobile communication system and the component identifiers can be determined statically in the mobile communication system. As a result, it becomes unnecessary to notify the table showing the correspondence from the network side to mobile terminals, and there can be provided an advantage of making the effective use of radio resources and preventing communication errors caused by radio communications from occurring.

Figure 23:
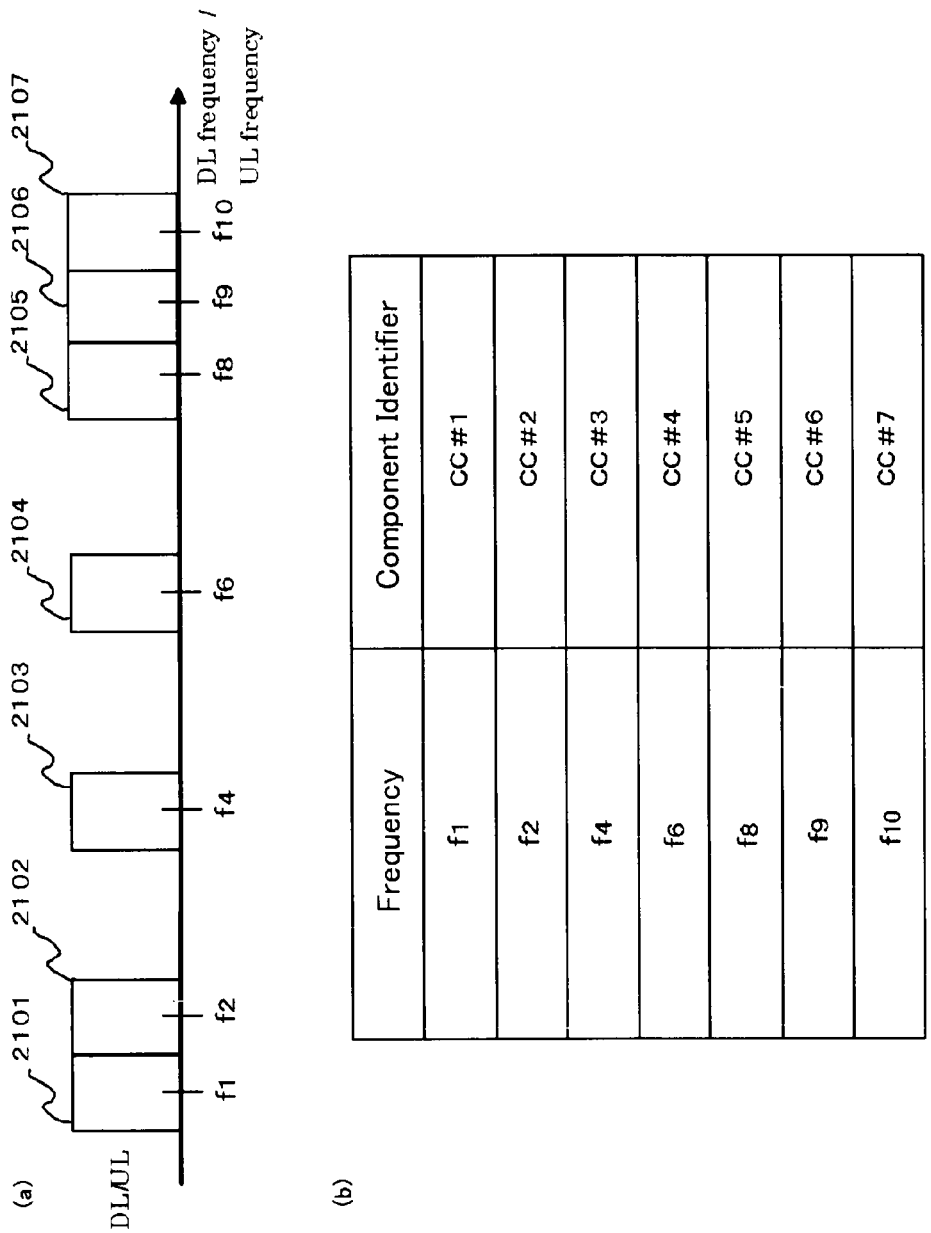
FIG. 23 is a view explaining a third concrete example of the component carrier information of a neighboring cell in accordance with Variant 1 of Embodiment 4.

As a third concrete example, there is a component identifier. The third concrete example will be explained with reference to FIG. 23. Because the same reference numerals as those shown in FIG. 21 denote like parts, the explanation of the parts will be omitted hereafter. In the third concrete example, each of component identifiers as shown in FIG. 23(*b*) is used as the component carrier information. The carrier frequencies of the components served by the base station are brought into correspondence with the component identifiers (FIG. 23(*b*)). In a concrete example, in the case of the component 2104 of FIG. 23, the component identifier "CC#4" is used as the component carrier information. A receive side which has received the component identifier "CC#4" determines that "CC#4" shows the component carrier frequency f6 on the basis a table showing the correspondence between the carrier frequencies of the components shown in FIG. 23(*b*) and the component identifiers. As compared with the first concrete example of mapping an absolute value, and with the second concrete example of mapping an identifier corresponding to a component carrier frequency which the mobile communication system can serve, an identifier corresponding to a component carrier frequency which the base station can have is mapped in the third concrete example. Therefore, in the third concrete example, the amount of information including both the component carrier information and the correspondence list between the component carrier frequencies and the component identifiers, i.e. the number of information bits can be further reduced. This results in an advantage of making the effective use of radio resources.

The correspondence list shown in FIG. 23(*b*) between the component carrier frequencies and the component identifiers is notified from the network side to mobile terminals. In a concrete example of a method of notifying the correspondence list, the base station notifies the correspondence list to mobile terminals using the broadcast information. A BCCH (MIB or SIB) is used as a concrete example of the broadcast information. By thus notifying the information for bringing the physical information about the component carriers into correspondence with the information for identifying the component carriers from the network side to mobile terminals, there can be provided an advantage of maintaining the merit of being able to support a change of the carrier frequency in the mobile communication system with flexibility while reducing the amount of information of both the component carrier information and the correspondence list between the component carrier frequencies and the component identifiers.

Figure 24:
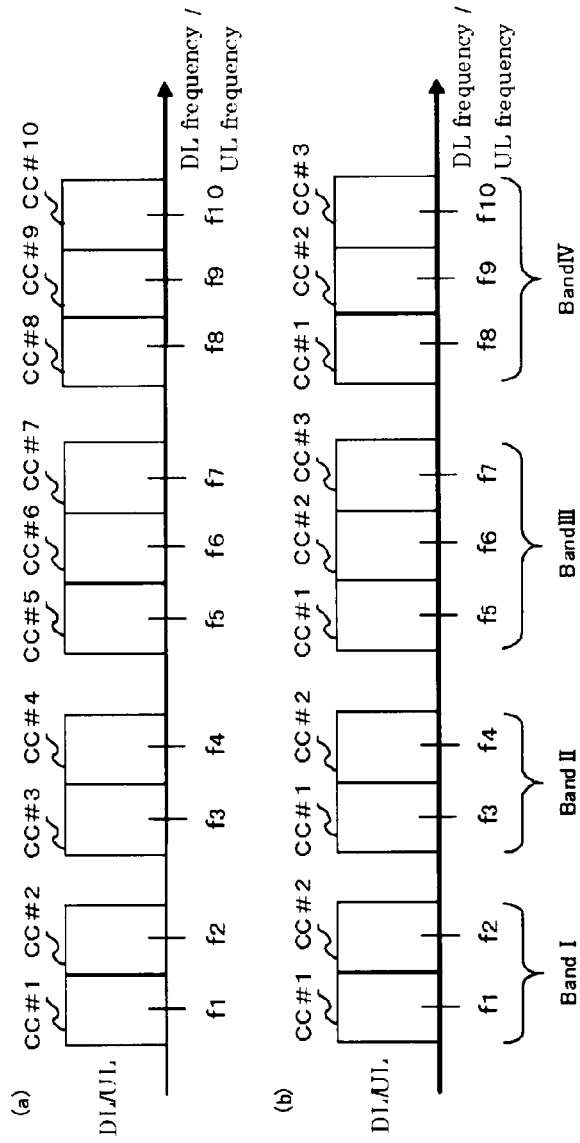
FIG. 24 is a view explaining a fourth concrete example of the component carrier information of a neighboring cell in accordance with Variant 1 of Embodiment 4.

As a fourth concrete example, there is a frequency band. The fourth concrete example will be explained with reference to FIG. 24(*b*). For example, a case in which component carriers of f8 and f9 exist in a neighboring cell will be considered. In this case, information about "Band IV" is used as the component carrier information about neighboring cells. Information about component carriers which can be included in each frequency band is notified from the network side to mobile terminals. The information about component carriers which can be included in each frequency band is shown in FIG. 24(*c*) in a frequency band configuration which is shown as an example in FIG. 24(*b*). For example, the component carriers which can be included in a frequency band of "Band I" are "f1" and "f2", the component carriers which can be included in a frequency band of "Band II" are "f3" and "f4", the component carriers which can be included in a frequency band of "Band III" are "f5", "f6", and "f7", and the component carriers which can be included in a frequency band of "Band IV" are "f8", "f9", and "f10". As the information about component carriers which can be included in each frequency band, component identifiers shown in the second concrete example or those shown in the third concrete example can be alternatively used. Because the component information about one or more components can be replaced by the information about one frequency band in the fourth concrete example as compared with the first concrete example, the second concrete example, and the third concrete example, there can be provided an advantage of being able to reduce the amount of information of the component carrier information, and making the effective use of radio resources.

In a concrete example of a method of notifying the information about component carriers which can be included in each frequency band, the broadcast information from the base station to mobile terminals is used. A BCCH (MIB or SIB) is used as a concrete example of the broadcast information to notify the correspondence list. As an alternative, the information about component carriers which can be included in each frequency band can be determined statically in the mobile communication system. As a result, it becomes unnecessary to notify the information about component carriers which can be included in each frequency band from the network side to mobile terminals, and there can be provided an advantage of making the effective use of radio resources and preventing communication errors caused by radio communications from occurring.

Concrete examples of numbering the component identifiers will be shown hereafter.

In a first concrete example, numbers continuously increasing are assigned to the components in the mobile communication system, in an LTE-A system, or in a base station. In a concrete example of the assignment of numbers in sequence, numbers in sequence are assigned to the components arranged in order of ascending frequency or numbers continuously decreasing are assigned to the components arranged in order of descending frequency, as shown in FIG. 24(a).

In a second concrete example, numbers in sequence are assigned to the components included in each frequency band in the mobile communication system, in the LTE-A system, or in the base station. In a concrete example of the assignment of numbers in sequence, numbers continuously increasing are assigned to the components included in each frequency band and arranged in order of ascending frequency or numbers continuously decreasing in order of descending frequency, as shown in FIG. 24(b). In this case, when a component identifier shown in the above-mentioned second or third concrete example is used as control information showing which component is associated with this control information, the component carrier information is shown by a frequency band and a component identifier.

Concrete examples of adding information about some component carriers of some neighboring cells to the broadcast information will be shown hereafter.

In a first concrete example, component carrier information about all the component carriers of all the neighboring cells which are supported by all the neighboring cells is added to the broadcast information. Because each mobile terminal can acquire the information about all the component carriers which each mobile terminal can select in performing cell selection in the first concrete example, there can be provided an advantage of providing an improvement in the reception quality.

In a second concrete example, component carrier information which is a subset of the component carrier information about all the component carriers supported by all the neighboring cells, and which is supported by neighboring cells which are a subset of all the neighboring cells is added to the broadcast information. In other words, component carrier information which is a subset of the component carrier information about all the component carriers which each mobile terminal can select in performing cell selection is added to the broadcast information. Because in the second concrete example the component carrier information about neighboring cells that each mobile terminal uses in the cell reselecting operation can be reduced as compared with the first concrete example, the processing load on the mobile communication system is reduced, the increase in the control delay occurring in the mobile communication system is suppressed, and the amount of information of the component carrier information is reduced. Therefore, there can be provided an advantage of making the effective use of radio resources.

Concrete examples of a method of selecting the subset of the component carrier information which is added to the broadcast information in the network side will be shown hereafter.

In a first concrete example, the network side adds component carrier information about neighboring cells which the network side desires to include in the target for cell reselection in each mobile terminal to the broadcast information. According to the first concrete example, there can be provided an advantage of enabling the mobile communication system to perform the control operation with flexibility.

In a second concrete example, each mobile terminal adds carrier information about components on each of which each mobile terminal can camp to the broadcast information. As concrete examples of a component on which each mobile terminal can camp, there are a component (1) which broadcasts the system information, a component (2) which broadcasts synchronization signals, a component (3) which transmits paging information, and an anchor carrier (4) at the time of RRC_IDLE. In the second concrete example, component carrier information about component carries which each mobile terminal can actually select in the cell reselecting operation can be added. Therefore, there can be provided an advantage of reducing the processing load on the mobile communication system, and suppressing the increase in the control delay occurring in the mobile communication system.

Figure 25:
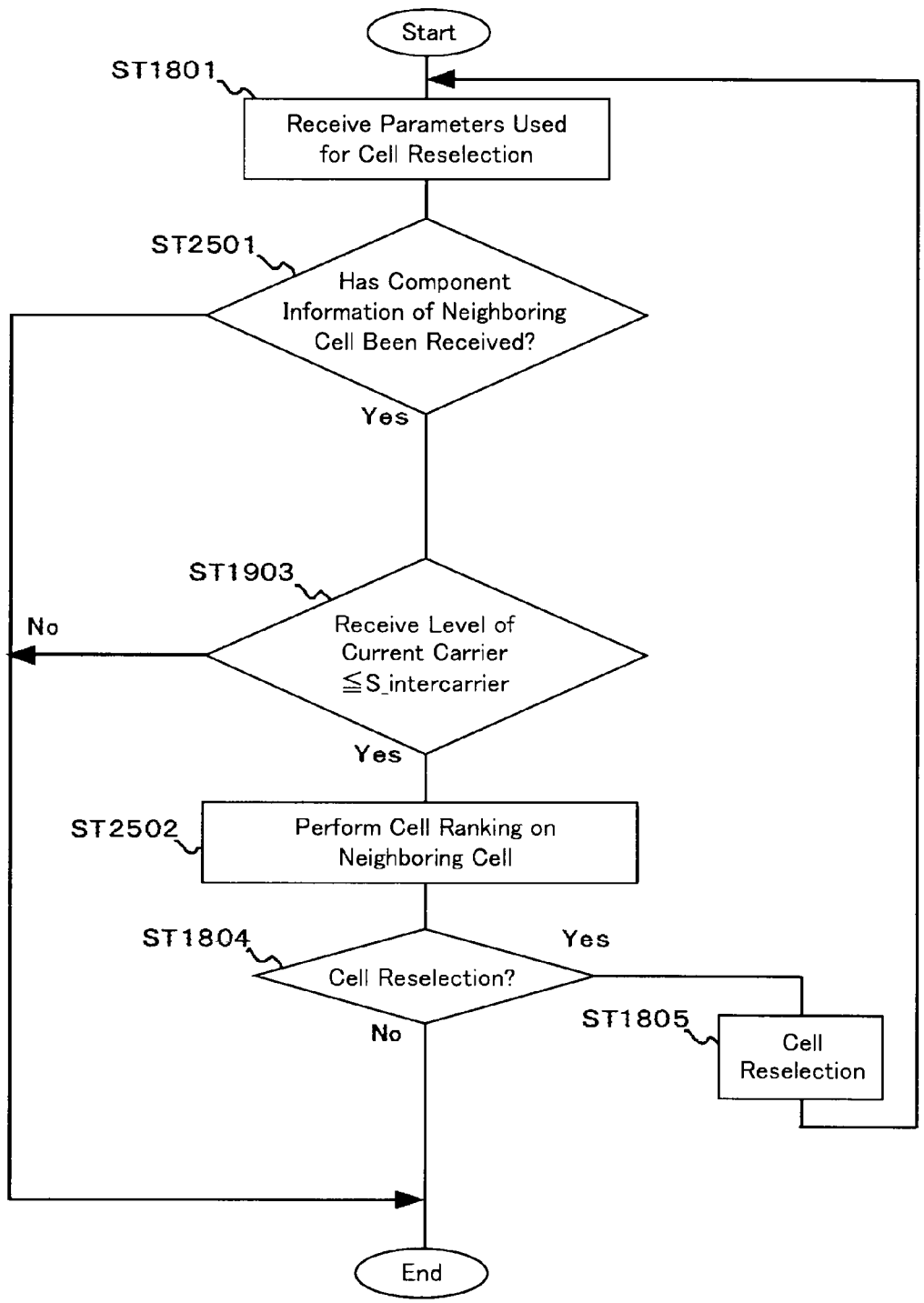
FIG. 25 is a flow chart showing an operation of a mobile terminal in accordance with Variant 1 of Embodiment 4.

An example of the cell reselecting operation of a mobile terminal using this Variant 1 of Embodiment 4 is described in FIG. 25. Because the same processes or like processes in FIG. 25 are performed in the steps designated by the same reference characters as those shown in FIGS. 18 and 19, the explanation of the steps designated by the same reference characters will be omitted hereafter.

The mobile terminal, in step ST2501, determines whether it has received the component information about neighboring cells. When the mobile terminal determines that it has received the component information about neighboring cells, the mobile terminal makes a transition to step ST1903. In contrast, when the mobile terminal determines that it has not received the component information about neighboring cells, the mobile terminal ends the processing.

The mobile terminal, in step ST2502, carries out cell ranking on the basis of information included in the received component information about neighboring cells. In a concrete example, the mobile terminal carries out cell ranking for each component carrier which it derives from the received PCIS of neighboring cells and the received component information about neighboring cells. Because a concrete example of the cell ranking is the same as that shown in step ST1803, the explanation of the concrete example will be omitted hereafter. When the network side specifies a target PCI and a component carrier frequency, the mobile terminal does not have to acquire the component information from the system information of the neighboring cell and hence does not have to receive and decode the broadcast information of the neighboring cell, like in the case of using Embodiment 3. Therefore, there can be provided an advantage of suppressing the increase in the control delay occurring in the mobile communication system, and reducing the power consumption of each mobile terminal.

Furthermore, Variant 1 of Embodiment 4, e.g. the operation shown in FIG. 25 as a concrete example, Embodiment 3, e.g. the operation shown in FIG. 19 as a concrete example, or/and a conventional cell reselecting operation, e.g. the operation shown in FIG. 18 as a concrete example can be used in combination with one another. In this case, the order in which the operations are carried out can be arbitrary.

According to Variant 1 of Embodiment 4, there can be provided an advantage of suppressing the problem of the occurrence of a control delay and an increase in the power consumption of each mobile terminal while improving the reception quality by carrying out the reselecting operation according to the reception quality of each component carrier in a carrier aggregation-capable cell.

Variant 2 of Embodiment 4

A problem to be solved by Variant 2 of Embodiment 4 will be explained hereafter.

In Variant 1 of Embodiment 4, by notifying the component carrier information about neighboring cells from the base station to mobile terminals using the broadcast information, there is provided an advantage of suppressing the problem of the occurrence of a control delay and an increase in the power consumption of each mobile terminal while improving the reception quality by carrying out a reselecting operation according to the reception quality of each component carrier in a carrier aggregation-capable cell.

On the other hand, it is necessary to suppress the increase in the amount of information of the broadcast information as much as possible in the viewpoint of the effective use of radio resources.

In this Variant 2 of Embodiment 4, a method of suppressing the amount of information of broadcast information as much as possible while solving the same problem as that solved by Variant 1 of Embodiment 4 will be disclosed.

A solution provided by this Variant 2 of Embodiment 4 will be shown hereafter.

Information showing whether or not a neighboring cell is a carrier aggregation-capable one is notified from a base station to mobile terminals.

A mobile terminal which has received the information showing whether or not a neighboring cell is a carrier aggregation-capable one changes its reselecting operation according to whether or not a neighboring cell is a carrier aggregation-capable one.

As an alternative, when a neighboring cell is a carrier aggregation-capable one, the mobile terminal carries out the reselecting operation according to the reception quality for each component carrier in the neighboring cell. In contrast, when a neighboring cell is not a carrier aggregation-capable one, the mobile terminal does not carry out the reselecting operation according to the reception quality for each component carrier in the neighboring cell.

A concrete example of a method of notifying the information showing whether or not a neighboring cell is a carrier aggregation-capable one will be shown hereafter.

In addition to the concrete example of the method of notifying the component carrier information about neighboring cells according to Variant 1 of Embodiment 4, the following concrete example can be used.

By adding the information showing whether or not a neighboring cell is a carrier aggregation-capable one to SIB3 or SIB5 included in an SIB included in the broadcast information, there can be provided the following advantages. It has been planned that information about neighboring cells is mapped onto the SIB3 or SIB5. If the information showing whether or not a neighboring cell is a carrier aggregation-capable one which is information about neighboring cells is added to the SIB3 or SIB5 in which similar parameters are included, each mobile terminal becomes able to acquire the similar parameters by receiving the same system information. Therefore, there can be provided an advantage of avoiding the complexity of the mobile communication system, and preventing a control delay from occurring in the mobile communication system.

By adding the information showing whether or not a neighboring cell is a carrier aggregation-capable one to a neighboring cell configuration (neighCellConfig) included in the SIB 3 or SIB5 included in the SIB of the broadcast information, there can be provided the following advantage. If the information showing whether or not a neighboring cell is a carrier aggregation-capable one which is information about neighboring cells is added to the neighboring cell configuration in which similar parameters are included, each mobile terminal becomes able to acquire the similar parameters by receiving the same system information. Therefore, there can be provided an advantage of avoiding the complexity of the mobile communication system, and preventing a control delay from occurring in the mobile communication system.

As a concrete example of the information showing whether or not a neighboring cell is a carrier aggregation-capable one, the following examples can be considered.

(1) Information showing whether or not a neighboring cell in question is a carrier aggregation-capable one is defined as the information showing whether or not a neighboring cell is a carrier aggregation-capable one. For example, when the neighboring cell is a carrier aggregation-capable one, the information is set to "1", whereas when the neighboring cell is not a carrier aggregation-capable one, the information is set to "0".

(2) Information showing whether a carrier aggregation-capable cell exists in the neighboring cells of a serving cell is defined as the information showing whether or not a neighboring cell is a carrier aggregation-capable one. For example, when one or more carrier aggregation-capable cells exist in the neighboring cells of the serving cell, the information is set to "1", whereas when no carrier aggregation-capable cells exist in the neighboring cells of the serving cell, the information is set to "0".

Although in the above-mentioned concrete examples, the information showing whether or not a neighboring cell is a carrier aggregation-capable one is expressed as the 1-bit information of "1" or "0", the amount of information is not limited to 1 bit. As an alternative, the information can be set to "0" when a neighboring cell is a carrier aggregation-capable one, whereas the information can be set to "1" when any neighboring cell is not a carrier aggregation-capable one.

The system can be alternatively constructed in such a way that the information showing whether or not a neighboring cell is a carrier aggregation-capable one is notified when a neighboring cell is a carrier aggregation-capable one, whereas the information is not notified when any neighboring cell is not a carrier aggregation-capable one. In contrast with this, the system can be constructed in such a way that the information is not notified when a neighboring cell is a carrier aggregation-capable one, whereas the information is notified when any neighboring cell is not a carrier aggregation-capable one.

When above-mentioned (2) is used as a concrete example of the information showing whether or not a neighboring cell is a carrier aggregation-capable one, there is no necessity to add the information showing whether or not a neighboring cell is a carrier aggregation-capable one for each neighboring cell. Therefore, there can be provided an advantage of making the effective use of radio resources.

Concrete examples of adding information showing whether or not each of some neighboring cells is a carrier aggregation-capable one to the broadcast information will be shown hereafter.

In a first concrete example, information showing whether or not each of all the neighboring cells is a carrier aggregation-capable one is added to the broadcast information. Because each mobile terminal can acquire the information about all the neighboring cells which each mobile terminal can select in performing cell selection in the first concrete example, there can be provided an advantage of providing an improvement in the reception quality.

In a second concrete example, information showing whether or not each of neighboring cells which are a subset of all the neighboring cells, instead of each of all the neighboring cells, is a carrier aggregation-capable one is added to the broadcast information. In other words, the information showing whether or not each of neighboring cells included in a subset is a carrier aggregation-capable one is added to the broadcast information. Because in the second concrete example the information showing whether or not a neighboring cell is a carrier aggregation-capable one that each mobile terminal uses in the cell reselecting operation can be reduced as compared with the first concrete example, the processing load on the mobile communication system is reduced, the increase in the control delay occurring in the mobile communication system is suppressed, and the amount of information of the component carrier information is reduced. Therefore, there can be provided an advantage of making the effective use of radio resources.

A concrete example of a method of selecting the subset including neighboring cells for each of which the information showing whether or not a neighboring cell is a carrier aggregation-capable one is added to the broadcast information in the network side will be shown hereafter.

In a first concrete example, the network side adds the information showing whether or not each of neighboring cells, which the network side desires to include in the target for cell reselection by each mobile terminal, is a carrier aggregation-capable one to the broadcast information. According to the first concrete example, there can be provided an advantage of enabling the mobile communication system to perform the control operation with flexibility.

Figure 26:
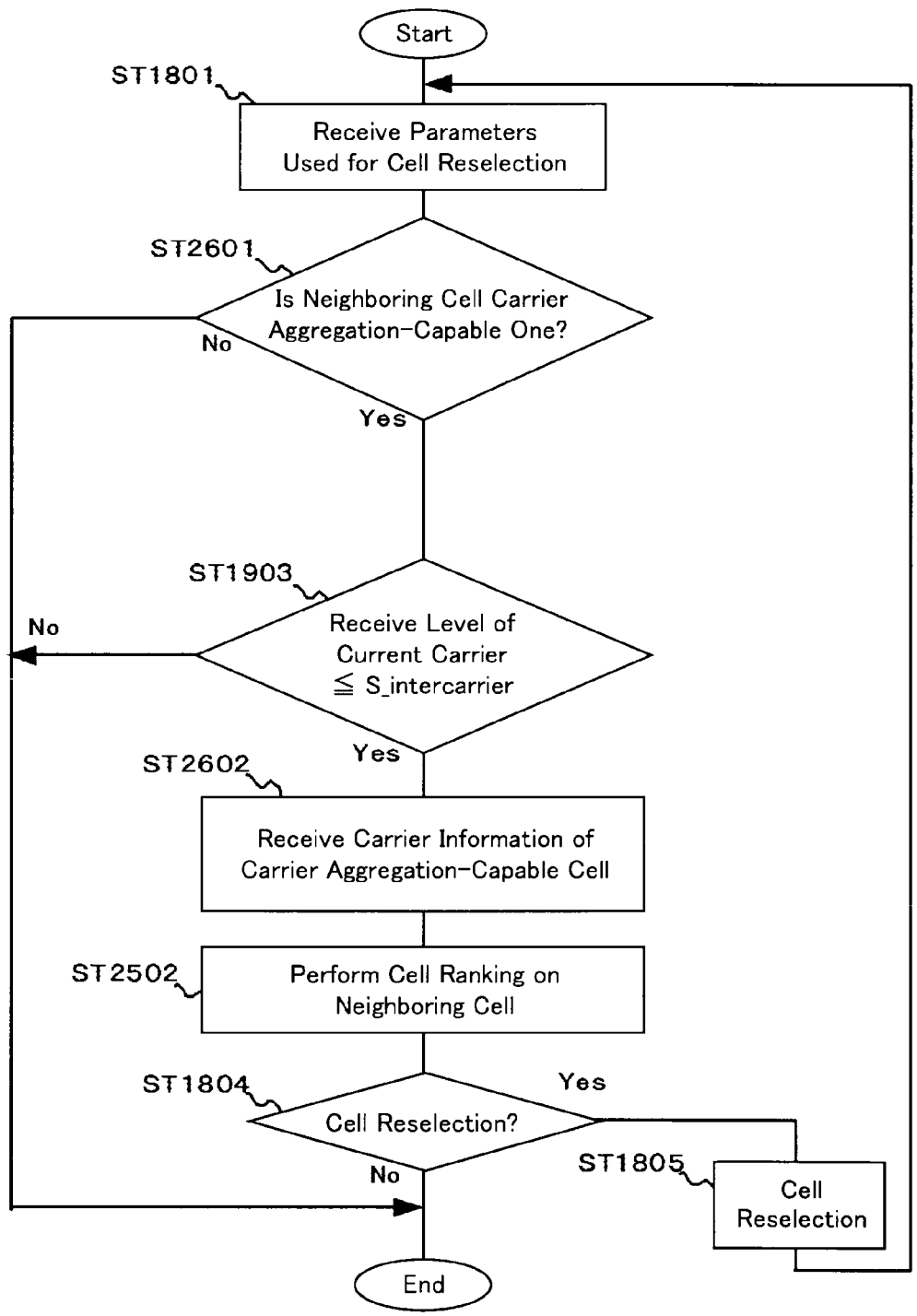
FIG. 26 is a flow chart showing an operation of a mobile terminal in accordance with Variant 2 of Embodiment 4.

An example of the cell reselecting operation of a mobile terminal using this Variant 2 of Embodiment 4 is described in FIG. 26. This example will be explained by using abovementioned (1) as a concrete example of the information showing whether or not a neighboring cell is a carrier aggregation-capable one. Because the same processes or like processes in FIG. 26 are performed in the steps designated by the same reference characters as those shown in FIGS. 18, 19, and 25, the explanation of the steps designated by the same reference characters will be omitted hereafter.

The mobile terminal, in step ST2601, determines whether or not a neighboring cell is a carrier aggregation-capable one. When determining that a neighboring cell is a carrier aggregation-capable one, the mobile terminal makes a transition to step ST1903. In contrast, when determining that any neighboring cell is not a carrier aggregation-capable one, the mobile terminal ends the processing.

The mobile terminal, in step ST2602, receives the carrier information of the carrier aggregation-capable neighboring cell. The mobile terminal receives the system information of the neighboring cell to acquire the carrier information of the neighboring cell. Because the concrete example of the method of notifying the carrier information shown in Embodiment 3 can be used as a concrete example of a method of notifying the carrier information of the neighboring cell, the explanation of the concrete example will be omitted hereafter.

Furthermore, Variant 2 of Embodiment 4, e.g. the operation shown in FIG. 26 as a concrete example, Embodiment 3, e.g. the operation shown in FIG. 19 as a concrete example, and Variant 1 of Embodiment 3, Embodiment 4 or a conventional cell reselecting operation, e.g. the operation shown in FIG. 18 as a concrete example can be used in combination with one another. In this case, the order in which the operations are carried out can be arbitrary.

An example of the cell reselecting operation performed by the mobile terminal in the case of using above-mentioned (2) as a concrete example of the information showing whether or not a neighboring cell is a carrier aggregation-capable one will be explained with reference to FIG. 26. The explanation will be made focusing on a portion different from the case in which above-mentioned (1) is used as a concrete example of the information showing whether or not a neighboring cell is a carrier aggregation-capable one.

The mobile terminal, in step ST2601, determines whether a carrier aggregation-capable cell exists in the neighboring cells. When determining that a carrier aggregation-capable cell exists in the neighboring cells, the mobile terminal makes a transition to step ST1903. In contrast, when determining that no carrier aggregation-capable cell exists in the neighboring cells, the mobile terminal ends the processing.

The mobile terminal, in step ST2602, receives the carrier information of the cell included in the neighboring cells existing in the neighborhood of the serving cell. The mobile terminal receives the system information of the neighboring cell to acquire the carrier information of the neighboring cell. Because the concrete example of the method of notifying the carrier information shown in Embodiment 3 can be used as a concrete example of a method of notifying the carrier information of the neighboring cell, the explanation of the concrete example will be omitted hereafter.

Furthermore, the mobile terminal can carry out the following cell reselecting operation by using the information showing the information showing whether or not a neighboring cell in question is a carrier aggregation-capable one which is the concrete example (1) of the information showing whether or not a neighboring cell is a carrier aggregation-capable one.

A mobile terminal which desires high speed communications, an LTE-A-support mobile terminal, a mobile terminal which supports 3GPP release 10 or later, a mobile terminal which desires carrier aggregation, or a carrier aggregation-capable mobile terminal can determine whether or not to reselect a neighboring cell by using the information showing whether or not the neighboring cell is a carrier aggregation-capable one.

As an alternative, when the information showing whether or not a neighboring cell is a carrier aggregation-capable one shows that the neighboring cell is a carrier aggregation-capable one, a mobile terminal which desires high speed communications can include this neighboring cell into the target for cell reselection. In contrast, when the information showing whether or not a neighboring cell is a carrier aggregation-capable one shows that the neighboring cell is not a carrier aggregation-capable one, a mobile terminal which desires high speed communications can exclude this neighboring cell from the target for cell reselection.

As a result, there can be provided an advantage of enabling the above-mentioned mobile terminal to continuously carry out carrier aggregation, i.e. carry out high speed communications.

Variant 2 of Embodiment 4 can provide the following advantages.

There can be provided an advantage of suppressing the amount of information of the broadcast information as much as possible while suppressing the problem of an increase in the control delay and an increase in the power consumption of each mobile terminal, and improving the reception quality by making each mobile terminal carry the reselecting operation according to the reception quality for each component carrier in a carrier aggregation-capable cell.

Embodiment 5

A problem to be solved by Embodiment 5 will be explained. When such a measurement configuration as shown in the solution described in Variant 2 of Embodiment 3 is not set to each mobile terminal by a network side, any method of measuring the reception quality for each component of a carrier aggregation-capable neighboring base station cannot be implemented. Therefore, when this measurement configuration is not set to each mobile terminal by the network side, the problem described in Variant 2 of Embodiment 3 arises again.

A solution provided by this Embodiment 5 will be shown hereafter. Each mobile terminal receives the system information of a neighboring cell and measures the reception quality for each component of the neighboring cell on the basis of the carrier information of the neighboring cell, and notifies the measurement results to the network side. Because the concrete example of the method of notifying the carrier information shown in Embodiment 3 can be used as a concrete example of a method of notifying the carrier information of the neighboring cell, the explanation of the concrete example will be omitted hereafter. Because a measurement report shown in Variant 2 of Embodiment 3 can be used as a method of notifying the measurement results to the network side, the explanation of the notifying method will be omitted hereafter.

Embodiment 5 can provide the following advantages. Even in the case in which the measurement configuration is not set to a mobile terminal by the network side, the mobile terminal becomes able to measure the reception quality for each component of a carrier aggregation-capable neighboring base station. Therefore, the mobile terminal can report the measurement results for each carrier to the base station. As a result, the serving base station can determine whether or not each carrier of a carrier aggregation-capable base station is suitable for the target to be selected as a handover destination. As a result, there can be provided an advantage of enabling each mobile terminal to carry out communications with good reception quality after performing a handover. Accordingly, there can be provided another advantage of improving the downlink data throughput and making the effective use of radio resources in the mobile communication system.

Variant 1 of Embodiment 5

A problem to be solved by Variant 1 of Embodiment 5 will be explained hereafter. Because the wavelength and the period also differ when the frequency differs, each reception point receives a different influence and has different reception quality even if the transmission wave propagates over the same distance through the same route. Therefore, reselection of a component carrier with which to receive a downlink signal from a neighboring cell according to the reception quality is effective for an improvement in the reception quality.

However, in order to implement Embodiment 5, each mobile terminal needs to receive the carrier information of a neighboring cell. In a concrete method, each mobile terminal needs to receive the system information of the neighboring cell, the system information about multiple carriers, the system information about anchor carriers, etc.

These necessities show that when Embodiment 5 is applied to the handover operation, each mobile terminal needs to receive and decode the broadcast information (MIB, SIB, etc.) of the neighboring cell when measuring the reception quality of the neighboring cell.

Because each mobile terminal needs to receive and decode the broadcast information of the neighboring cell, the control delay increases. Particularly SIB information is mapped onto a PDSCH. Therefore, because each mobile terminal needs to receive a PDCCH and also receive the SIB information on the PDSCH on the basis of scheduling information mapped onto the received PDCCH, the control delay increases.

When each mobile terminal carries out a reception quality measurement for handover operation for each of a plurality of carriers of a neighboring cell with Embodiment 5 being applied to the neighboring cell, as mentioned above, there arises a problem that the control delay of the mobile communication system increases, the processing load of each mobile terminal increases, and the power consumption of each mobile terminal increases.

A solution provided by this Variant 1 of Embodiment 5 will be shown hereafter. Each mobile terminal restricts the component carriers which it includes into the target for reception quality evaluation when performing a handover operation regardless of whether or not a neighboring cell is a carrier aggregation-capable one or regardless of the component carriers which are supported by a neighboring cell. As an alternative, each mobile terminal restricts the blind detection, i.e. the target for measurement of reception quality which does not depend on a configuration set up by the network side. In this case, the handover operation can be merely a measurement for handover.

Even if a neighboring cell is a carrier aggregation-capable one in the handover operation or even in a case in which there is no cell list in the measurement configuration and a plurality of carrier frequencies are set, the target carrier for reception quality evaluation in the handover operation is a current carrier (frequency), a system frequency, or a frequency having the highest priority.

Each mobile terminal acquires the system frequency and the frequency having the highest priority from the broadcast information (MIB, SIB, etc.) of the serving cell.

As an alternative, even if a neighboring cell is a carrier aggregation-capable one in the handover operation or even in a case in which there is no cell list in the measurement configuration and a plurality of carrier frequencies are set, the target carrier for reception quality evaluation in the handover operation is a carrier (frequency) which is the same as either an anchor carrier at the time of RRC_IDLE of the serving cell or an anchor carrier at the time of RRC_CONNECTED of the serving cell.

As an alternative, even if a neighboring cell is a carrier aggregation-capable one in the handover operation, and it is unknown whether the neighboring cell supports either an anchor carrier at the time of RRC_IDLE of the serving cell or an anchor carrier at the time of RRC_CONNECTED of the serving cell, the target carrier for reception quality evaluation in the handover operation can be a carrier (frequency) which is the same as either the anchor carrier at the time of RRC_IDLE of the serving cell or the anchor carrier at the time of RRC_CONNECTED of the serving cell.

A component with which to monitor paging information or system information at the time of RRC_IDLE is referred to as an anchor carrier at the time of RRC_IDLE. An anchor carrier can be a one of multi carrier anchor or single carrier anchor. One or more anchor carriers can be provided.

An anchor carrier at the time of RRC_CONNECTED can be a carrier of a component which each mobile terminal certainly measures or monitors, for example, can be an anchor carrier shown in nonpatent reference 10.

As an alternative, even if a neighboring cell is a carrier aggregation-capable one in the handover operation or even in a case in which there is no cell list in the measurement configuration and a plurality of carrier frequencies are set, the target carrier for reception quality evaluation in the handover operation can be a component carrier included in a frequency band in which the current carrier (frequency) with which the mobile terminal is communicating is included.

As an alternative, even if a neighboring cell is a carrier aggregation-capable one in the handover operation, and it is unknown whether the neighboring cell supports a component carrier included in the frequency band in which the current carrier (frequency) which the mobile terminal is camping on is included, the target carrier for reselection evaluation can be a component carrier included in the frequency band in which the current carrier (frequency) with which the mobile terminal is communicating is included.

In a concrete example of a method of notifying the component carrier included in the frequency band to each mobile terminal, broadcast information from a base station to mobile terminals, e.g. a BCCH (MIB or SIB) is used as a concrete example to notify the component carrier. As an alternative, the component carrier can be statically determined in the mobile communication system. In the case in which the component carrier is statically determined, there can be provided an advantage of making the effective use of radio resources and preventing communication errors caused by radio communications from occurring.

As an alternative, even if a neighboring cell is a carrier aggregation-capable one in the handover operation or even in a case in which there is no cell list in the measurement configuration and a plurality of carrier frequencies are set, the target carrier for reception quality evaluation in the handover operation can be a component carrier to be included in a candidate component carrier set of the serving cell for the mobile terminal in question or a scheduling component carrier of the serving cell for the mobile terminal in question.

As an alternative, even if a neighboring cell is a carrier aggregation-capable one in the handover operation, and it is unknown whether the neighboring cell supports either a component carrier to be included in the candidate component carrier set of the serving cell for the mobile terminal in question or the scheduling component carrier of the serving cell for the mobile terminal in question, the target carrier for reception quality evaluation in the handover operation can be either the component carrier to be included in the candidate component carrier set of the serving cell for the mobile terminal in question or the scheduling component carrier of the serving cell for the mobile terminal in question.

The candidate component carrier set (Candidate Component Carrier Set) is formed by one or more component carriers with which a carrier aggregation-capable base station (can be replaced by a carrier aggregation-capable cell) can carry out data transmission and reception with a UE in an RRC connected state (RRC_CONNECTED state, simply referred to as RRC_CONNECTED), which is proposed by nonpatent reference 10.

The scheduling component carrier (Scheduling Component Carrier) is one or more component carriers with which a base station actually carries out data transmission and reception, which are proposed by nonpatent reference 10.

Variant 1 of Embodiment 5 can provide the following advantages. There can be provided an advantage of reducing the control delay of the mobile communication system which occurs in the handover operation, reducing the processing load of each mobile terminal in the handover operation, and reducing the power consumption of each mobile terminal in the handover operation.

Variant 2 of Embodiment 5

A problem to be solved by Variant 2 of Embodiment 5 will be explained hereafter. Because the wavelength and the period also differ when the frequency differs, each reception point receives a different influence and has different reception quality even if the transmission wave propagates over the same distance through the same route. Therefore, a handover operation according to the reception quality for a component carrier with which to receive a downlink signal from a neighboring cell is effective for an improvement in the reception quality.

On the other hand, a case in which the reception quality evaluation for a plurality of multiple carriers or component carriers included in a neighboring cell is carried out will be considered, like in the case of Embodiment 5.

There occurs a necessity to receive and decode the broadcast information of the neighboring cell in order to receive information showing a plurality of multiple carriers or component carriers included in the neighboring cell. Therefore, there arises a problem that the control delay increases in the mobile communication system, and the power consumption of each mobile terminal increases.

To solve this problem, in Variant 1 of Embodiment 5, a handover operation in the case in which a neighboring cell is a carrier aggregation-capable one is disclosed. However, there arises a problem that although it is possible to suppress the increase in the control delay in the mobile communication system and the increase in the power consumption of each mobile terminal in the handover operation, a sufficient improvement in the reception quality cannot be achieved even if the handover operation is performed according to the reception quality for each component carrier in a carrier aggregation-capable cell.

In this Variant 2 of Embodiment 5, a method of providing an advantage of suppressing the problem of an increase of the control delay and an increase of the power consumption of each mobile terminal while achieving an improvement in the reception quality by carrying out a handover operation according to the reception quality for each component carrier in a carrier aggregation-capable cell will be considered.

A solution provided by this Variant 2 of Embodiment 5 will be shown hereafter. The component carrier information about neighboring cells is notified from the serving base station to mobile terminals. A mobile terminal which has received the component carrier information about neighboring cells carries out a handover operation by using the component carrier information about neighboring cells.

As an alternative, even in a case in which there is no cell list in the measurement configuration, and a plurality of carrier frequencies are set, the mobile terminal which has received the component carrier information about neighboring cells can carry out a handover operation by using the component carrier information about neighboring cells regardless of the set carrier frequencies. In this case, the handover operation can be merely a measurement for handover.

Because the same method as that shown in Variant 1 of Embodiment 4 can be used as a concrete example of a method of notifying the component carrier information about neighboring cells, the explanation of this notifying method will be omitted hereafter. Because a concrete example of the component carrier information about neighboring cells is the same as a concrete example shown in Variant 1 of Embodiment 4, the explanation of the concrete example of the component carrier information will be omitted hereafter. Because a concrete example of the numbering of component identifiers is the same as a concrete example shown in Variant 1 of Embodiment 4, the explanation of the concrete example of the numbering will be omitted hereafter. Because a concrete example of adding information about some component carriers of some neighboring cells to the broadcast information is the same as an concrete example shown in Variant 1 of Embodiment 4, the explanation of the concrete example of adding the information will be omitted hereafter. Because a concrete example of a method of selecting a subset of the component carrier information which is added to the broadcast information in the network side is the same as a concrete example shown in Variant 1 of Embodiment 4, the explanation of the concrete example of the method will be omitted hereafter.

An example of an operation of a mobile terminal in the case of using Variant 2 of Embodiment 5 will be explained with reference to FIG. 20. The serving base station (serving cell), in step ST2001, transmits the component carrier information about neighboring cells to the mobile terminal. The mobile terminal, in step ST2002, receives the component carrier information about neighboring cells which is sent thereto from the serving base station.

The mobile terminal, in step ST2003, makes measurements on a neighboring cell on the basis of the component carrier information about neighboring cells received in step ST2002.

In a concrete example, the mobile terminal measures the reception quality for each received PCI of the neighboring cell and for each component carrier which it derives from the received component information of the neighboring cell. When the network side (serving base station) specifies a target PCI and a component carrier frequency, the mobile terminal does not have to acquire the component information from the system information of the neighboring cell, like in the case of using Embodiment 5. Therefore, there can be provided an advantage of suppressing the increase in the control delay occurring in the mobile communication system, and reducing the power consumption of each mobile terminal.

Even in the case in which there is no cell list in the measurement configuration, and a plurality of carrier frequencies are set, the mobile terminal can make measurements on a neighboring cell only on the basis of the component carrier information about neighboring cells received in step ST2002. As a result, even in the case in which no cell list is included in the measurement configuration, the mobile terminal becomes able to make a measurement report of detected cells (Detected cells) by using the component carrier information about neighboring cells. As a result, there can be provided an advantage of suppressing the control delay of the mobile communication system, and lowering the power consumption of each mobile terminal.

The mobile terminal, in step ST2004, transmits a measurement report to the base station. Because a concrete example of the measurement report is the same as that shown in Variant 2 of Embodiment 3, the explanation of the concrete example of the measurement report will be omitted hereafter.

The base station, in step ST2006, determines whether or not to perform a handover. When the base station determines that it performs a handover, the base station carries out a handover process as the mobile communication system (the base station, the mobile terminal, etc.). In contrast, when the base station determines from a factor, such as the processing load on a base station which is a handover destination, that it does not perform a handover, the base station ends the processing.

In Variant 2 of Embodiment 5, there can be provided an advantage of suppressing the problem of an increase of the control delay and an increase of the power consumption of each mobile terminal while achieving an improvement in the reception quality by carrying out a handover operation according to the reception quality for each component carrier in a carrier aggregation-capable cell.

Variant 3 of Embodiment 5

A problem to be solved by Variant 3 of Embodiment 5 will be explained hereafter. In Variant 2 of Embodiment 5, by notifying the component carrier information about neighboring cells to mobile terminals by using the broadcast information from the serving base station, there is provided an advantage of suppressing the problem of an increase in the control delay and an increase in the power consumption of each mobile terminal while achieving an improvement in the reception quality by carrying out a handover operation according to the reception quality for each component carrier in a carrier aggregation-capable cell.

On the other hand, it is necessary to suppress the increase in the amount of information of the broadcast information as much as possible from the viewpoint of the effective use of radio resources.

In this Variant 3 of Embodiment 5, a method of suppressing the amount of information of the broadcast information as much as possible while solving the same problem as that solved by Variant 2 of Embodiment 5 will be disclosed.

A solution provided by this Variant 3 of Embodiment 5 will be shown hereafter. Information showing whether or not a neighboring cell is a carrier aggregation-capable one is notified from a base station to mobile terminals. A mobile terminal which has received the information showing whether or not a neighboring cell is a carrier aggregation-capable one changes its handover operation according to whether or not a neighboring cell is a carrier aggregation-capable one. As an alternative, when a neighboring cell is a carrier aggregation-capable one, the mobile terminal carries out its handover operation according to the reception quality for each component carrier in the neighboring cell. In contrast, when a neighboring cell is not a carrier aggregation-capable one, the mobile terminal does not carry out its handover operation according to the reception quality for each component carrier in the neighboring cell. In this case, the handover operation can be merely a measurement for handover.

Because a concrete example of a method of notifying the information showing whether or not a neighboring cell is a carrier aggregation-capable one is the same as that shown in Variant 2 of Embodiment 4, the explanation of the concrete example will be omitted hereafter. Because a concrete example of the information showing whether or not a neighboring cell is a carrier aggregation-capable one is the same as that shown in Variant 2 of Embodiment 4, the explanation of the concrete example will be omitted hereafter. Because a concrete example of adding information showing whether or not each of some neighboring cells is a carrier aggregation-capable one to the broadcast information is the same as that shown in Variant 2 of Embodiment 4, the explanation of the concrete example will be omitted hereafter. Because a concrete example of a method of selecting a subset including neighboring cells for each of which the information showing whether or not a neighboring cell is a carrier aggregation-capable one is added to the broadcast information in the network side is the same as shown in Variant 2 of Embodiment 4, the explanation of the concrete example will be omitted hereafter.

An example of an operation of a mobile terminal in the case of using Variant 3 of Embodiment 5 will be explained with reference to FIG. 20. The base station, in step ST2001, transmits the information showing whether or not a neighboring cell is a carrier aggregation-capable one to the mobile terminal. The mobile terminal, in step ST2002, receives the information showing whether or not a neighboring cell is a carrier aggregation-capable one which is sent from the base station.

When a neighboring cell is a carrier aggregation-capable one, the mobile terminal, in step ST2003, receives the carrier information of the carrier aggregation-capable neighboring cell. The mobile terminal receives the system information of the neighboring cell to acquire the carrier information of the neighboring cell. The mobile terminal makes neighboring cell measurements on the basis of the carrier information of the neighboring cell. In contrast, when the neighboring cell is not a carrier aggregation-capable cell, the mobile terminal does not carry out a handover operation according to the reception quality for each component carrier in the neighboring cell.

Even in the case in which there is no cell list in the measurement configuration and a plurality of carrier frequencies are set, the mobile terminal can also make a measurement on only a neighboring cell which is a carrier aggregation-capable one by using the information showing whether or not the neighboring cell is a carrier aggregation-capable one which the mobile terminal has received in step ST2002.

Even in the case in which there is no cell list in the measurement configuration and a plurality of carrier frequencies are set, the mobile terminal can alternatively receive the system information of only a neighboring cell which is a carrier aggregation-capable one by using the information showing whether or not the neighboring cell is a carrier aggregation-capable one which the mobile terminal has received in step ST2002 to acquire the carrier information of the neighboring cell and then make a measurement on the neighboring cell on the basis of the carrier information of the neighboring cell.

The mobile terminal, in step ST2004, transmits a measurement report to the base station. Because a concrete example of the measurement report is the same as that shown in Variant 2 of Embodiment 3, the explanation of the concrete example will be omitted hereafter.

The base station, in step ST2006, determines whether or not to perform a handover. When the base station determines that it performs a handover, the base station carries out a handover process as the mobile communication system (the base station, the mobile terminal, etc.). In contrast, when the base station determines from a factor, such as the processing load on a base station which is a handover destination, that it does not perform a handover, the base station ends the processing.

Furthermore, the mobile terminal can carry out the following handover operation by using the information showing whether or not a neighboring cell in question is a carrier aggregation-capable one which is the concrete example (1) of the information showing whether or not a neighboring cell is a carrier aggregation-capable one.

A mobile terminal which desires high speed communications, an LTE-A-support mobile terminal, a mobile terminal which supports 3GPP release 10 or later, a mobile terminal which desires carrier aggregation, or a carrier aggregation-capable mobile terminal can determine whether or not to transmit the measurement report to a neighboring cell by using the information showing whether or not the neighboring cell is a carrier aggregation-capable one.

As an alternative, when the information showing whether or not a neighboring cell is a carrier aggregation-capable one shows that the neighboring cell is a carrier aggregation-capable one, a mobile terminal which desires high speed communications can include this neighboring cell into the target for transmission of the measurement report. In contrast, when the information showing whether or not a neighboring cell is a carrier aggregation-capable one shows that the neighboring cell is not a carrier aggregation-capable one, a mobile terminal which desires high speed communications can exclude this neighboring cell from the target for transmission of the measurement report.

As a result, there can be provided an advantage of enabling the above-mentioned mobile terminal to continuously carry out carrier aggregation, i.e. carry out high speed communications.

In Variant 3 of Embodiment 5, there can be provided an advantage of suppressing the amount of information of the broadcast information as much as possible while suppressing the problem of an increase in the control delay and an increase in the power consumption of each mobile terminal, and improving the reception quality by making each mobile terminal carry the handover operation according to the reception quality for each component carrier in a carrier aggregation-capable cell.

Variant 4 of Embodiment 5

In Variant 2 of Embodiment 5, in order to solve the problem which occurs when such a measurement configuration as shown in the solution described in Variant 2 of Embodiment 3 is set to each mobile terminal by a network side, the component carrier information about neighboring cells is notified from the serving base station to each mobile terminal. In this variant, in order to solve the above-mentioned problem, information about the component carriers of a cell which is a target is newly set, as target cell information to be notified from a network side, to a mobile terminal when the mobile terminal performs a handover operation. The information about the component carriers of the target cell which is newly disposed, as well as the cell information about the cell which is the target, is notified from the network side to the mobile terminal.

As this information about the component carriers of the cell, configuration information which is newly disposed in measurement configuration information, which is disclosed in Variant 2 of Embodiment 3, can be applied.

In the handover operation, the mobile terminal receives the above-mentioned component carrier information of the target cell as well as the target cell information notified from the network side, and determines the cell which is the handover destination and a component carrier of this cell on the basis of the target cell information and the component carrier information.

As a result, the necessity for the mobile terminal to acquire the component information from the system information of the neighboring cell or the like, as described in Embodiment 5, can be eliminated, and there can be provided an advantage of suppressing the increase in the control delay occurring in the mobile communication system, and reducing the power consumption of each mobile terminal.

Mobility control information can be used as a concrete example of the target cell information notified from the network side to the mobile terminal in the handover operation. The mobility control information is control information which already exists in an LTE system (release 8). As a result, it is not necessary to add any change to the methods for use in an LTE system, and there can be provided an advantage of avoiding the complexity of the mobile communication system.

The number of component carriers which are newly set can be one or more. In the case in which the number of component carriers is one, the mobile terminal performs a handover operation, such as a synchronization establishment operation, only on this component carrier of the target cell. Therefore, the control time at the time of the handover operation can be reduced greatly, and the power consumption of the mobile terminal can also be reduced greatly.

When a plurality of component carriers are set, a priority is preferably assigned to each of the component carriers. The mobile terminal is made to perform a handover operation of handing over to a component carrier according to the priority assigned to each of the component carriers. When performing a handover operation of handing over to a component carrier having the highest priority, the mobile terminal measures the reception quality for this component carrier, and, when determining that the reception quality is lower than a threshold beyond which the mobile terminal determines that it can perform a handover, the mobile terminal performs a handover to a component carrier having the next highest priority. Furthermore, when the mobile terminal has failed in a handover, for example, the mobile terminal can perform a handover to a component carrier having the next highest priority. The network side can determine the priority assigned to each component carrier and can notify the priority, as well as the above-mentioned component carrier information, to the mobile terminal, or the mobile terminal can determine the priority assigned to each component carrier. Because the load balance of the cell or the like can be taken into consideration when the network side determines the priority assigned to each component carrier, an improvement in the throughput of the whole cell or the whole system after a handover is performed can be provided. In a method of determining the priority assigned to each component carrier which the mobile terminal uses, the mobile terminal can measure the reception quality for each of a plurality of set component carriers, and can determine the priority assigned to each of the component carriers on the basis of the above-mentioned reception quality. As a result, there is provided an advantage of enabling the mobile terminal to perform a handover to the component carrier having the best reception quality among the component carriers which are set between the mobile terminal and the base station. In this case, a measurement of the reception quality is needed. In order to eliminate this necessity to measure the reception quality, the mobile terminal can be made to determine one component carrier at random from the plurality of set component carriers. In this case, because the mobile terminal does not have to measure the reception quality, there is provided an advantage of being able to shorten the time required to perform the handover operation and also reduce the power consumption of each mobile terminal.

Furthermore, when a plurality of component carriers are set, after performing a handover, the mobile terminal can carry out communications with the base station which is the handover destination by using one of the plurality of component carriers.

As a method of setting which component carrier of the target cell as the component carrier which is the handover destination, the method of setting the target carrier for reception quality evaluation in a handover operation, which is disclosed in Variant 1 of Embodiment 5, can be applied.

The method disclosed in this variant can also be applied to a method (blind handover) of allowing the network to command a mobile terminal to perform a handover without using the measurement results acquired by the mobile terminal.

Embodiment 6

Because a problem to be solved by Embodiment 6 is the same as that shown in Embodiment 3, the explanation of the problem will be omitted hereafter.

A solution provided by this Embodiment 6 will be shown hereafter.

When a plurality of carriers exist in a carrier aggregation-capable base station, reselection evaluation can be performed on not all the components included in the base station, but one or more components or only one component included in each frequency band.

In a concrete example of a method of notifying one or more components included in each frequency band on which reselection evaluation is performed to mobile terminals, broadcast information from a base station to mobile terminals, e.g. a BCCH (MIB or SIB) is used as a concrete example to notify the one or more components. As an alternative, one or more components included in each frequency band can be statically determined in a mobile communication system. In the case in which one or more components included in each frequency band are statically determined, there can be provided an advantage of making the effective use of radio resources and preventing communication errors caused by radio communications from occurring. As an alternative, each mobile terminal can select one or more components included in each frequency band. In the case in which each mobile terminal selects one or more components included in each frequency band, there can be provided an advantage of making the effective use of radio resources and preventing communication errors caused by radio communications from occurring.

Embodiment 6 can be used in combination with Embodiment 3.

Because the necessity for each mobile terminal to carry out reselection evaluation by using all the component carriers in the serving base station is eliminated in Embodiment 6, there can be provided an advantage of suppressing the increase in the control delay occurring in the mobile communication system, and reducing the power consumption of each mobile terminal.

A frequency band consists of some contiguous frequencies. Therefore, because one or more components included in a frequency band have carrier frequencies close to each other, they may provide similar reception quality. Therefore, by performing reselection evaluation on one or more components included in each frequency band by using Embodiment 6, there can be provided an advantage of increasing the possibility that each mobile terminal can select a reselection destination from among components having various radio characteristics and a high possibility that corresponding degrees of reception quality differ from one another.

Embodiment 7

A problem to be solved by Embodiment 7 will be explained.

As an example of a method of selecting a scheduling component and a candidate component carrier set, a method of allowing a base station to select them on the basis of CQI and a measurement report which are notified from a mobile terminal to the base station has been considered.

The CQI is periodically reported at periods specified by the base station. The measurement report is periodically reported at periods specified by the base station. As an alternative, when the result of a reception quality measurement made by the mobile terminal satisfies a requirement for transmission of the measurement report, that is, when a trigger occurs, the measurement report is transmitted.

The CQI has an advantage of making it possible to carry out frequency scheduling efficiently. On the other hand, even if the mobile terminal is standing still and there is no change in the reception quality for each component, the periodical notification of the CQI is needed. Because it is necessary to report the reception quality periodically, the notification of the CQI results in an increase in the power consumption of the mobile terminal, as compared with the notification of the measurement report at the time when a trigger occurs.

An optimal method of sending a reception quality report from a mobile terminal to a base station in order to select a candidate component carrier set and a scheduling component will be disclosed.

A solution provided by this Embodiment 7 will be shown hereafter.

Figure 27:
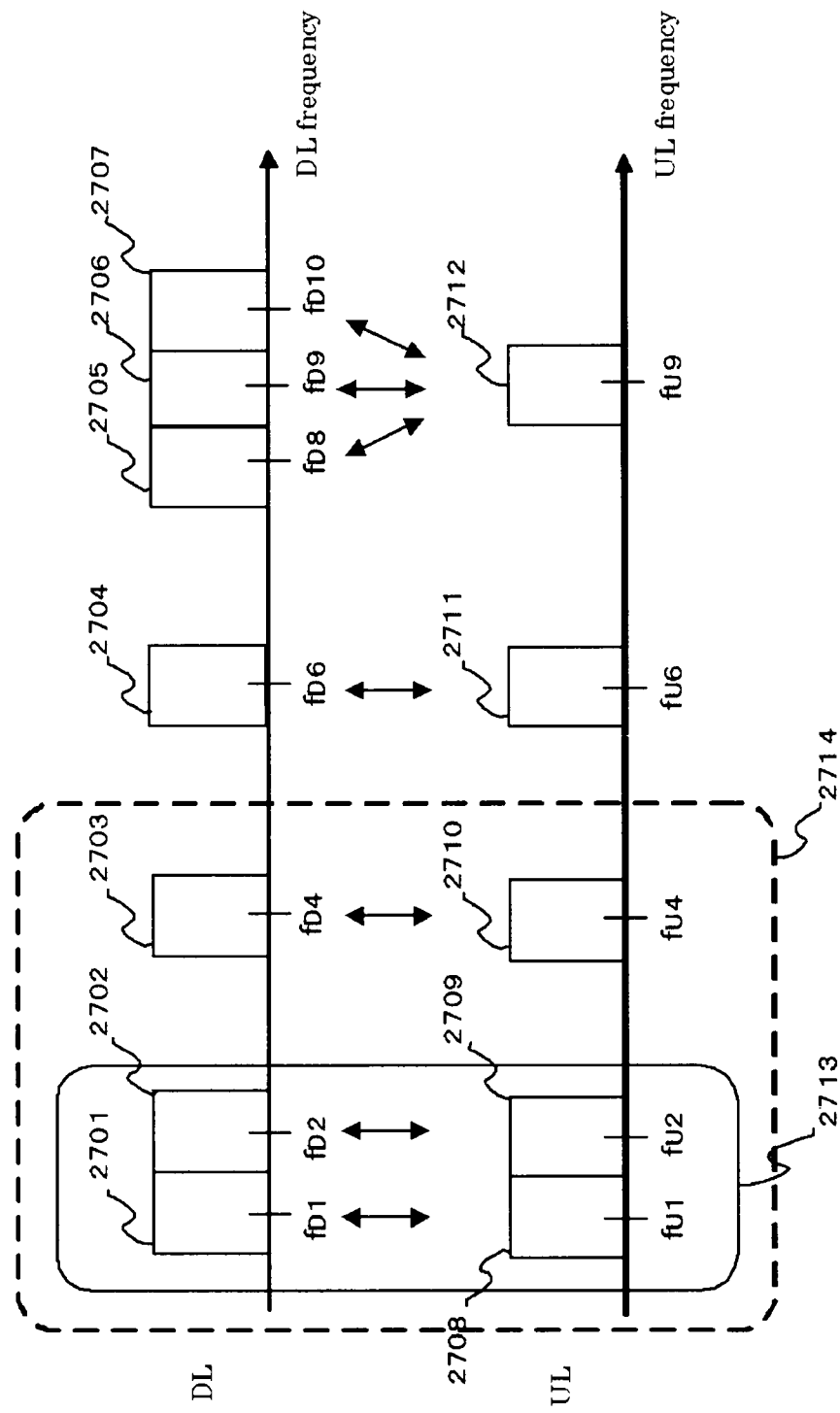
FIG. 27 is a conceptual diagram showing a solution provided by Embodiment 7.

A conceptual diagram of the solution is shown in FIG. 27. 2701 to 2707 denote downlink components on which the base station can perform carrier aggregation. 2708 to 2712 denote uplink components on which the base station can perform carrier aggregation. fD1 to fD10 denote the component carrier frequencies of the downlink components. fU1 to fU9 denote the component carrier frequencies of the uplink components.

The components 2701 and 2708, the components 2702 and 2709, the components 2703 and 2710, and the components 2704 and 2711 are pair bands of downlink and uplink. 2705, 2706, 2707, and 2712 denote an asymmetrical pair band.

2713 denotes a scheduling component which is a component with which data transmission and reception to and from the mobile terminal are actually carried out. The components 2701, 2782, 2708, and 2709 are included in the scheduling component 2713. 2714 denotes a candidate component carrier set with which data transmission and reception to and from the mobile terminal can be carried out. The components 2701, 2702, 2703, 2708, 2709, and 2710 are included in the candidate carrier set.

According to the solution provided by this Embodiment 7, a method of sending a reception quality report to select the candidate component carrier set from the components included in the base station and a method of sending a reception quality report to select the scheduling component from the candidate component carrier set are provided separately.

Concrete examples of a method of separately providing these report sending methods will be shown hereafter.

In a first concrete example, the measurement report is used to send a reception quality report of the reception quality for a component included in the base station which is not included in the candidate component carrier set, the CQI is used to send a reception quality report of the reception quality for a component included in the candidate component carrier set which is not included in the scheduling component, and the CQI is also used to send a reception quality report of the reception quality for a component included in the scheduling component.

More specifically, both the measurement report and the CQI are used for selection of the candidate component carrier set while the CQI is used for selection of the scheduling component. In other words, the CQI is used for the scheduling for components.

The first concrete example will be explained with reference to FIG. 27. The measurement report is used as to the components 2704, 2705, 2706, and 2707 while the CQI is used as to the components 2703, and 2701 and 2702.

This concrete example makes it possible to use the CQI, which is more effective for the frequency scheduling, for the reception quality measurement on the scheduling component. Therefore, there can be provided an advantage of implementing the frequency scheduling effectively while being able to suppress the increase in the power consumption of each mobile terminal.

In a second concrete example, the measurement report is used to send a reception quality report of the reception quality for a component included in the base station which is not included in the candidate component carrier set, the measurement report is also used to send a reception quality report of the reception quality for a component included in the candidate component carrier set which is not included in the scheduling component, and the CQI is used to send a reception quality report of the reception quality for a component included in the scheduling component.

More specifically, both the measurement report and the CQI are used for not only selection of the candidate component carrier set, but also selection of the scheduling component. More specifically, the CQI is used for a component with which data transmission and reception between the mobile terminal and the base station are carried out actually.

In this concrete example, the CQI is used for a component with which data transmission and reception between the mobile terminal and the base station are carried out actually. That is, the CQI is not used for any component with which data transmission and reception are not carried out actually. Therefore, there can be provided an advantage of suppressing the increase in the processing load for the scheduling for each mobile terminal as much as possible as compared with that in an LTE system.

Embodiment 8

A problem to be solved by Embodiment 8 will be explained.

Carrier aggregation using component carriers belonging to different frequency bands is supported. A concrete example will be explained with reference to FIG. 24(b). There is a case in which a mobile terminal is scheduled to carry out carrier aggregation using a component carrier "f2" included in a frequency band "BandI" and a component carrier "f9" included in a frequency band "BandIV" by a base station.

On the other hand, there is a case in which in order to be able to carry out transmission and reception in different frequency bands, a mobile terminal needs a plurality of antennas (807 of FIG. 8) respectively corresponding to, for example, the frequency bands, or the like. A case in which a mobile terminal which can carry out transmission and reception in different frequency bands, and a mobile terminal which cannot carry out transmission and reception in different frequency bands coexist can be considered.

In a case in which a mobile terminal does not have an antenna corresponding to a frequency band in question (e.g., the above-mentioned frequency band "BandIV"), and is scheduled to carry out carrier aggregation using component carriers included in different frequency bands (BandI and BandIV) (e.g., the above-mentioned component carriers "f2" and "f9"), for example, the following problem arises. In the case of downlink scheduling, this mobile terminal cannot carry out reception using the resource (e.g., the above-mentioned component carrier "f9") which is scheduled to be aggregated. As a result, a receiving error occurs and useless retransmission is repeated. Therefore, a problem of the occurrence of waste of radio resources arises. In the case of uplink scheduling, the above-mentioned mobile terminal cannot carry out transmission using the resource (e.g., the above-mentioned component carrier "f9") is scheduled to be aggregated. As a result, the radio resource (e.g., the above-mentioned component carrier "f9") which another mobile terminal could have used if the other mobile terminal had been scheduled to use the radio resource cannot be used by the other mobile terminal. Therefore, a problem of the occurrence of waste of radio resources arises.

A solution provided by this Embodiment 8 will be shown hereafter.

The mobile terminal notifies information showing whether the mobile terminal can carry out carrier aggregation between different frequency bands to a network side.

The network side carries out scheduling for this mobile terminal depending on the above-mentioned information. Uplink scheduling and downlink scheduling are included in the scheduling. The network side can select scheduling component carriers in the scheduling. As an alternative, the network side can select component carriers to be included in a candidate component carrier set for the above-mentioned mobile terminal depending on the above-mentioned information.

There is a base station or the like as a concrete example of an entity of the above-mentioned network side.

Four concrete examples of the information showing whether the mobile terminal can carry out carrier aggregation between different frequency bands will be disclosed hereafter.

(1) Information showing whether the mobile terminal can carryout carrier aggregation between different frequency bands. Information showing whether this mobile terminal can carry out carrier aggregation in operating (operating) frequency bands in the serving cell on which carrier aggregation can be performed can be alternatively used. In a concrete example of a method of notifying the operating frequency bands in the serving cell on which the mobile terminal can perform carrier aggregation, broadcast information is used. There is SIB1 as a concrete example of the broadcast information. Because the timing with which the SIB1 is broadcast is determined in advance, there can be provided an advantage of enabling the UE to receive the SIB1 at an early time. A concrete example of information included in the SIB1 is implemented by providing two or more "freqBandindicators" in the SIB1 (nonpatent reference 9). As a result, the compatibility of the mobile communication system can be easily maintained, and there can be provided an advantage of avoiding the complexity of the mobile communication system. As an alternative, the method of notifying the carrier information from a base station to a mobile terminal in accordance with Embodiment 3 can be used. Information showing whether the mobile terminal can carry out carrier aggregation between different frequency bands for each frequency band can be alternatively used.

(2) Information showing that the mobile terminal can carry out carrier aggregation between different frequency bands. Information showing that this mobile terminal can carry out carrier aggregation in operating (operating) frequency bands in the serving cell on which carrier aggregation can be performed can be alternatively used, like in the case of above-mentioned (1). As an alternative, information showing that the mobile terminal can carry out carrier aggregation between different frequency bands for each frequency band can be used.

(3) Information showing that the mobile terminal cannot carry out carrier aggregation between different frequency bands. As an alternative, information showing that the mobile terminal cannot carry out carrier aggregation between different frequency bands for each frequency band can be used.

(4) Information showing frequency bands on which the mobile terminal can perform carrier aggregation. Information showing frequency bands which are included in operating (operating) frequency bands in the serving cell on which carrier aggregation can be performed, and on which this mobile terminal can perform carrier aggregation can be alternatively used. In a case in which there are a small number of operating frequency bands in the serving cell on which carrier aggregation can be performed, there can be provided an advantage of being able to reduce the amount of information as compared with a case of notifying information about all frequency bands on which the mobile terminal can perform carrier aggregation. Because a method of notifying the operating frequency bands in the serving cell on which carrier aggregation can be performed is the same as that shown in above-mentioned (1), the explanation of the notifying method will be omitted hereafter. As an alternative, information showing different frequency bands on which the mobile terminal can perform carrier aggregation for each frequency band can be used.

Two concrete examples of the scheduling to the above-mentioned mobile terminal depending on the information showing whether the mobile terminal can carry out carrier aggregation between different frequency bands will be disclosed hereafter.

(1) When the above-mentioned mobile terminal can carry out carrier aggregation between different frequency bands, a scheduler allows the network side to perform scheduling on a plurality of component carriers belonging to the different frequency bands. In contrast, when the above-mentioned mobile terminal cannot carryout carrier aggregation between different frequency bands, the scheduler prohibits the network side from performing scheduling on a plurality of component carriers belonging to the different frequency bands. This concrete example has high compatibility with the concrete examples (1), (2) and (3) of the information showing whether the mobile terminal can carry out carrier aggregation between different frequency bands. This is because the scheduler determines whether or not to allow the network side to perform scheduling on a plurality of component carriers belonging to the different frequency bands, and therefore the information showing whether the mobile terminal can carry out carrier aggregation between different frequency bands is sufficient for the determination.

(2) The scheduler allows the network side to perform scheduling on a plurality of component carriers belonging to frequency bands on which the above-mentioned mobile terminal can perform carrier aggregation. The scheduler prohibits the network side from performing scheduling on component carriers which do not belong to the frequency bands on which the above-mentioned mobile terminal can perform carrier aggregation. This concrete example has high compatibility with the concrete example (4) of the information showing whether the mobile terminal can carry out carrier aggregation between different frequency bands. This is because the scheduler determines whether or not to allow the network side to perform scheduling on a plurality of component carriers belonging to the frequency bands on which the mobile terminal can perform carrier aggregation, and therefore the information showing whether the mobile terminal can carry out carrier aggregation between different frequency bands is not sufficient for the determination and the information about the frequency bands on which the mobile terminal can perform carrier aggregation is required for the determination.

Seven concrete examples of when to notify the information showing whether the mobile terminal can carry out carrier aggregation between different frequency bands to the network side will be disclosed hereafter.

(1) When an uplink transmission request (scheduling request) occurs in the mobile terminal.

(2) When a paging to the mobile terminal occurs and this mobile terminal makes a reply to the paging.

(3) When the mobile terminal selects a base station in performing cell selection or reselection. In this case, the notification of the information can be limited to only when the mobile terminal selects a carrier aggregation-capable base station in performing cell selection. It becomes unnecessary to carry out useless uplink transmission, and there can be provided an advantage of lowering the power consumption of the mobile terminal. Because a method of determining whether or not a cell is a carrier aggregation-capable one is the same as that shown in Embodiment 3, the explanation of the method will be omitted.

(4) When notifying a tracking area update (TAU).

(5) When sending an attach request (Attach Request).

(6) When notifying a measurement report. In this case, the notification of the information can be limited to only when a base station which is the destination of the notification of the measurement report is a carrier aggregation-capable cell. It becomes unnecessary to carry out useless uplink transmission, and there can be provided an advantage of lowering the power consumption of the mobile terminal. As an alternative, the information showing whether the mobile terminal can carry out carrier aggregation between different frequency bands can be notified from the source cell to the target cell by assuming that it is not necessary to make a second notification from the mobile terminal at the time of a handover. In this case, it is preferable to use an S1 interface and an X2 interface. As a result, the uplink transmission from the mobile terminal can be reduced, and there can be provided an advantage of lowering the power consumption of the mobile terminal.

(7) When an RACH procedure is performed.

Two concrete examples of a method of notifying the information showing whether the mobile terminal can carry out carrier aggregation between different frequency bands to the network side will be disclosed hereafter.

(1) Use the RACH procedure.

(2) Use a dedicated control channel (DCCH).

Three concrete examples of how to store the information showing whether each mobile terminal can carry out carrier aggregation between different frequency bands in the network side will be disclosed hereafter.

(1) Store the information in a base station. When the information showing whether the mobile terminal can carry out carrier aggregation between different frequency bands is notified to the network side for each base station in the concrete examples of when to notify the information showing whether the mobile terminal can carry out carrier aggregation between different frequency bands to the network side, this storing method has high compatibility with, for example, the concrete examples (1), (2), (3), and (6). The reasons why the storing method has high compatibility with the concrete examples are as follows. The first reason is that an uplink transmission request in the case of (1) is a signal notified from the mobile terminal to the base station. The second reason is that a paging reply in the case of (2) is a signal notified from the mobile terminal to the base station. The third reason is that a cell selection in the case of (3) is a process carried out for each base station. The fourth reason is that a measurement report in the case of (6) is a signal notified from the mobile terminal to the base station.

(2) Store the information in an MME. When the information showing whether the mobile terminal can carry out carrier aggregation between different frequency bands is not notified to the network side for each base station in the concrete examples of when to notify the information showing whether the mobile terminal can carry out carrier aggregation between different frequency bands to the network side, this storing method has high compatibility with, for example, the concrete examples (4) and (5). The reasons why the storing method has high compatibility with the concrete examples are as follows. The first reason is that the MME carries out management of the tracking area in the case of (4). When even if a cell reselection is made, a cell selected before the reselection and another cell selected after the reselection belong to the same tracking area, the mobile terminal does not make any notification of a tracking area update. As a result, in the case of (4), it is difficult to store the information showing whether each mobile terminal can carry out carrier aggregation between different frequency bands in a base station. Therefore, the second reason is that it is desirable to store the information in a higher-level entity. The mobile terminal makes an attach request in the case of (5) when the mobile terminal is switched on, for example. Therefore, there is a case in which the mobile terminal does not send an attach request even if the mobile terminal makes a cell reselection. As a result, in the case of (5), it is difficult to store the information showing whether each mobile terminal can carry out carrier aggregation between different frequency bands in a base station. Therefore, the third reason is that it is desirable to store the information in a higher-level entity.

(3) Store the information in an HSS (Home Subscriber Server). An HSS is a subscriber information database in a 3GPP mobile communications network, and is an entity for carrying out management of authentication information and location information. When the information showing whether the mobile terminal can carry out carrier aggregation between different frequency bands is not notified to the network side for each base station in the concrete examples of when to notify the information showing whether the mobile terminal can carry out carrier aggregation between different frequency bands to the network side, this storing method has high compatibility with, for example, the concrete examples (4) and (5). The reasons why the storing method has high compatibility with the concrete examples are as follows. When even if a cell reselection is made in the case of (4), a cell selected before the reselection and another cell selected after the reselection belong to the same tracking area, the mobile terminal does not make any notification of a tracking area update. As a result, in the case of (4), it is difficult to store the information showing whether each mobile terminal can carry out carrier aggregation between different frequency bands in a base station. Therefore, the second reason is that it is desirable to store the information in a higher-level entity. The mobile terminal makes an attach request in the case of (5) when the mobile terminal is switched on, for example. Therefore, there is a case in which the mobile terminal does not send an attach request even if the mobile terminal makes a cell reselection. As a result, in the case of (5), it is difficult to store the information showing whether each mobile terminal can carry out carrier aggregation between different frequency bands in a base station. Therefore, the third reason is that it is desirable to store the information in a higher-level entity.

Furthermore, the "information showing whether each mobile terminal can carry out carrier aggregation between frequency bands" can be newly added as a component of the UE capability information about each mobile terminal. As a result, the "information showing whether each mobile terminal can carry out carrier aggregation between frequency bands" can be transmitted at once together with pieces of other capability information about each mobile terminal between each mobile terminal and the network. Therefore, there can be provided an advantage of avoiding the complexity of the mobile communication system.

In that case, in addition to the above-mentioned six concrete examples, the following concrete examples of when to notify the information showing whether the mobile terminal can carryout carrier aggregation between different frequency bands to the network side are provided. Each mobile terminal transmits the information showing whether the mobile terminal can carry out carrier aggregation between different frequency bands as its UE capability information in response to an inquiry (also referred to as UECapabilityEnquiry) from the network side.

As an alternative, different pieces of information can be provided for uplink and for downlink as the above-mentioned information showing whether the mobile terminal can carry out carrier aggregation between different frequency bands. In a case in which each mobile terminal has different hardware configurations or the like for uplink and for downlink, scheduling can be controlled separately for uplink and for downlink, and there can be provided an advantage of being able to perform the scheduling with flexibility.

Figure 28:
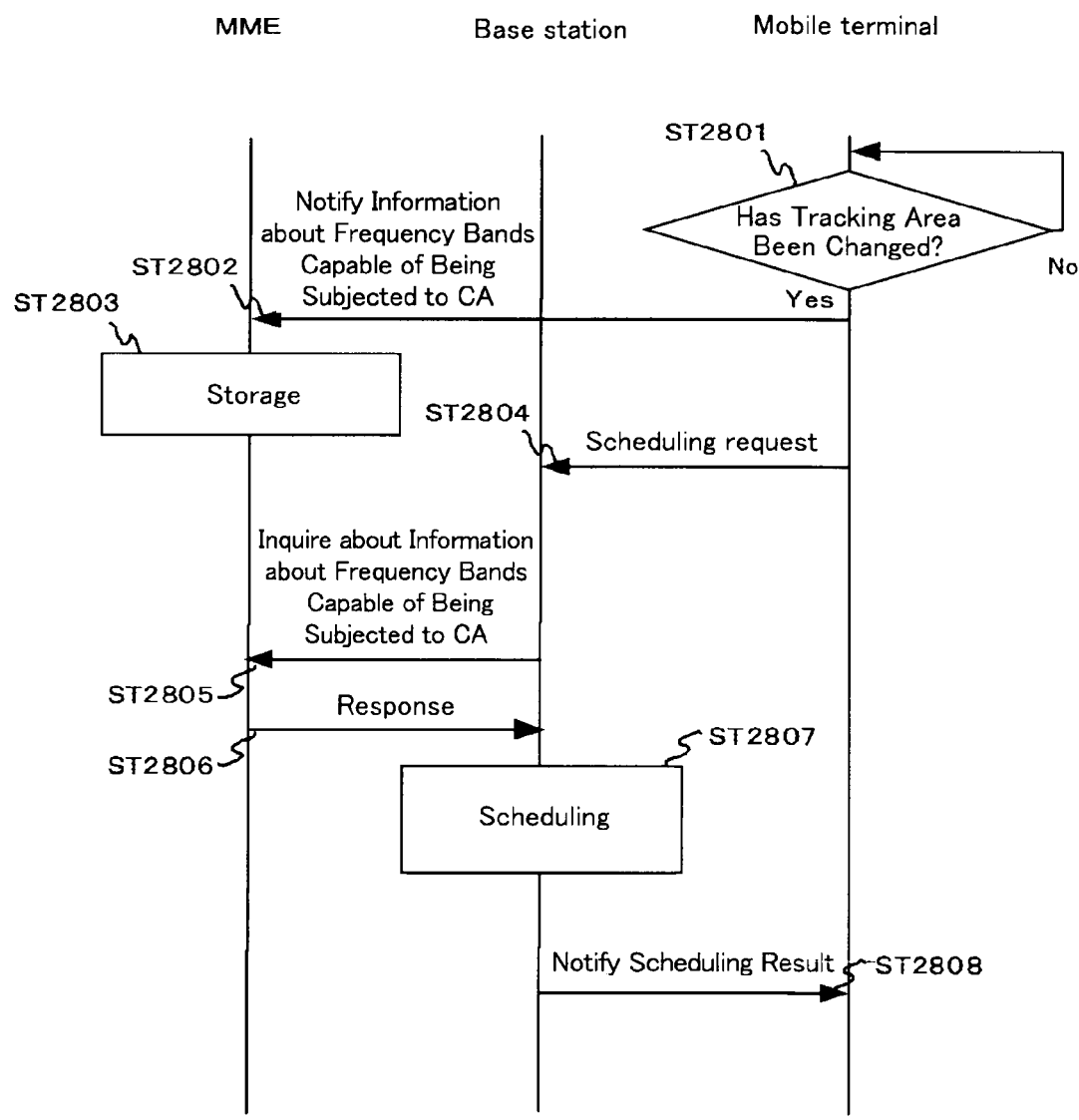
FIG. 28 is a sequence diagram showing an operation of a mobile communication system in accordance with Embodiment 8.

An example of an operation is shown in FIG. 28. In the example of FIG. 28, the concrete example (4) is used as the information showing whether the mobile terminal can carry out carrier aggregation between different frequency bands, the concrete example (4) is used as an example of when to notify the information showing whether the mobile terminal can carry out carrier aggregation between different frequency bands to the network side, and the concrete example (2) is used as an example of how to store the information showing whether each mobile terminal can carry out carrier aggregation between different frequency bands in the network side.

The mobile terminal, in step ST2801, determines whether or not the tracking area has been changed. When the tracking area has been changed, the mobile terminal makes a transition to step ST2802. In contrast, when the tracking area has not been changed, the mobile terminal repeats the determination process of step ST2801.

The mobile terminal, in step ST2802, notifies information about the frequency bands capable of being subjected to carrier aggregation (CA) to an MME by way of a base station (serving cell). This notification can be made together with a TAU. Furthermore, an identifier of this mobile terminal can also be notified.

The MME, in step ST2803, stores the frequency band information about the frequency bands capable of being subjected to carrier aggregation in the above-mentioned mobile terminal which the MME has received in step ST2802. The MME can also store the identifier of the above-mentioned mobile terminal.

The mobile terminal, in step ST2804, sends a scheduling request to the base station (serving cell), for example.

The base station, in step ST2805, inquires about the frequency band information about the frequency bands capable of being subjected to carrier aggregation (CA) in the above-mentioned mobile terminal. The identifier of the target mobile terminal can also be notified via the above-mentioned inquiry. An S1 interface is used for this inquiry.

The MME, in step ST2806, sends a reply to the inquiry of step ST2805 to the base station. This reply includes the frequency band information about the frequency bands capable of being subjected to carrier aggregation in the mobile terminal which is the target for the inquiry. The identifier of the target mobile terminal can also be notified via the above-mentioned inquiry. An S1 interface is used for this reply.

The base station (serving cell), in step ST2807, carries out scheduling by using the frequency bands on which the above-mentioned mobile terminal can perform carrier aggregation depending on the frequency band information about the frequency bands capable of being subjected to carrier aggregation in the above-mentioned mobile terminal, which the base station has received in step ST2806.

The base station (serving cell), in step ST2808, notifies the result of the scheduling of step ST2807 to the mobile terminal.

Figure 29:
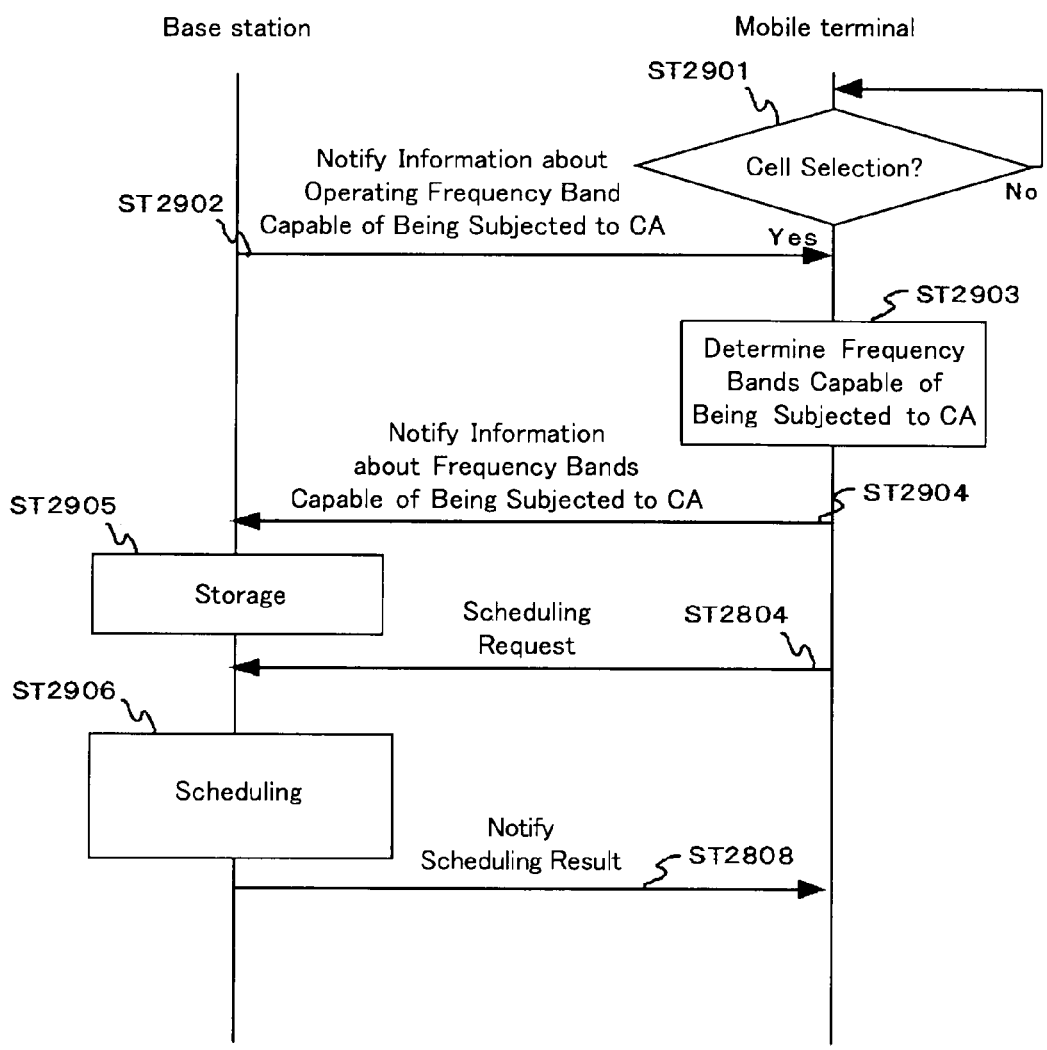
FIG. 29 is a sequence diagram showing the operation of the mobile communication system in accordance with Embodiment 8.

An example of another operation is shown in FIG. 29. In the example shown in FIG. 29, the concrete example (4) which is the information showing frequency bands which are included in operating (operating) frequency bands in the serving cell on which carrier aggregation can be performed, and on which the mobile terminal can perform carrier aggregation is used as the information showing whether the mobile terminal can carry out carrier aggregation between different frequency bands. The concrete example (3) is used as an example of when to notify the information showing whether the mobile terminal can carry out carrier aggregation between different frequency bands to the network side. The concrete example (1) is used as an example of how to store the information showing whether each mobile terminal can carry out carrier aggregation between different frequency bands in the network side. Because the same processes or like processes in FIG. 29 are performed in the steps designated by the same reference characters as those shown in FIG. 28, the explanation of the steps designated by the same reference characters will be omitted hereafter.

The mobile terminal, in step ST2901, determines whether the mobile terminal has made a cell selection. When determining that the mobile terminal has made a cell selection, the mobile terminal makes a transition to step ST2902. In contrast, when determining that the mobile terminal has not made a cell selection, the mobile terminal repeats the determination process of step ST2901.

The base station (serving cell), in step ST2902, notifies information about the frequency bands capable of being subjected to carrier aggregation (CA) to the mobile terminal.

The mobile terminal, in step ST2903, determines or selects frequency bands on which the mobile terminal can perform carrier aggregation, and which are included in the operating frequency bands in the serving cell on which carrier aggregation can be performed, which the mobile terminal has received in step ST2902.

The mobile terminal, in step ST2904, notifies the frequency bands which the mobile terminal has selected in step ST2903 and on which the mobile terminal can perform carrier aggregation, the frequency bands being included in the operating frequency bands in the serving cell on which carrier aggregation (CA) can be performed, to the base station (serving cell).

The base station (serving cell), in step STST2905, stores the frequency band information about the frequency bands capable of being subjected to carrier aggregation in the above-mentioned mobile terminal which the base station has received in step ST2904. The base station can also store the identifier of the above-mentioned mobile terminal.

The base station (serving cell), in step ST2906, carries out scheduling by using the frequency bands on which the above-mentioned mobile terminal can perform carrier aggregation depending on the frequency band information about the frequency bands capable of being subjected to carrier aggregation in the above-mentioned mobile terminal, which the base station has stored in step ST2905.

Embodiment 8 can provide the following advantages.

The base station becomes able to carry out scheduling for carrier aggregation according to the capability of the mobile terminal. As a result, the waste of radio resources resulting from the impossibility of carrying out carrier aggregation between different frequency bands in the mobile terminal can be reduced.

Variant 1 of Embodiment 8

A problem to be solved by Variant 1 of Embodiment 8 will be explained hereafter.

There is a case in which a mobile terminal has a hardware configuration for each component carrier in order to implement carrier aggregation. In this case, there can be considered a case in which the number of component carriers on which carrier aggregation can be performed differs for each mobile terminal.

When a mobile terminal has only hardware ready for a smaller number of component carriers than the number of component carriers which are scheduled to be aggregated by a base station, the following problem arises. In the case of downlink scheduling, the above-mentioned mobile terminal cannot receive resources which are scheduled to be on component carriers whose number exceeds the number of component carriers actually provided therein. As a result, a receiving error occurs and useless retransmission is repeated. Therefore, a problem of the occurrence of waste of radio resources arises. In the case of uplink scheduling, the above-mentioned mobile terminal cannot carry out transmission using resources which are scheduled to be on component carriers whose number exceeds the number of component carriers actually provided therein. As a result, a radio resource which another mobile terminal could have used if the other mobile terminal had been scheduled to use the radio resource cannot be used by the other mobile terminal. Therefore, a problem of the occurrence of waste of radio resources arises.

A solution provided by this Variant 1 of Embodiment 8 will be shown hereafter.

The mobile terminal notifies information showing the number of components on which the mobile terminal can perform carrier aggregation to the network side.

The network side performs scheduling on this mobile terminal depending on this information. Uplink scheduling and downlink scheduling are included in the scheduling. In the scheduling, the network side can select scheduling component carriers. As an alternative, the network side can select component carriers to be included in a candidate component carrier set to this mobile terminal depending on the above-mentioned information.

There is a base station or the like as a concrete example of an entity of the above-mentioned network side.

Two concrete examples of the information showing the number of components on which the mobile terminal can perform carrier aggregation will be disclosed hereafter.

(1) The number of components on which the mobile terminal can perform carrier aggregation. Information showing the number of components which are included in operating (operating) component carriers in the serving cell on which carrier aggregation can be performed, and on which this mobile terminal can perform carrier aggregation can be alternatively used. Because a concrete example of a method of notifying the operating component carriers in the serving cell on which carrier aggregation can be performed is the same as the method in accordance with Embodiment 8 of notifying the operating frequency bands in the serving cell on which carrier aggregation can be performed, the explanation of the concrete example will be omitted hereafter. As an alternative, information showing the number of components on which the mobile terminal can perform carrier aggregation for each frequency band can be used.

(2) An index showing the number of components on which the mobile terminal can perform carrier aggregation. There can be provided an advantage of being able to reduce the amount of information required for the notification, and making the effective use of radio resources, as compared with the number of components on which the mobile terminal can perform carrier aggregation. In a concrete example, when the number of components on which the mobile terminal can perform carrier aggregation is 1, the index is set to "0", when the number of components on which the mobile terminal can perform carrier aggregation is 2 or 3, the index is set to "1", when the number of components on which the mobile terminal can perform carrier aggregation is 4, the index is set to "2", and when the number of components on which the mobile terminal can perform carrier aggregation is 5, the index is set to "3". The relationship between the number of components on which the mobile terminal can perform carrier aggregation and the index can be determined semi-statically or statically. When the relationship is determined semi-statically, the index should just be notified via broadcast information from the serving cell. Therefore, there can be provided an advantage of being able to construct the mobile communication system with flexibility. In the case in which the relationship is determined statically, there can be provided an advantage of eliminating the necessity to notify the index from the network side to the mobile terminal and making the effective use of radio resources. As an alternative, an index showing the number of components on which the mobile terminal can perform carrier aggregation for each frequency band can be used.

A concrete example of the scheduling to the above-mentioned mobile terminal depending on the information showing the number of components on which the mobile terminal can perform carrier aggregation will be disclosed hereafter. A scheduler allows the network side to perform the scheduling on component carriers whose number is equal to or smaller than the number of components which is notified from the mobile terminal and on which carrier aggregation can be performed. The scheduler prohibits the network side from performing the scheduling on component carriers whose number exceeds the number of components which is notified from the mobile terminal and on which carrier aggregation can be performed.

Because a concrete example of when to notify the information showing the number of components on which the mobile terminal can perform carrier aggregation to the network side is the same as that in accordance with Embodiment 8 of when to notify the information showing whether the mobile terminal can carry out carrier aggregation between different frequency bands to the network side, the explanation of the concrete example will be omitted hereafter.

Because a concrete example of a method of notifying the information showing the number of components on which the mobile terminal can perform carrier aggregation to the network side is the same as that of the method in accordance with Embodiment 8 of notifying the information showing whether the mobile terminal can carry out carrier aggregation between frequency bands to the network side, the explanation of the concrete example will be omitted hereafter.

Because a concrete example of how to store the information showing the number of components on which each mobile terminal can perform carrier aggregation in the network side is the same as that in accordance with Embodiment 8 of how to store the information showing whether each mobile terminal can carry out carrier aggregation between different frequency bands in the network side, the explanation of the concrete example will be omitted hereafter.

Furthermore, the "information showing the number of components on which the mobile terminal can perform carrier aggregation" can be newly added as a piece of the UE capability information about each mobile terminal, like in the case of Embodiment 8.

As an alternative, different pieces of information can be provided for uplink and for downlink as the "information showing the number of components on which the mobile terminal can perform carrier aggregation", like in the case of Embodiment 8.

Because examples of an operation are the same as those shown in FIGS. 28 and 29 which are shown in Embodiment 8, the explanation of the examples will be omitted hereafter.

Variant 1 of Embodiment 8 can be used in combination with Embodiment 8.

Variant 1 of Embodiment 8 can provide the following advantages.

The base station becomes able to carry out the scheduling for carrier aggregation according to the capability of the mobile terminal. As a result, the waste of radio resources resulting from the scheduling on component carriers whose number exceeds the number of component carriers on which the mobile terminal can perform carrier aggregation can be reduced.

Variant 2 of Embodiment 8

A problem to be solved by Variant 2 of Embodiment 8 will be explained hereafter.

A case in which a mobile terminal performs carrier aggregation on non-contiguous (non-contiguous) component carriers can be considered.

It can be considered that a mobile terminal differs in its hardware configuration between when the mobile terminal can perform carrier aggregation on non-contiguous component carriers and when the mobile terminal cannot perform carrier aggregation on non-contiguous component carriers. There can be a case in which that a mobile terminal which can perform carrier aggregation on non-contiguous component carriers and a mobile terminal which cannot perform carrier aggregation on non-contiguous component carriers coexist.

When scheduling for carrier aggregation using non-contiguous components to a mobile terminal which cannot perform carrier aggregation on non-contiguous component carriers is performed by a base station, the following problem arises.

In the case of downlink scheduling, the above-mentioned mobile terminal cannot receive resources which are scheduled to be on the non-contiguous component carriers. As a result, a receiving error occurs and useless retransmission is repeated. Therefore, a problem of the occurrence of waste of radio resources arises. In the case of uplink scheduling, the above-mentioned mobile terminal cannot carry out transmission using resources which are scheduled to be on the non-contiguous component carriers. As a result, a radio resource which another mobile terminal could have used if the other mobile terminal had been scheduled to use the radio resource cannot be used by the other mobile terminal. Therefore, a problem of the occurrence of waste of radio resources arises.

A solution provided by this Variant 2 of Embodiment 8 will be shown hereafter.

The mobile terminal notifies information showing whether the mobile terminal can perform carrier aggregation on non-contiguous (non-contiguous) component carriers to the network side.

The network side performs the scheduling on this mobile terminal depending on this information. Uplink scheduling and downlink scheduling are included in the scheduling. In the scheduling, the network side can select scheduling component carriers. As an alternative, the network side can select component carriers to be included in a candidate component carrier set to this mobile terminal depending on the above-mentioned information.

There is a base station or the like as a concrete example of an entity of the above-mentioned network side.

Three concrete examples of the information showing whether the mobile terminal can perform carrier aggregation on non-contiguous (non-contiguous) component carriers will be disclosed hereafter.

(1) Information showing whether the mobile terminal can perform carrier aggregation on non-contiguous (non-contiguous) component carriers. Information showing whether the mobile terminal can perform carrier aggregation on non-contiguous component carriers which are included in operating (operating) component carriers in the serving cell on which carrier aggregation can be performed can be alternatively used. Because a concrete example of a method of notifying the operating component carriers in the serving cell on which carrier aggregation can be performed is the same as the method in accordance with Embodiment 8 of notifying the operating frequency bands in the serving cell on which carrier aggregation can be performed, the explanation of the concrete example will be omitted hereafter. As an alternative, information showing whether the mobile terminal can perform carrier aggregation on non-contiguous (non-contiguous) component carriers for each frequency band can be used.

(2) Information showing that the mobile terminal can perform carrier aggregation on non-contiguous (non-contiguous) component carriers. As an alternative, information showing that the mobile terminal can perform carrier aggregation on contiguous component carriers and non-contiguous component carriers can be used. Information showing that the mobile terminal can perform carrier aggregation on non-contiguous component carriers which are included in operating (operating) component carriers in the serving cell on which carrier aggregation can be performed can be alternatively used, like in the case of above-mentioned (1). As an alternative, information showing that the mobile terminal can perform carrier aggregation on non-contiguous (non-contiguous) component carriers for each frequency band can be used.

(3) Information showing that the mobile terminal cannot perform carrier aggregation on non-contiguous (non-contiguous) component carriers. As an alternative, information showing that the mobile terminal can perform carrier aggregation on contiguous component carriers can be used. Information showing that the mobile terminal cannot perform carrier aggregation on non-contiguous (non-contiguous) component carriers for each frequency band can be alternatively used.

A concrete example of the scheduling to the above-mentioned mobile terminal depending on the information showing whether the mobile terminal can perform carrier aggregation on non-contiguous (non-contiguous) component carriers will be disclosed hereafter. When the mobile terminal can perform carrier aggregation on non-contiguous (non-contiguous) component carriers, the scheduler allows the network side to perform the scheduling on the non-contiguous component carriers. In contrast, when the mobile terminal cannot perform carrier aggregation on non-contiguous (non-contiguous) component carriers, the scheduler prohibits the network side from performing the scheduling on the non-contiguous component carriers.

Because a concrete example of when to notify the information showing whether the mobile terminal can perform carrier aggregation on non-contiguous (non-contiguous) component carriers to the network side is the same as that in accordance with Embodiment 8 of when to notify the information showing whether the mobile terminal can carry out carrier aggregation between different frequency bands to the network side, the explanation of the concrete example will be omitted hereafter.

Because a concrete example of a method of notifying the information showing whether the mobile terminal can perform carrier aggregation on non-contiguous (non-contiguous) component carriers to the network side is the same as that of the method in accordance with Embodiment 8 of notifying the information showing whether the mobile terminal can carry out carrier aggregation between frequency bands to the network side, the explanation of the concrete example will be omitted hereafter.

Because a concrete example of how to store the information showing whether each mobile terminal can perform carrier aggregation on non-contiguous (non-contiguous) component carriers in the network side is the same as that in accordance with Embodiment 8 of how to store the information showing whether each mobile terminal can carry out carrier aggregation between different frequency bands in the network side, the explanation of the concrete example will be omitted hereafter.

Furthermore, the "information showing whether the mobile terminal can perform carrier aggregation on non-contiguous (non-contiguous) component carriers" can be newly added as a component of the UE capability information about each mobile terminal, like in the case of Embodiment 8.

As an alternative, different pieces of information can be provided for uplink and for downlink as the "information showing whether the mobile terminal can perform carrier aggregation on non-contiguous (non-contiguous) component carriers", like in the case of Embodiment 8.

Because examples of the operation are the same as those shown in FIGS. 28 and 29 which are shown in Embodiment 8, the explanation of the example will be omitted hereafter.

Variant 2 of Embodiment 8 can be used in combination with Variant 1 of Embodiment 8 or Embodiment 8.

A combination of Variant 2 of Embodiment 8 and Variant 1 of Embodiment 8 can be configured as follows.

When the mobile terminal can perform carrier aggregation on non-contiguous (non-contiguous) component carriers, the mobile terminal notifies the information showing whether the mobile terminal can perform carrier aggregation on non-contiguous (non-contiguous) component carriers, and the information showing the number of components on which the mobile terminal can perform carrier aggregation. As an alternative, assuming that the mobile terminal can perform carrier aggregation on non-contiguous (non-contiguous) component carriers when there is a notification of the information showing the number of components on which the mobile terminal can perform carrier aggregation, the notification of the information showing whether the mobile terminal can perform carrier aggregation on non-contiguous (non-contiguous) component carriers can be eliminated. The amount of information notified from the mobile terminal to the network side can be reduced, and there can be provided an advantage of making the effective use of radio resources.

When the mobile terminal cannot perform carrier aggregation on non-contiguous (non-contiguous) component carriers, the mobile terminal notifies the information showing whether the mobile terminal can perform carrier aggregation on non-contiguous (non-contiguous) component carriers, and the highest frequency band on which the mobile terminal can perform carrier aggregation. When the bandwidths of the component carriers are equal to one another, the number of component carriers on which the mobile terminal can perform carrier aggregation can be derived from the highest frequency band. As an alternative, assuming that the mobile terminal cannot perform carrier aggregation on non-contiguous (non-contiguous) component carriers when there is a notification of the highest frequency band, the notification of the information showing whether the mobile terminal can perform carrier aggregation on non-contiguous (non-contiguous) component carriers can be eliminated. The amount of information notified from the mobile terminal to the network side can be reduced, and there can be provided an advantage of making the effective use of radio resources.

A combination of Variant 2 of Embodiment 8 and Embodiment 8 can be configured hereafter. The information notified from the mobile terminal to the network side can be configured as follows.

The information showing whether the mobile terminal can carry out carrier aggregation between different frequency bands is notified.

When the mobile terminal cannot carry out carrier aggregation between different frequency bands, the notification of the information showing whether the mobile terminal can perform carrier aggregation on non-contiguous (non-contiguous) component carriers can be eliminated. The amount of information notified from the mobile terminal to the network side can be reduced, and there can be provided an advantage of making the effective use of radio resources.

When the mobile terminal can carry out carrier aggregation between different frequency bands, the notification of the information showing whether the mobile terminal can perform carrier aggregation on non-contiguous (non-contiguous) component carriers can be made.

Variant 2 of Embodiment 8 can provide the following advantages.

The base station becomes able to carry out the scheduling for carrier aggregation according to the capability of the mobile terminal. As a result, the waste of radio resources resulting from the scheduling on non-contiguous component carriers to a mobile terminal which cannot perform carrier aggregation on non-contiguous component carriers can be reduced.

Scheduling component carriers associated with downlink, among the "scheduling component carriers" which are used in any of all the above-mentioned embodiments, are also referred to as a "UE DL Component Carrier set". This set is a one of downlink component carriers which is scheduled in order for the mobile terminal to receive a PDSCH in the downlink, and which is set by using individual signaling.

Scheduling component carriers associated with uplink, among the "scheduling component carriers" which are used in any of all the above-mentioned embodiments, are also referred to as a "UE UL Component Carrier set". This set is the set of uplink component carriers which is scheduled in order for the mobile terminal to receive a PUSCH in the uplink.

Each component carrier according to the 3GPP (release 8) specifications which is used in any of all the above-mentioned embodiments is also referred to as a "backwards compatible carrier". This carrier can be accessed by all existing LTE-support mobile terminals.

In contrast with this, each carrier which an existing LTE-support mobile terminal cannot access in any of all the above-mentioned embodiments is also referred to as a "non-backwards compatible carrier". Such a carrier is easier for a mobile terminal which supports a release in which this carrier is defined to access.

The invention claimed is:

1. A base station which uses either one of a plurality of component carriers individually or uses an aggregate carrier which is an aggregate of said plurality of component carriers to carry out radio communications with a mobile terminal supporting said component carrier and also carry out radio communications with a mobile terminal supporting said aggregate carrier, where the mobile terminal supporting the component carrier does not support said aggregate carrier wherein said base station broadcasts information indicating a frequency band of a multi carrier anchor included in said aggregate carrier such that the mobile terminal supporting said aggregate carrier can be configured to receive the multi carrier anchor, and notifies, by using the frequency band indicated by the broadcasted information, a bandwidth of an aggregate carrier which is an aggregate of said plurality of component carriers, as a bandwidth which said base station uses, to the mobile terminal supporting said aggregate carrier, the bandwidth of the aggregate carrier being indicated in system information of said aggregate carrier.

2. The base station according to claim 1, wherein said base station notifies a tracking area which is common in an aggregate carrier which is an aggregate of all of said component carriers, as a tracking area which is a target for tracking a position of a mobile terminal and which said base station uses, to the mobile terminal supporting said aggregate carrier.

3. The base station according to claim 2, wherein said base station notifies a tracking area corresponding to said component carrier disposed separately from the tracking area which is common in said aggregate carrier, as a tracking area which said base station uses, to the mobile terminal supporting said component carrier.

4. The base station according to claim 1, wherein said base station notifies a call occurrence reporting timing which is common in an aggregate carrier which is an aggregate of all of said component carriers, as a call occurrence reporting timing which is a timing with which to report an occurrence of a call and which said base station uses, to the mobile terminal supporting said aggregate carrier.

5. The base station according to claim 4, wherein said base station notifies a call occurrence reporting timing corresponding to said component carrier and disposed separately from the call occurrence reporting timing which is common in said aggregate carrier, as a call occurrence reporting timing which said base station uses, to the mobile terminal supporting said component carrier.

6. The base station according to claim 5, wherein said base station sets the call occurrence reporting timing which is common in said aggregate carrier to have a higher frequency than the call occurrence reporting timing corresponding to said component carrier.

7. The base station according to claim 1, wherein said base station selects a component carrier to which said base station should switch from among said plurality of component carriers according to quality of a signal which said base station transmits on a component carrier which said base station is currently using.

8. The base station according to claim 7, wherein said base station causes a mobile terminal to transmit a measurement result of quality of a signal which said base station transmits by using each of said plurality of component carriers, and selects the component carrier to which said base station should switch according to the measurement result transmitted thereto.

9. The base station according to claim 1, wherein said base station selects a component carrier to which said base station should switch from among component carriers of a neighboring base station falling within a band which is same as that to which a component carrier which said base station is currently using belongs according to quality of a signal which said base station transmits on said component carrier which said base station is currently using.

10. The base station according to claim 1, wherein said base station notifies a bandwidth of said component carrier, as a bandwidth which said base station uses, to the mobile terminal supporting said component carrier.

* * * * *